US008428867B2

(12) United States Patent
Ashley, Jr. et al.

(10) Patent No.: US 8,428,867 B2
(45) Date of Patent: Apr. 23, 2013

(54) CONFIGURING AND USING MULTI-DIMENSIONAL ZONES

(75) Inventors: James Ashley, Jr., Norco, CA (US); Patrick Mooney, Brea, CA (US)

(73) Assignee: Wirelesswerx International, Inc., Urbanizacion Marbella (PA)

( * ) Notice: Subject to any disclaimer, the term of this patent is extended or adjusted under 35 U.S.C. 154(b) by 1142 days.

(21) Appl. No.: 12/350,843

(22) Filed: Jan. 8, 2009

(65) Prior Publication Data

US 2009/0132163 A1    May 21, 2009

Related U.S. Application Data

(63) Continuation-in-part of application No. 11/848,178, filed on Aug. 30, 2007.

(51) Int. Cl.
  *G01C 21/00*   (2006.01)
  *G01S 19/42*   (2010.01)
  *H04M 11/04*   (2006.01)

(52) U.S. Cl.
  USPC ............... 701/408; 342/357.25; 455/404.2

(58) Field of Classification Search .......... 701/400–417, 701/420–423, 424, 428–432, 437, 440, 444–448, 701/450–454, 455, 466–472, 484–485, 495, 701/516–517, 519–520, 523, 532; 340/989–996; 455/73, 345, 352, 54.2, 53.1, 33.1, 456; 342/357.23, 342/357.25, 357.2, 357.44, 462
See application file for complete search history.

(56) References Cited

U.S. PATENT DOCUMENTS

| 3,518,674 | A | 6/1970 | Moorhead et al. |
| 3,772,668 | A | 11/1973 | Smith |
| 4,152,693 | A | 5/1979 | Ashworth, Jr. |
| 4,217,588 | A | 8/1980 | Freeny, Jr. |
| 4,224,596 | A | 9/1980 | Knickel |

(Continued)

FOREIGN PATENT DOCUMENTS

| CN | 1190183 A | 8/1997 |
| DE | 4028214 A1 | 3/1992 |

(Continued)

OTHER PUBLICATIONS

Wirelesswerx TrakWERK II SMS/Satellite Dual Mode Tracking Unit, Manual, Nov. 17, 2003, pp. 1-20.

(Continued)

*Primary Examiner* — Muhammad Shafi
(74) *Attorney, Agent, or Firm* — Greenberg Traurig, LLP

(57) ABSTRACT

A method to define a three-dimensional geographical zone that is utilized with a movable entity having at least one attached transponder is disclosed. The method comprises allowing a user to enter at least one waypoint, and loading at least one waypoint on at least one transponder. In one or more embodiments, a waypoint is defined by a geographical coordinate and a radius. The geographical coordinate is represented by a latitude value, a longitude value, and an elevation value. And, the radius is represented by a distance magnitude. In some embodiments, the method further comprises regulating the movable entity by monitoring, controlling, and/or visualizing the movement, non-movement, or position of the movable entity. The transponder determines whether the transponder is located inside the three-dimensional geographical zone by obtaining global positioning coordinates, and calculating whether or not the global positioning coordinates are located inside at least one waypoint.

21 Claims, 24 Drawing Sheets

U.S. PATENT DOCUMENTS

| | | | |
|---|---|---|---|
| 4,688,026 A | 8/1987 | Scribner et al. | |
| 4,819,860 A | 4/1989 | Hargrove et al. | |
| 4,847,773 A | 7/1989 | van Helsdingen et al. | |
| 4,884,208 A | 11/1989 | Marinelli et al. | |
| 4,958,645 A | 9/1990 | Cadell et al. | |
| 5,142,281 A | 8/1992 | Park | |
| 5,235,633 A | 8/1993 | Dennison et al. | |
| 5,365,516 A | 11/1994 | Jandrell | |
| 5,388,147 A | 2/1995 | Grimes | |
| 5,389,934 A | 2/1995 | Kass | |
| 5,479,482 A | 12/1995 | Grimes | |
| 5,528,248 A | 6/1996 | Steiner et al. | |
| 5,546,445 A | 8/1996 | Dennison et al. | |
| 5,617,944 A | 4/1997 | McTaggart | |
| 5,621,785 A | 4/1997 | Norimatsu | |
| 5,627,517 A | 5/1997 | Theimer et al. | |
| 5,642,303 A | 6/1997 | Small et al. | |
| 5,670,944 A | 9/1997 | Myllymaki | |
| 5,699,244 A | 12/1997 | Clark, Jr. et al. | |
| 5,793,310 A | 8/1998 | Watanabe et al. | |
| 5,796,634 A | 8/1998 | Craport et al. | |
| 5,835,907 A | 11/1998 | Newman | |
| 5,917,405 A | 6/1999 | Joao | |
| 5,917,414 A | 6/1999 | Oppelt et al. | |
| 5,917,415 A | 6/1999 | Atlas | |
| 5,918,180 A | 6/1999 | Dimino | |
| 5,938,721 A | 8/1999 | Dussell et al. | |
| 5,946,611 A | 8/1999 | Dennison et al. | |
| 5,986,508 A | 11/1999 | Nevin et al. | |
| 6,002,994 A | 12/1999 | Lane et al. | |
| 6,009,330 A | 12/1999 | Kennedy, III et al. | |
| 6,014,089 A | 1/2000 | Tracy et al. | |
| 6,043,748 A | 3/2000 | Touchton et al. | |
| 6,055,426 A | 4/2000 | Beasley | |
| 6,073,013 A | 6/2000 | Agre et al. | |
| 6,102,856 A | 8/2000 | Groff et al. | |
| 6,177,905 B1 | 1/2001 | Welch | |
| 6,198,394 B1 | 3/2001 | Jacobsen et al. | |
| 6,198,431 B1 | 3/2001 | Gibson | |
| 6,198,914 B1 | 3/2001 | Saegusa | |
| 6,236,358 B1 | 5/2001 | Durst et al. | |
| 6,243,039 B1 | 6/2001 | Elliot | |
| 6,265,978 B1 | 7/2001 | Atlas | |
| 6,300,875 B1 | 10/2001 | Schafer | |
| 6,317,605 B1 | 11/2001 | Sakuma | |
| 6,324,404 B1 | 11/2001 | Dennison et al. | |
| 6,330,446 B1 | 12/2001 | Mori | |
| 6,360,164 B1 | 3/2002 | Murayama | |
| 6,421,001 B1 | 7/2002 | Durst et al. | |
| 6,438,382 B1 | 8/2002 | Boesch et al. | |
| 6,446,004 B1 | 9/2002 | Cao et al. | |
| 6,477,363 B1 | 11/2002 | Ayoub et al. | |
| 6,496,116 B2 | 12/2002 | Farringdon et al. | |
| 6,496,575 B1 | 12/2002 | Vasell et al. | |
| 6,509,830 B1 | 1/2003 | Elliott et al. | |
| 6,516,198 B1 | 2/2003 | Tendler | |
| 6,531,924 B2 | 3/2003 | Aparin | |
| 6,531,963 B1 | 3/2003 | Nyfelt | |
| 6,574,484 B1 | 6/2003 | Carley | |
| 6,577,897 B1 | 6/2003 | Shurubura et al. | |
| 6,579,231 B1 | 6/2003 | Phipps | |
| 6,597,365 B1 | 7/2003 | Baecke et al. | |
| 6,599,243 B2 | 7/2003 | Wolterman et al. | |
| 6,611,206 B2 | 8/2003 | Eshelman et al. | |
| 6,617,969 B2 | 9/2003 | Tu et al. | |
| 6,625,457 B1 | 9/2003 | Raith | |
| 6,646,873 B2 | 11/2003 | Chu-Chia et al. | |
| 6,665,613 B2 | 12/2003 | Duvall | |
| 6,674,368 B2 | 1/2004 | Hawkins et al. | |
| 6,714,133 B2 | 3/2004 | Hum et al. | |
| 6,717,513 B1 | 4/2004 | Sandelman et al. | |
| 6,774,795 B2 | 8/2004 | Eshelman et al. | |
| 6,801,974 B1 | 10/2004 | Watts, Jr. et al. | |
| 6,812,824 B1 | 11/2004 | Goldinger et al. | |
| 6,826,473 B1 | 11/2004 | Burch et al. | |
| 6,847,822 B1 | 1/2005 | Dennison et al. | |
| 6,853,911 B1 | 2/2005 | Sakarya | |
| 6,856,898 B1 | 2/2005 | Tompkins et al. | |
| 6,859,653 B1 | 2/2005 | Ayoub et al. | |
| 6,867,733 B2 | 3/2005 | Sandhu et al. | |
| 6,868,074 B1 | 3/2005 | Hanson | |
| 6,868,410 B2 | 3/2005 | Fortin et al. | |
| 6,904,363 B2 | 6/2005 | Inbar et al. | |
| 6,909,891 B2 | 6/2005 | Yamashita et al. | |
| 6,922,565 B2 | 7/2005 | Rhodes et al. | |
| 6,944,464 B2 | 9/2005 | Muranaga | |
| 6,970,922 B1 | 11/2005 | Spector | |
| 6,983,154 B2 | 1/2006 | Niwa | |
| 7,013,151 B2 | 3/2006 | Hirokawa | |
| 7,016,478 B2 | 3/2006 | Potorny et al. | |
| 7,064,614 B2 | 6/2006 | Feng et al. | |
| 7,138,916 B2 | 11/2006 | Schwartz | |
| 7,174,301 B2 | 2/2007 | Florence et al. | |
| 7,286,929 B2 | 10/2007 | Staton et al. | |
| 7,317,927 B2 | 1/2008 | Staton | |
| 7,323,982 B2 | 1/2008 | Staton et al. | |
| 7,426,197 B2 | 9/2008 | Schotten et al. | |
| 7,539,742 B2 | 5/2009 | Spector | |
| 7,848,765 B2 | 12/2010 | Phillips et al. | |
| 7,870,229 B2 | 1/2011 | Spector | |
| 8,285,245 B2 | 10/2012 | Ashley, Jr. et al. | |
| 8,290,515 B2 | 10/2012 | Staton et al. | |
| 8,315,203 B2 | 11/2012 | Ashley, Jr. et al. | |
| 2001/0027378 A1 | 10/2001 | Tennison et al. | |
| 2001/0032236 A1 | 10/2001 | Lin | |
| 2001/0034659 A1 | 10/2001 | Kobayashi | |
| 2001/0040513 A1 | 11/2001 | McDonald | |
| 2001/0046884 A1 | 11/2001 | Yoshioka | |
| 2001/0048755 A1* | 12/2001 | Wiens | 382/113 |
| 2002/0028702 A1 | 3/2002 | Kim | |
| 2002/0039903 A1 | 4/2002 | Niwa | |
| 2002/0059434 A1 | 5/2002 | Karaoguz et al. | |
| 2002/0068544 A1 | 6/2002 | Barzilay et al. | |
| 2002/0072348 A1 | 6/2002 | Wheeler et al. | |
| 2002/0072356 A1 | 6/2002 | Yamashita et al. | |
| 2002/0111171 A1 | 8/2002 | Boesch et al. | |
| 2002/0147006 A1 | 10/2002 | Coon et al. | |
| 2002/0196151 A1 | 12/2002 | Troxler | |
| 2003/0013462 A1 | 1/2003 | Adachi | |
| 2003/0137435 A1 | 7/2003 | Haddad et al. | |
| 2003/0141962 A1 | 7/2003 | Barink | |
| 2003/0149526 A1 | 8/2003 | Zhou et al. | |
| 2003/0158635 A1 | 8/2003 | Pillar et al. | |
| 2003/0163287 A1 | 8/2003 | Vock et al. | |
| 2003/0186709 A1 | 10/2003 | Rhodes et al. | |
| 2004/0024522 A1 | 2/2004 | Walker et al. | |
| 2004/0036599 A1 | 2/2004 | Martin et al. | |
| 2004/0043774 A1 | 3/2004 | Lee | |
| 2004/0075553 A1 | 4/2004 | Ono | |
| 2004/0082840 A1 | 4/2004 | Chen | |
| 2004/0152460 A1 | 8/2004 | La et al. | |
| 2004/0176106 A1 | 9/2004 | Tendler | |
| 2004/0180668 A1 | 9/2004 | Owens et al. | |
| 2004/0192271 A1 | 9/2004 | Eisner et al. | |
| 2004/0196182 A1 | 10/2004 | Unnold | |
| 2004/0201454 A1 | 10/2004 | Waterhouse et al. | |
| 2004/0203944 A1 | 10/2004 | Huomo et al. | |
| 2004/0207541 A1 | 10/2004 | Choi | |
| 2004/0208344 A1 | 10/2004 | Liu et al. | |
| 2004/0215750 A1 | 10/2004 | Stilp | |
| 2004/0220731 A1 | 11/2004 | Tucker et al. | |
| 2004/0225436 A1 | 11/2004 | Yoshihashi | |
| 2004/0248586 A1 | 12/2004 | Patel et al. | |
| 2004/0249497 A1 | 12/2004 | Saigh et al. | |
| 2004/0249560 A1 | 12/2004 | Kim et al. | |
| 2005/0026627 A1 | 2/2005 | Boling et al. | |
| 2005/0048987 A1 | 3/2005 | Glass | |
| 2005/0068227 A1 | 3/2005 | Caspi et al. | |
| 2005/0070315 A1 | 3/2005 | Rai et al. | |
| 2005/0085257 A1 | 4/2005 | Laird et al. | |
| 2005/0090978 A1 | 4/2005 | Bathory et al. | |
| 2005/0151654 A1 | 7/2005 | Curwen | |
| 2005/0159883 A1* | 7/2005 | Humphries et al. | 701/207 |
| 2005/0275549 A1 | 12/2005 | Barclay et al. | |
| 2006/0003809 A1 | 1/2006 | Boling et al. | |
| 2006/0009240 A1 | 1/2006 | Katz | |
| 2006/0015233 A1 | 1/2006 | Olsen et al. | |

| | | | |
|---|---|---|---|
| 2006/0109107 A1 | 5/2006 | Staton et al. | |
| 2006/0234727 A1 | 10/2006 | Ashley, Jr. | |
| 2007/0004378 A1 | 1/2007 | Muhonen et al. | |
| 2007/0244633 A1 | 10/2007 | Phillips et al. | |
| 2007/0276270 A1 | 11/2007 | Tran | |
| 2009/0138353 A1 | 5/2009 | Mendelson | |
| 2010/0293106 A1 | 11/2010 | Rhoads et al. | |

FOREIGN PATENT DOCUMENTS

| | | |
|---|---|---|
| DE | 19960219 | 6/2001 |
| EP | 0915398 | 5/1999 |
| EP | 1050853 A1 | 11/2000 |
| EP | 1345148 A | 8/2003 |
| EP | 1345148 | 9/2003 |
| FR | 2621150 | 3/1989 |
| GB | 2322248 A | 8/1998 |
| GB | 2369966 | 6/2002 |
| JP | 2000299891 A | 10/2000 |
| JP | 2003304184 A | 10/2003 |
| MX | 299005 | 5/2012 |
| WO | WO00-01065 | 1/2000 |
| WO | WO00-41428 A | 6/2000 |
| WO | WO0041428 | 7/2000 |
| WO | WO02-63768 | 8/2000 |
| WO | WO01-46926 A | 1/2001 |
| WO | WO01-35190 A | 5/2001 |
| WO | WO01-63318 A | 8/2001 |
| WO | WO03-042926 | 5/2003 |
| WO | WO03-049060 A | 6/2003 |
| WO | WO03-079587 | 9/2003 |
| WO | WO 2006/058112 A1 | 6/2006 |

OTHER PUBLICATIONS

Wirelesswerx Training Outline, Manual, Oct. 29, 2004, pp. 1-44.
Wirelesswerx System Description Tucson01, Manual, Feb. 8, 2006, pp. 1-10.
Wirelesswerx Requirements Specification Tucson01, Manual, Feb. 27, 2006, pp. 1-35.
Wirelesswerx Technical Overview, Manual, Sep. 10, 2003, pp. 1-19.

\* cited by examiner

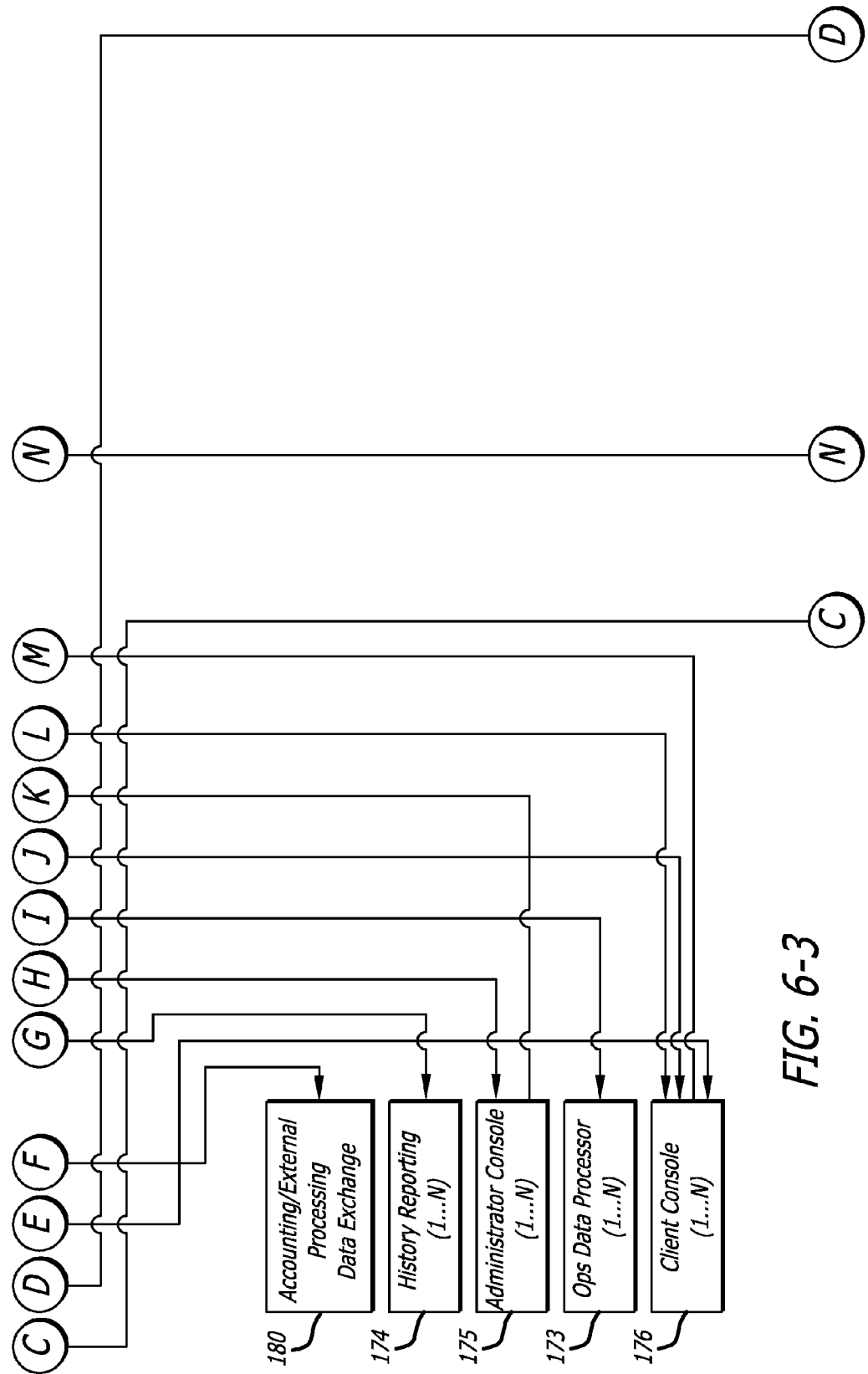

CONFIGURING AND USING MULTI-DIMENSIONAL ZONES

CROSS REFERENCE TO RELATED APPLICATIONS AND PATENTS

This application is a Continuation in Part of U.S. patent application Ser. No. 11/848,178, filed Aug. 30, 2007, and claims the benefit of the prior filing date of U.S. Provisional Patent Application Ser. No. 60/625,467, filed Nov. 5, 2004. These applications are incorporated by reference in their entirety. This application is related to U.S. patent application Ser. No. 12/044,840, filed Mar. 7, 2008, which is incorporated by reference in its entirety.

BACKGROUND

1. Field of the Disclosure

This application relates generally to monitoring wireless devices and to messaging by wireless communication between wireless devices in a specific geographical location and remote centers.

The disclosure also relates to configuring and using geographical zones in multi-dimensional spaces. In particular, it relates to systems and methods to remotely control and monitor movable entities, their functions and to positioning data in relation to geographical zones. Such zones can be pre-configured geographical zones. Moveable entities include, but are not limited to, people and vehicles.

2. Background of the Disclosure

Personal and vehicle tracking systems have become increasingly popular and more economically accessible to businesses and individuals. Most tracking locator systems utilize Global Positioning System (GPS) technology. In personal tracking, individuals use GPS tracking information to obtain their current location in relation to another location, etc.

While current GPS tracking systems provide benefits such as Latitude/Longitude (Lat/Long) of a location, triangulation and safety, these benefits are yet to be maximized. Current systems are limited to relaying the GPS information to a control center or a web server and plotting the position of the person or vehicle on a computer map.

Previous systems have been developed to attempt to locate a wireless communication device utilizing wireless access points and routers. For example, the wireless communication device could be in a location having several buildings in range of the wireless communication device. However, these systems do not necessarily provide a precise location. In another situation, the wireless communication device may be in a building with several floors, each floor having its own location node. In this situation, the wireless communication device may be closer to a location node on a different floor.

SUMMARY OF THE DISCLOSURE

The present disclosure relates to an apparatus, system, and method for defining a three-dimensional geographical zone utilized with a movable entity having at least one attached transponder. The method comprises allowing a user to enter at least one waypoint, and loading at least one waypoint on at least one transponder.

In one or more embodiments, a waypoint is defined by a geographical coordinate and a radius. The geographical coordinate is represented by a latitude value, a longitude value, and an elevation value. And, the radius is represented by a distance magnitude. The area that the waypoint defines is a circle, a cylinder, or a sphere.

In some embodiments, the method further comprises regulating the movable entity by monitoring, controlling, and/or visualizing the movement, non-movement, or position of the movable entity. In one or more embodiments, the transponder determines whether the transponder is located inside the three-dimensional geographical zone by obtaining global positioning coordinates, and calculating whether or not the global positioning coordinates are located inside at least one waypoint. The shape of the three-dimensional geographical zone can be a street route or a non-geometrical shape. In some embodiments, the moveable entity is controlled and monitored depending on the location of the moveable entity relative to the three-dimensional geographical zone.

DRAWINGS

The foregoing aspects and advantages of the present disclosure will become more readily apparent and understood with reference to the following detailed description, when taken in conjunction with the accompanying drawings, wherein:

FIGS. 6-1 through 6-4 illustrate component diagrams of a backend control system.

FIG. 10 illustrates a screenshot of an instance of the history data processor.

FIG. 11 illustrates a screenshot of an instance of a disabled transponder or subscriber device processor.

DETAILED DESCRIPTION

Figure 1:
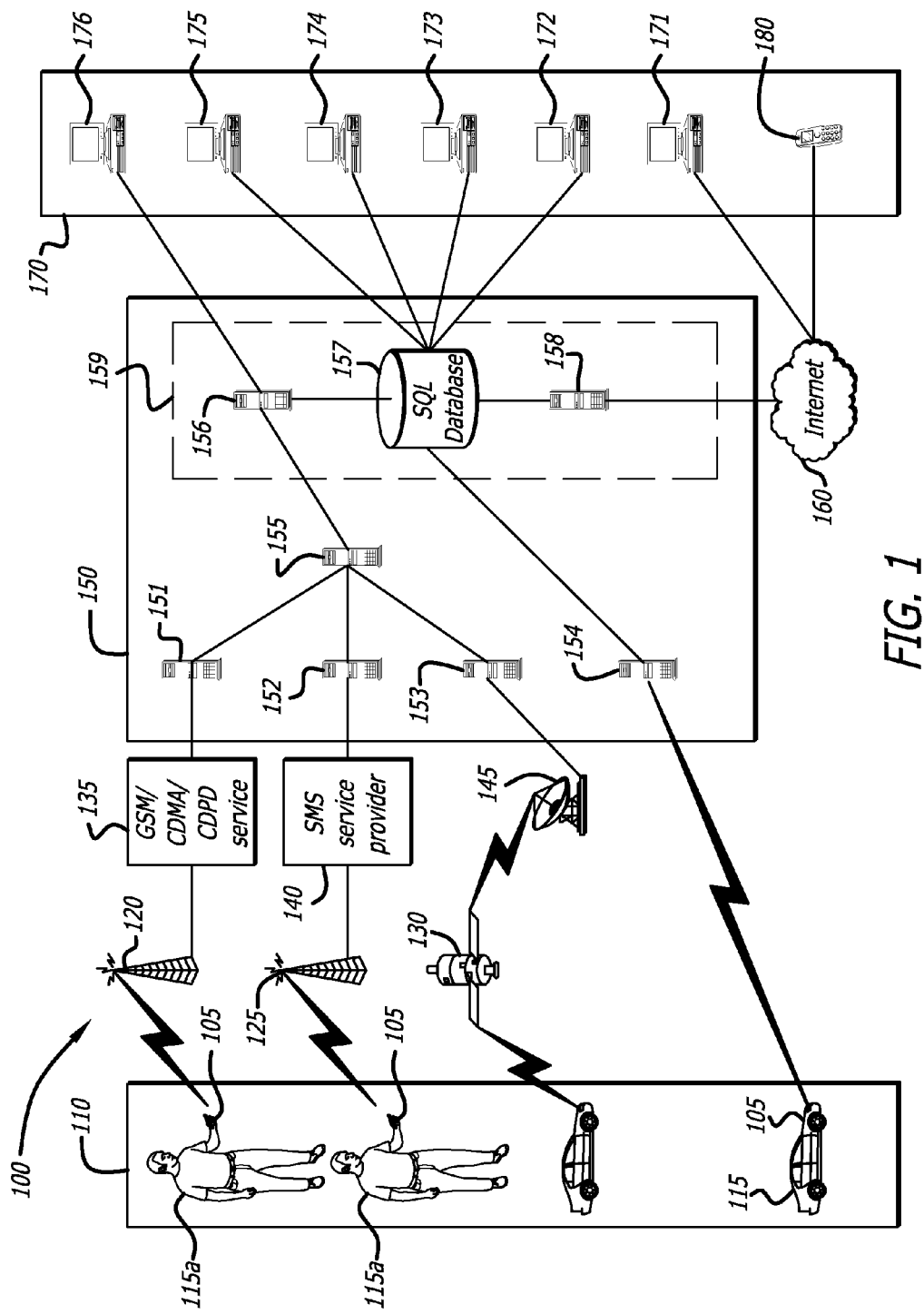
FIG. 1 illustrates the high-level architecture of a computer system for controlling and monitoring movable entities.

The present disclosure provides a system and method that allows a user to control and monitor individuals, vehicles and other movable entities by using geographical zones. These zones can be pre-configured geographical zones. Such zones have a plurality of nodes. In different situations, messages can be sent between one or more of these mobile users and one or more control stations. The users can be a single user or multiple users in a group with whom there are message communications. The messages can be targeted to the one or multiple users.

The multi-dimensional sense can be a three-dimensional sense in the x, y and z axes or coordinates. The system allows for three-dimensional mapping according to the placement of nodes in a three-dimensional sense. Further messages can be communicated with movable entities according to their location in the three-dimensional space, and the messages may be commercial or emergency messages.

The nodes are preferably part of a mesh network or other suitable network configuration. The nodes preferably communicate with transponders or subscriber devices that can be a cell phone, Personal Digital Assistant (PDA) or similar device using the Bluetooth™ protocol.

In one particular aspect, there is the ability to effect fine resolution determination of a movable entity's location. This can include three-dimensional mapping of that location. Disclosed in the present application is an apparatus and method for the relative precise three-dimensional mapping of a specific location. The apparatus and method can utilize a Bluetooth™ equipped device that communicates wirelessly via Radio Frequency (RF) using Bluetooth™ protocol with location nodes in a mesh network. The Bluetooth™ equipped device uses at least one specific algorithm to determine its three-dimensional location within the mesh network. This resulting location data is used to generate a fine resolution map centering on that specific location.

In another specific aspect, there is the ability to obtain and mine data related to the location of a mobile user. This can include an apparatus and method for mining data relating to the relatively precise three-dimensional location of a user. The apparatus and method can employ a Bluetooth™ equipped mobile personal device associated with a user that communicates wirelessly via RF using Bluetooth™ protocol with location nodes in a mesh network. The Bluetooth™ equipped mobile personal device contains at least one specific algorithm to determine the relatively precise location of the user within the mesh network. When the Bluetooth™ equipped mobile personal device is within the range of certain location nodes, specific events are triggered. These include, but are not limited to, the downloading of appropriate advertisements to the Bluetooth™ equipped mobile personal device. In addition, the location nodes transmit the user's location data to a central station via other nodes within the mesh network, relay stations, and/or intermediate supplementary stations. The user's location data can then be processed and analyzed at the central station and/or intermediate supplementary stations.

In another specific aspect, there is the ability to provide a security support system utilizing three-dimensional user location data. This can include an apparatus and method for providing security support to mobile users using three-dimensional location data of the users. The apparatus and method can employ a Bluetooth™ equipped mobile personal device associated with a user that communicates wirelessly via RF using Bluetooth™ protocol with location nodes in a mesh network. The Bluetooth™ equipped personal device uses at least one downloaded algorithm to determine the relatively specific three-dimensional location of the user within the mesh network. When an emergency event occurs, a central station and/or intermediate supplementary stations transmit emergency notifications to the users that are located within a specific group of nodes in the mesh network. These emergency notifications are transmitted to the users' personal devices via other nodes within the mesh network and/or through relay stations.

In one aspect, there is a method to define a geographical zone, which can be in two or three dimensions, and which can be utilized to regulate a movable entity that has a transponder or subscriber device. The device can be a cell phone, PDA, pager, computer or similar device, which is configured to be in wireless communication with other devices through a suitable network.

The method comprises loading from a computing device to a memory in a transponder or subscriber device a plurality of coordinates. The coordinates are mapped on a pixilated image so as to assign one pixel to each coordinate of the plurality of coordinates. The distance between each assigned pixel is configurable. The plurality of assigned pixels are connected with lines forming a contiguous line, and the connected line encloses an area in the pixilated image. The pixels that lie on the lines in order to form a contiguous array of pixels that enclose a shape in the pixilated image are activated. In another aspect, the method to define a geographical zone allows for regulation of the movable entity by monitoring, controlling and visualizing the status of the entity. The status of the entity may be movement, non-movement, and position of the entity. The movable entity is controlled and monitored depending on the location of the movable entity relative to said geographical zone.

In another aspect, the plurality of coordinates are entered by a user of a computer device and transmitted to the transponder or subscriber device. The user is allowed to enter geographical coordinates in a three-dimensional sense by allowing a user to select points in a map in a computer by clicking on the map and calculating the geographical coordinates of each selected point in the map. In another aspect, the user is allowed to enter geographical coordinates by typing on the computer the longitude and latitude. The plurality of geographical coordinates can defined either by various systems including, but not limited to, the Mercator system and/or a latitude and longitude system.

In yet another aspect, the position of the movable entity in relation to the geographical zone as described in the method to define a three-dimensional geographical zone is determined by the steps of locating the transponder or subscriber device within the pixilated image by activating a pixel corresponding to the geographical coordinates where the transponder or subscriber device is located. Two vertical lines are extended in opposite directions and originating from the pixel, two horizontal lines are extended in opposite directions and originating from the pixel. The number of times each line crosses the boundary of the geographical zone is determined, and an outside status is assigned to each line that crosses the boundary a even number of times. An inside status is assigned to each line that crosses the boundary a odd number of times. The transponder or subscriber device is identified as being inside the boundary if the status of three out of four lines indicate an inside status.

In another aspect, a subscriber device has a ground- or elevation-positioning system receiver that calculates the transponder or subscriber device coordinates, and allows a user or control center to identify the location of the movable entity in the pixilated image as one pixel in the computer image.

In another aspect, the geographical area is a geometrical shape such as a square, rectangle, triangle, circle, oval, or trapezoid in two or three dimensions. The shape of the geographical area can also be the shape of a non-geometrical shape such as the shape of the border delimiting a building, address, street, state, city, county, or country.

In one aspect, there is a method to define a geographical zone in two or three dimensions utilized to regulate a movable entity having a transponder or subscriber device. The method comprises allowing a user to enter a plurality of waypoints, each waypoint in the plurality of waypoints being defined by a geographical coordinate and a radius; wherein the geographical coordinate in two or three dimensions is represented by a latitude and longitude and elevation, and the radius is represented by a distance magnitude; and loading the plurality of waypoints on a transponder or subscriber device.

In another aspect, the transponder or subscriber device can determine whether the transponder or subscriber device is inside or outside the geographical zone in two or three dimensions by obtaining global positioning coordinates, and calculating whether the global positioning coordinates are inside at least one waypoint of the plurality of waypoints. The shape of the geographical area is the shape of a non-geometrical shape. The elevation relationship and positions can be determined by nodes set at different elevation levels.

In another aspect, all waypoints in the plurality of waypoints have the same coordinate but different radii, such that all the waypoints in the plurality of waypoints are concentric.

In one aspect, there is a method to identify a geographical area in one, two, or three dimensions for regulating a movable entity. The method comprises allowing a user to identify a geometrical area, region or space in a computer map. The geometrical area, region or space uses two or more coordinate attributes, and the identified geometrical area, region or space is divided into a grid. A user is allowed to select at least one section from within the grid in order to define a geographical area, region or space. The at least one section is associated with at least one pixel in a pixilated computer image such that the pixels selected by the user in the identified geometrical area are identified as being in the geographical area, region or space. The pixilated computer image is loaded to a memory in a transponder or subscriber device.

In another aspect, the pixilated computer image has a directly proportional number of columns and rows as the identified geometrical area, region or space. Alternatively, the pixilated computer image has the same number of columns and rows as the identified geometrical area, region or space. In another aspect, the geometrical area, region or space is rectangular or circular. In yet another aspect, a second geographical area, region or space is defined by a plurality of geographical areas, regions or spaces.

In one or more embodiments, the identified geometrical area, region or space is divided into a grid of three-dimensional squares and/or rectangles. The three-dimensional squares and/or rectangles of the grid may have various depths. The user is allowed to select at least one section from within the three-dimensional grid in order to define a three-dimensional geographical area, region, or space. The at least one section is associated with at least one pixel in a pixilated computer image such that the pixels selected by the user in the identified geometrical area are identified as being in the three-dimensional geographical area, region or space. The pixilated computer image is loaded to a memory in a transponder or subscriber device.

In yet another aspect the movable entity has a transponder or subscriber device associated with the entity and located in the geographical area, region or space. A position of the transponder or subscriber device is obtained from a ground or elevation positioning unit operably connected to the transponder or subscriber device. The position of the transponder or subscriber device is correlated in the geographical area, region or space to a representative position of the transponder or subscriber device in the pixilated computer image. The representative position of the transponder or subscriber device is determined as to whether the pixilated computer image falls on a pixel that is flagged as being in the geographical area, region or space.

The present disclosure provides a solution for providing wireless communication devices with relatively precise location awareness, system monitoring and area-specific messaging capabilities in environments where an accurate GPS position may not be able to be acquired, such as within a multi-story building.

The system-monitoring component performs health checks and validity tests on location nodes within an enabled environment, while the area-messaging component provides area-specific messaging to enabled wireless communication devices.

As used in this disclosure, "location node" is a stationary programmable device with a wireless transceiver, which is "Bluetooth™", capable for example, and a micro-controller. The location node is preferably programmed with one or more of its own device or "friendly" name-selection parameters, geographical positions, max power settings, installation identifiers, floor numbers and payload types.

A wireless communication device operable to detect a plurality of location nodes is disclosed. A wireless communication device periodically interrogates its environment and determines which location node is most practically near. The wireless communication device then communicates to that location node, and requests that any additional data information relevant to the specific location associated with that location node be sent back to the wireless communication device.

The most practically near node is defined as the node that is located at the closest accessible location to the movable entity. For example, a wireless communication device located on the second floor of a multi-story building may be closest to a location node located on the ceiling of the first floor, and may be next closest to a location node located on the second floor. Although the location node on the first floor is actually closer in distance to the movable entity than the location node on the second floor, since the location node on the first floor is not easily accessible to the movable entity located on the second floor, the location node on the second floor will be considered the most practically near node to the movable entity.

In one or more embodiments, the present disclosure relates to a system and method for the monitoring of and messaging to wireless communication devices within a predefined space, wherein the wireless communication device can be any wireless communication device with receiving and transmitting capabilities such as a cell phone, PDA, lap top computer, desktop computer and pager. The system and method utilizes, in its simplest form, at least two elements: at least one wireless communication device and at least one location node. When the system is activated, the wireless communication device will determine all of the location nodes within range. The wireless communication device will then determine the location of the most practically near location node. The wireless communication device can then request information specific to its location from this most practically near location node.

It should be appreciated that for simplicity and clarity of illustration, elements shown in the Figures and discussed below have not necessarily been drawn to scale. For example, the dimensions of some of the elements are exaggerated relative to each other for clarity.

Management and monitoring devices of assets and individuals that use ground positioning systems allow users to track the position of individuals, vehicles, cargo and other movable entities. The method and system described below utilizes a transponder or subscriber device that communicates over cellular and satellite communication networks in combination with GPS satellites capable of providing position and status information of the movable entity on a global scale. Additionally there is the ability for more precise monitoring of assets and individuals. The transponder or subscriber device allows interaction with and control of a wide range of peripheral devices, including, but not limited to, operating the movable entity according to pre-configured geographical zones and triggered events.

A transponder or subscriber device can be mounted, attached, manufactured or otherwise included upon or in various articles or entities. Such individuals, articles or entities may include vehicles, aircraft, cargo, persons, animals or any other item where tracking its movement and/or location is beneficial. Within the context of the disclosed tracking system, the transponder or subscriber device works to collect, process and communicate information about the movable article or entity to which the transponder or subscriber device is associated. Furthermore, when requested, the transponder or subscriber device can issue various commands and instructions to the local article, entity, and/or command center.

The transponder or subscriber device has the features, flexibility, and capability of an intelligent device. The transponder or subscriber device may contain a Central Processing Unit (CPU). The CPU has at least a 4-bit processor, which can interface with at least one modem (cellular, satellite, and others), at least one GPS receiver, at least one memory module, and/or other peripheral devices. Other components of the transponder or subscriber device may include, but are not limited to, at least one GPS antenna, at least one modem antenna, at least one serial port for communication and configuration, and at least one multiple connector pin which contains at least one input and at least one output. The at least one input and output are configurable to be associated with a configurable event or configurable operation.

The transponder or subscriber device can include many different combinations of the components listed above and/or similar components. For example, a transponder or subscriber device may have two modems, where one modem is a satellite modem and one modem is a cellular modem. Additionally, a transponder or subscriber device can contain a Bluetooth™ equipped receiver, Bluetooth™ equipped transmitter, Bluetooth™ equipped transceiver, and/or GPS receiver in combination with the other components. In one or more embodiments, any or all of the components are co-located on the same integrated circuit (IC) chip within the transponder or subscriber device. The components of the transponder or subscriber device depend upon which capabilities the movable entity requires.

Among its many capabilities, the CPU of the transponder or subscriber device can be configured to manage configurable events or configurable operations. Managing events means that among other capabilities, the transponder or subscriber device can report, observe, recognize, process, and analyze numerous configurable events or configurable operations. In addition, the transponder or subscriber device can give and respond to various commands, effectuate numerous events in its local installation, and contain a history recording component.

An event message can be triggered by physical and logical events including the event message itself and/or other such information. Other such information includes, but is not limited to, latitude, longitude, elevation, speed, direction, time, state of all the inputs, state of all outputs, event reason or source, and/or any other relevant information concerning the entity.

The transponder or subscriber device is configurable to include as few or as many configurable logical events or physical events as the user desires. Events may be physical or logical. Logical events may be based on rules using a combination of the GPS position of the movable entity, and one other factor, such as time or speed. However, logical events can be based upon a combination of factors. Physical events are those events that are physically manifested by the individual, the vehicle, or the object being tracked.

Other configurable events or configurable operations include the location of the vehicle, individual or object in terms of latitude, longitude, and/or elevation; the time and corresponding location of the last configurable event reported; the direction of the vehicle, individual or object; the state of any assigned inputs or outputs or change thereof; a pre-selected distance; a pre-selected time interval; pre-selected intervals based upon date and time reference; a pre-selected schedule for reporting and recording any of the configurable events or configurable operations; a pre-selected speed; length of relative stationary time; and length of non movement for an individual or object.

Additional configurable events or configurable operations include the entering or exiting of a pre-set waypoint or a pre-set zone in a multi-dimensional space such as two or three dimensions being the longitude, latitude and elevation coordinates, namely the x, y and z coordinates. A waypoint is a circular, cylindrical, or spherical area defined by a geographical center point and radius in the multi-dimensional space. The area or space defined by the waypoint is configurable by changing the radius and the position of the geographical center point. A zone is an irregular region defined by a series of line segments enclosing an area or space.

The configurable events or configurable operations or combinations thereof can be processed in order to transmit a specific message, respond to a specific query or command, enable or disable a specific mechanism, or recognize a specific event. For example, the CPU can be configured to process that, if at a pre-selected time the individual, vehicle or object has not moved a pre-selected distance, then the transponder or subscriber device is sent a command to alter the state or conditions of the individual, vehicle, object, transponder or subscriber device.

The configurable events or configurable operations may occur in many situations. These situations include, but are not limited to, where configurable events or configurable operations occur in response to a command; where configurable events or configurable operations occur in response to a query, or where configurable events or configurable operations occur upon recognition of pre-selected conditions.

Configurable boundaries or geographical zones may also be employed and can be configurable to any shape the user desires. For example, the boundary or zone can trace the border of a building, floor of a building or structure, part of a building, part or whole of a facility, a campus, a select portion of a building falling within a GPS address designation, a state line, or trace the route of a selected highway or path. The boundary or zone can trace the border of the premises of a school zone, a no-fly zone, a city, etc. The boundary or zone can also be a geometric shape or non-geometric shape in a multi-directional coordinate sense. A further benefit of the present disclosure is that the transponder or subscriber device can be updated and configured locally or wirelessly.

FIG. 1 illustrates the high-level architecture of a computer system for controlling and monitoring movable entities including, but not limited to, vehicles and people. A plurality of vehicles 110 has at least one transponder or subscriber device 105 that can be tracked and allows the functionality to remotely control functionality of the vehicle 115 or an individual 115a.

The transponder or subscriber device 105 connects with a plurality and any combination of communication networks. In one embodiment, such a communications network is a cellular network including multiple cellular base stations 120 and service providers 135. In another embodiment, such a communications network is a cellular network including multiple cellular base stations with SMS receivers 125 and service providers 140. In another embodiment, such a communications network is a satellite network including multiple satellite receivers and transmitters 130 and satellite ground stations 145. In yet another embodiment, such a communications network is a shortwave radio communications network.

The communications network permits the transponder or subscriber device 105 to communicate with a backend control system 150. The transponder or subscriber device 105 sends event information to the backend control system 150 and responds to commands sent to the transponder or subscriber device 105 by the backend control system 150 through the communications network. The backend control system 150 includes a plurality of gateways 151, 152, 153 and 154 which interact with a codec 155. The codec 155 is the central codifier and decodifier of the backend control system 150 and allows the backend control system to adapt and communicate with any communications network. The modular design enables the introduction of new hardware and network protocols without having to change monitoring and reporting software. The backend control system 150 also includes an asynchronous routing system 159 that allows incoming and outgoing communications to be handled asynchronously and efficiently. In one embodiment, the asynchronous routing system 159 includes a plurality of routing services 156, at least one database 157 and a web server 158. The messages routed by the routing services 156 are directly communicated to a client console 176. The client console 176 presents vehicle 115 and transponder or subscriber device 105 information to the operator. The client console 176 sends commands to the transponder or subscriber device 105 through the backend control system 150 and a communication network.

Multiple applications may connect to the central database 157 to provide further system functionality. An administrator console 175 permits operators to add, edit or delete transponder or subscriber device 105 information, vehicle 115 or individual 115a information, user information, etc. A history processor console 174 allows an operator to view reports and replay event data. An operations data processor 173 permits an operator to define geographical zones and waypoints for operation of the transponder or subscriber device 105. A configuration utility 172 permits operators to easily configure the transponder or subscriber device 105 features and functionality.

Vehicle or individual information can be presented to the operator through alternative mediums besides a client console 176. In one embodiment, vehicle information can be presented to an operator through a website or an email by transmitting such information from a web server 158 via the Internet 160 to a web client 171. In another embodiment, vehicle information can be presented to the operator by sending a text or voice messages to a predetermined wireless device 180.

FIG. 1 illustrates the wireless connectivity of the transponder or subscriber device 105 on a vehicle 115 or an individual 115a. The transponder or subscriber device 105 receives radio signals from a GPS constellation satellite 130 allowing the transponder or subscriber device 105 to process positioning information. The transponder or subscriber device 105 can communicate wirelessly to various networks through multiple wireless devices integrated in the transponder or subscriber device's 105 hardware such as short range radio 154, a cellular receiver 120 and 125, and a satellite 130.

Transponder or Subscriber Device Hardware Configuration

Figure 2:
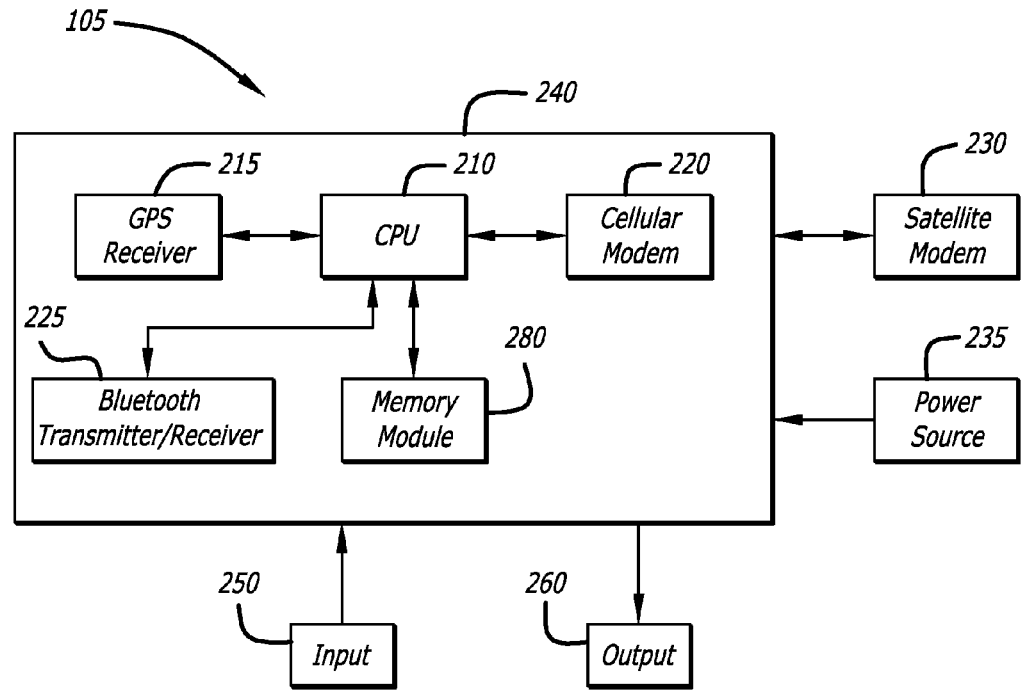
FIG. 2 illustrates a component layout of a transponder or subscriber device used in a system for controlling and monitoring movable entities.

FIG. 2 illustrates the internal board 240 of the transponder or subscriber device 105. The transponder or subscriber device board 240 contains at least one GPS receiver 215, at least one CPU 210, at least one cellular modem 220, and at least one memory module 280. At least one Bluetooth™ transmitter/receiver 225 can be included in the internal board 240. The Bluetooth™ transmitter/receiver 225 can be implemented as a transceiver, as a separate transmitter and receiver, a transmitter alone, or a receiver alone. In one embodiment, the tracking system uses utilizes both cellular and satellite networks to provide the most affordable and complete global coverage.

The GPS receiver 215 is capable of positioning accuracy to within a few feet or less. For example, a 12-Channel Trimble SQ, Lapaic UV40, or small-range accurate receivers are contemplated.

The processor 210 is at least a 4-bit processor. The processor 210 includes at least 1 Kilo-byte of RAM. For example, a Motorola MMC2114 32-Bit RISC processor with two built-in UART's is contemplated. However, a similar or more advanced processor is also contemplated. The memory module 280 includes at least two additional memory chips, wherein each additional memory chip is at least 128K.

In one embodiment, the cellular receiver or cellular modem 220 is the primary means for communication. The cellular modem 220 interfaces with at least one on-board processor's built-in serial ports. The cellular modem 220 may be a GSM, CDMA or similar modem. The satellite modem or transceiver 230 is external to the transponder or subscriber device 105 and is connected by a serial port. In one embodiment, the satellite modem 230 is located under fiberglass or any other non-metal material in order to provide maximum coverage. The satellite modem 230 is used primarily when there is little or no cellular coverage, or when the user specifies use of the satellite modem 230. The efficient use of the satellite modem 230 functions to lower the cost of the tracking system to the user. One embodiment contemplates a satellite modem 230 such as a Sky Wave DMR-200 satellite modem. Similar contemplated satellite modems include features including, but not limited to, incorporating a built-in omni-directional antenna, providing worldwide coverage, and efficiently interfacing with the transponder or subscriber device's processor 210.

The Bluetooth™ transmitter/receiver 225 has a range of at least 20 meters. For example, in one embodiment, a National Semiconductor Simply Blue LMX9820 Class 2 Bluetooth™ module is contemplated. However, similar or more advanced Bluetooth™ transceivers, transmitters, and/or receivers as well as any other transceiver, transmitter, or receiver that allows for radio connectivity and does not require a line of sight are contemplated. Preferably, the Bluetooth™ transmitter/receiver 225 is installed to utilize different capabilities such as integrating and supporting multiple wireless peripherals, acting as a shortwave radio to download data, or to serve as a local, traveling wireless "hotspot."

In one embodiment, the power source of the transponder or subscriber device, is a fused main power-in source with a recommended operating in a range between 12 and 24 volts. One embodiment contemplates low power consumption (65 mA or less) during normal operation. Furthermore, the transponder or subscriber device 105 includes circuitry for charging an optional backup battery. If the primary power source supply is below a minimum acceptable level, the transponder or subscriber device 105 will automatically switch to a backup power source as well as transmit a message identifying that the primary power source is at a critically low level.

Figure 3:
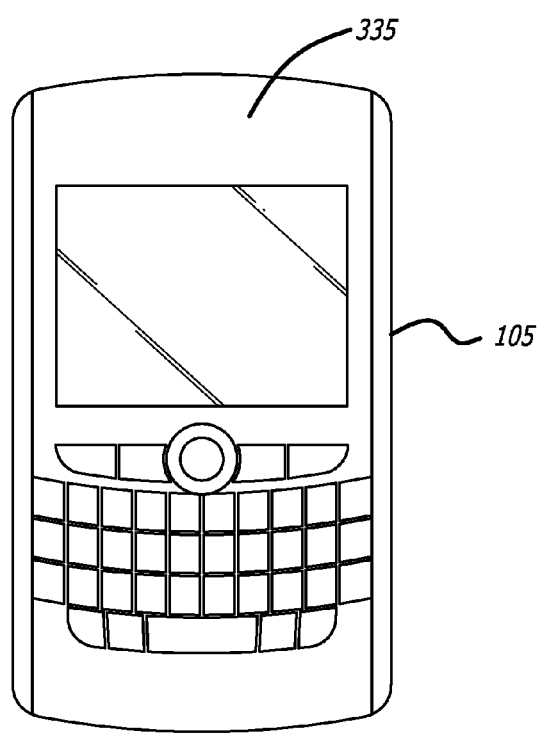
FIG. 3 illustrates a view of the exterior screen of the transponder or subscriber device, in the sense of a PDA incorporating a cell phone, in a system for controlling and monitoring movable entities.

The transponder or subscriber device 105, such as a cell phone or PDA, is a small and affordable unit with numerous features. The external view of the transponder or subscriber device is illustrated in FIG. 3. In one embodiment, the housing 335 of the transponder or subscriber device 105 is manufactured from plastic, metal, or any other material that functions to protect the inner components from external events such as physical damage, dust, water, excessive temperatures or any other event which could affect the integrity of the transponder or subscriber device. In one or more embodiments, the transponder or subscriber device 105 contains external communication ports, a multiple pin connector, at least four control outputs, a modem antenna connector, several indicators and/or a GPS antenna. In another embodiment, a Bluetooth™ antenna is incorporated in the transponder or subscriber device 105.

There can be a passenger counter, which can interface with several door infrared motion sensors for the purpose of counting the number of people entering or exiting from at least one door of, for instance, a building or a room. A serial port can also be used to test and configure applications within the transponder or subscriber device 105. In one embodiment, the serial port functions as a programming port which is used when programming the unit for the first time or re-programming the unit's core program.

The indicators associated with the transponder or subscriber device 105 can be for any type of connection, signal, power level, status, and any other similar communications. In one embodiment, an indicator is a light-emitting diode (LED) that appears red when the transponder or subscriber device 105 has power connected to it. Another indicator can be an LED that blinks green at a rapid pace when the GPS receiver is establishing a connection and slowly blinks green when a connection is established. Another indicator can be an LED light that blinks green for every message received, and red for every message sent. Another indicator can be an LED that is red when the cellular modem 220 is roaming, and is green when it is at home.

Transponder or Subscriber Device Firmware Configuration The transponder or subscriber device 105 has numerous features, functions, and capabilities described below. The transponder or subscriber device 105 is an intelligent device controlled by an at least 4-bit processor 210. FIG. 2 depicts one embodiment where the processor 210 has the capability to interface with a GPS receiver 215, a cellular modem 220, a Bluetooth™ transmitter/receiver 225, a memory module 280, and a satellite modem 230.

The transponder or subscriber device 105 can be configured to report, observe, and analyze numerous logical events. The transponder or subscriber device is also configurable to give and respond to various commands, and contains a configurable history-recording component. A further benefit of the present disclosure is that all the configurations to the transponder or subscriber device 105 can be done locally or wirelessly. Thus, the user is able to configure any features including the entire operating system of the transponder or subscriber device wirelessly. This wireless configuration can be accomplished through the use of the cellular modem 220, the Bluetooth™ transmitter/receiver 225, or any other wireless means.

Moreover, the transponder or subscriber device 105 can be configured locally through connecting to a serial port. Another benefit of the present disclosure is that during wireless or local configuration, the transponder or subscriber device 105 continues to operate normally. This means that the transponder or subscriber device 105 can be configured with losing little to no operability. Wireless configuration commands change the parameters used for processing physical and logical events on the fly. Wireless operating system updates are achieved using two executable code spaces, and a temporary code space for loading new code. Once the uploading of new code into the temporary code space is completed, the transponder or subscriber device reboots, copies the new code into the secondary executable code space, and resumes execution with the most recent update.

Figure 4:
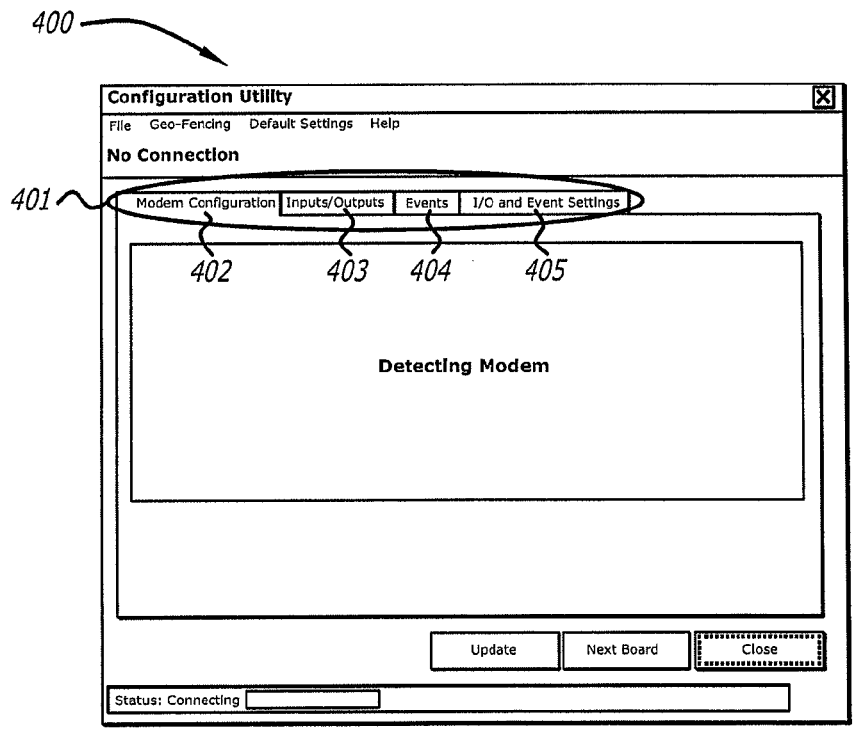
FIG. 4 illustrates a view of the exterior screen of the transponder or subscriber device that depicts the configuration application of the system for controlling and monitoring movable entities.

FIG. 4 is an exemplary screen shot of the user interface for configuring the physical and logical events within the transponder or subscriber device in one embodiment. FIG. 4 serves only as an example of a general interface, with which the user can interact to configure the transponder or subscriber device 105. One feature of the present disclosure is that configuring the transponder or subscriber device does not require the user to know scripts or hard-coded parameters. Instead, the present disclosure includes a software application with which the user can easily interface via logical windows, tabs, fields, checkboxes and radio buttons to configure the transponder or subscriber device.

FIG. 4 is a screen shot of a window that interfaces with the user to configure the transponder or subscriber device 105. The window 400 has at least four tabs 401 from which the user can choose. The first tab 402 directs the user to a window 400 for configuring the cellular modem 220 of the transponder or subscriber device 105.

Events can be physical or logical. Physical and logical events trigger the sending of a message over the air when certain conditions are met. Most logical events are based on rules using a combination of the GPS position and one other factor, such as time or speed. The event message triggered by physical and logical events includes, but is not limited to, the event message itself, and such information including latitude, longitude, speed, direction, time, state of all the inputs, event reason or source, and any other relevant information. The logical events are usually software driven, calculation based, and typically draw from GPS positions and/or positions from location nodes. The transponder or subscriber device 105 is configurable to include as few or as many logical events as the user desires. One embodiment includes at least six different configurable logical events.

The first logical event of one embodiment is a feature that reports the last known location of the transponder or subscriber device for a specified interval of time. The status report to the user may consist of other parameters such as latitude, longitude, speed, direction, time and the state of the inputs. An example of a first logical event is where the user configured the time reporting interval for 60 seconds. This means that in this scenario, the last known location status and applicable parameters are reported every 60 seconds. This time-reporting feature gives the user flexibility, and the option to lower the cost of data transmission.

The second logical event of an embodiment is a feature that further refines the reporting capabilities of the time reporting feature. This event is Smart Time Reporting. The Smart Time Reporting feature functions to transmit a report only when the vehicle has moved a pre-selected distance since the last transmitted report. Thus, a user could configure the transponder or subscriber device 105 to report its location and applicable parameters by selecting a timed reporting interval in terms of seconds and a distance in terms of meters. For example, a user could select the time reporting interval for 60 seconds and the distance for 1000 meters. This would mean that every 60 seconds the transponder or subscriber device would send a report unless the transponder or subscriber device 105 has not moved at least 1000 meters since the last report. This Smart Time Reporting feature allows the user to tailor the amount of reporting and, thus, tailor the cost of data transmission.

Another contemplated reporting feature is a scheduled reporting feature. This feature sets the transponder or subscriber device's reporting feature on an interval based upon a date and time reference. Thus, the user can configure the transponder or subscriber device to report location and the other parameters on pre-selected days and hours of the week, month, or year. For example, a user could use the scheduled reporting feature to configure the transponder or subscriber device to only report at 8 am, 12 pm and 4 pm on weekdays and only once per weekend day. Another feature not depicted is a satellite scheduled reporting feature where the same scheduled reporting capabilities are applicable, only the message is transmitted via an optional satellite modem 230.

A third logical event of an embodiment is a speeding feature. The transponder or subscriber device 105 can be configured to send reports dependent on the speed or movement of the individual, vehicle or article the transponder or subscriber device 105 is associated. Thus, events are generated and recorded when a speed threshold has been exceeded, and when the speed has crossed below the threshold. When the transponder or subscriber device 105 crosses back below the threshold, an event message indicating this occurrence as well as a third message is transmitted indicating the maximum speed reached during the period when the transponder or subscriber device 105 was above the speed threshold. The speed time filter gives the user the option to set a time period in terms of seconds to allow the individual, vehicle, or article to cross the speed threshold without sending a message. This filter also allows for efficient data transmission. For example, the user can set the speed time filter for 15 seconds, which allows the vehicle to speed for 15 seconds without sending a report. Similar to the other logical events, the event message can also include information such as the latitude, longitude, elevation, speed, direction, time, and state of the inputs.

The transponder or subscriber device 105 can be configured to send reports dependent on the amount of time the individual, vehicle or article has been essentially relatively stationary. The event message records the time and location corresponding to when the threshold was exceeded.

Geofencing

The next logical event of one embodiment is a "geofencing" feature, which is the creation of a configurable boundaries or geographical zones feature. This feature consists of generating events when the transponder or subscriber device travels through waypoints and zones. A configurable boundary or geographical zone may be constructed through a combination of waypoints and/or zones. Because of this combination, the configurable boundary or geographical zone can be constructed in a very specific shape, which allows for the outlining of specific borders or routes. A waypoint is a circular area, cylindrical area, or spherical area defined by a geographical center point and radius. The area defined by the waypoint is configurable by changing the radius and the position of the geographical center point. Thus, the boundary created by the waypoints and zones is configurable.

In one embodiment, the transponder or subscriber device 105 is loaded with a plurality of waypoints, each waypoint is defined by a coordinate and a radius. A zone can be defined by a plurality of waypoints. Thus, for example, a building, campus, part of a building, and/or a city can be defined by two waypoints in multiple dimensions.

Using GPS data, the transponder or subscriber device, for example, can calculate whether it is located within two waypoints that define a city in two dimensions or three dimensions, namely longitude, latitude, and elevation. If the transponder or subscriber device determines that it is located inside one of the two waypoints, then the transponder or subscriber device 105 assumes that it is within the limits of the city.

The third dimension, namely the elevation, is defined by nodes located at different levels of elevation with which the transponder or subscriber device communicates. Also, more precise longitude, latitude, and elevation coordinates can be defined by the nodes, in a manner normally beyond GPS precision and ability.

A zone is an irregular region defined by a series of line segments enclosing an area. In one embodiment, each zone contains 3 to 256 or more deflection points for creating the line segments defining this irregular area. In one embodiment, this irregular area can create a configurable boundary or a geographical zone. The properties of a zone include a name, description, and a flag determining if the zone is an off-limits zone or an enclosed zone.

In one embodiment, a geographical zone may be created by selecting a plurality of coordinates and downloading the coordinates to the transponder or subscriber device 105. The plurality of coordinates may be in the Mercator system. Next, the transponder or subscriber device 105 assigns each coordinate to a pixel in a pixilated image that is loaded in the transponder or subscriber device 105. In order to perform the assignment, the transponder or subscriber device 105 utilizes logic to define a "bounding" square or box around the plurality of coordinates. Then the bounding box is pixilated, and the pixels where all the coordinates fall are marked as activated. Once the pixels for each coordinate are assigned, lines are extended from one pixel to the next so as to form an enclosed area in the pixilated image. The pixels that lie in the path of the lines between the activated pixels are also activated. Thus, an enclosed and contiguous line of pixels is formed.

Waypoints and zones are built by the operations data processor 173. Once a waypoint and/or zone has been built, it can be used with the transponder or subscriber device loads. Transponder or subscriber device loads are a collection of zones and waypoints slated to be loaded on a transponder or subscriber device 105. These loads are loaded onto the transponder or subscriber devices with the configuration utility 172.

Figure 5A:
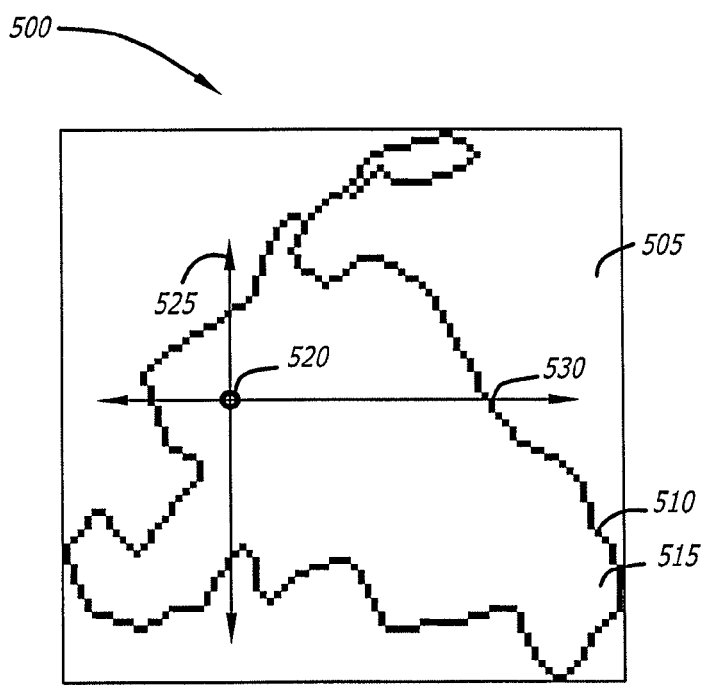
FIG. 5A illustrates a pixel map of a zone.

FIG. 5A illustrates a pixel map 500 of a zone in a broad two-dimensional sense. After all the deflection points for a given zone are uploaded, the zone is saved in the memory module 280 of the transponder or subscriber device 105 in the form of a pixel map 500. The pixel map 500 is created by first drawing a square around the entire area of the zone. In one or more embodiments, the square is then divided into an 80/80-pixel map. Each pixel 505 is a square. These squares are then used to draw the outline shape 510 of the zone 515. A geographical area is then mapped to each pixel 505 of the pixel map 500. A position fix 520 in the pixel map 500 is mapped from the current geographical location of the individual, vehicle, or article. In another embodiment, the pixel map 500 of a zone can be depicted in a broad three-dimensional sense.

A test is performed for each zone for each position fix 520 in order to determine if the transponder or subscriber device 105 is located inside the zone 515 or outside the zone 515. Thus, for each zone 515, the test starts with a simple check to determine if the position fix 520 is located inside or outside the pixel map 500. If the current position fix 520 is located inside the pixel map 500, a more extensive test is completed by plotting the position fix 520 inside the bounding box, and drawing at least four lines in at least four directions (for example, north, south, east and west) 525 from the position fix 520 to the borders of the pixel map 500. Subsequently, the number of zone boundary crossings 530 is counted for each of the at least four lines 525.

Multiple boundary crossing tests are performed for accuracy. In one or more embodiments, if a given line 525 crosses an odd number of zone boundaries 510, the position fix 520 is considered to be located inside the zone 515. In one or more embodiments, if a given line 525 crosses an even number of zone boundaries, the position fix 520 is considered to be located outside the zone 515. In one or more embodiments, if at least three out of the at least four boundary crossing tests agree, the zone boundary crossings 530 are used to determine if the position fix 520 is located inside or outside the zone. In one or more embodiments, if three out of the at least four boundary tests do not agree, the position fix 520 is considered to be outside the zone 515.

Position fixes 520 that are on the special locations in the pixel map 500 can yield specific location results. In one embodiment, position fixes 520 that land on a zone boundary 510 are determined to be located outside the zone boundary 510. In another embodiment, position fixes 520 that land on a zone boundary 510 are determined to be located inside the zone boundary 510. In one embodiment, position fixes 520 that land on a "long and narrow protrusion", which is only one pixel wide, can be considered to always be located inside the zone 515. In another embodiment, position fixes 520 that land on a "long and narrow protrusion", which is only one pixel wide, can be considered to always be located outside the zone 515.

Figure 5B:
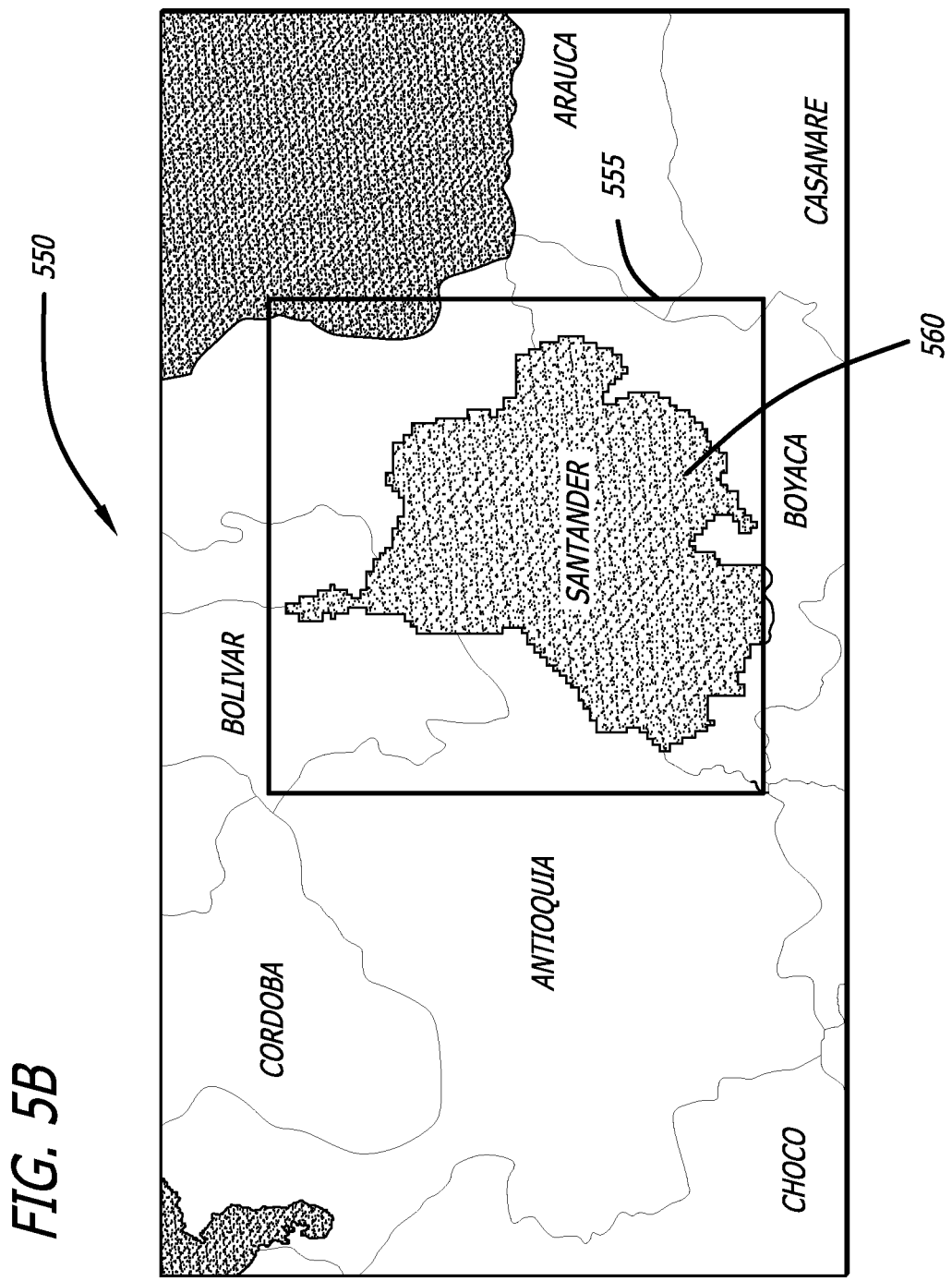
FIG. 5B illustrates a pixel map of a geographical zone.

FIG. 5B illustrates a pixel map 550 of a geographical zone in a two-dimensional sense. The pixel map 550 is first presented to the user as a geographical map on a screen connected to a computing device. In one embodiment, the user selects a rectangular shape 555 around the geographical area 560 that the user desires to define. In another embodiment, the user may define a customized shape, which may be either two or three dimensions. The rectangular shape is then divided into smaller rectangles such that the area of the rectangle is divided into a grid. Each pixel in the grid can be activated to be part of the geographical zone. In one embodiment, the user may activate each pixel by double-clicking on each pixel. In another embodiment, the user may select a smaller rectangular region, and mark the smaller rectangular region as being part of the geographical zone 560 so that the pixels contained within the smaller geographical zone are activated. In yet another embodiment, the user may select a circular area as being part of the geographical zone 560, and all the pixels located in such circular area would be activated. In another embodiment, the user may define any customized two- or three-dimensional geometrical or non-geometrical shape.

Once all the desired pixels are selected by the user as being part of the geographical zone 560, the rectangular shape 555 is mapped into a pixilated computer image. In one embodiment, the pixilated computer image contains the same number of pixels as the number of sections in the grid. The pixilated computer image can then be loaded to the transponder or subscriber device 105. The transponder or subscriber device 105 can be programmed to determine the position of the entity with a simple calculation of whether the pixel in which the transponder or subscriber device's location falls is activated or deactivated. In another embodiment, the geographical zone is defined by selecting a two-dimensional rectangular region, a three-dimensional rectangular region, a circular region, cylindrical region, and/or a spherical region. The circular region, cylindrical region, and/or spherical region can each be defined by a waypoint.

An irregular zone or geographical zone may be defined by a collection of waypoints and pixilated images. Furthermore, each irregular zone may have additional parameters including, but not limited to, a speed threshold of the entity parameter, a flag parameter such as a flag indicating a "no-fly zone", a color coded parameter such as a specific color being used to indicate a danger or security threat, and a communication enablement or disablement parameter.

When the transponder or subscriber device 105 enters or exits waypoints and zones, an event message is transmitted indicating what reference point or zone has been entered or exited. The event message can include a date relating to latitude, longitude, speed, direction, time, state of the inputs, odometer, event reason or source, and any other relevant information. Thus, the zone boundaries and waypoints allow the user to track an individual, vehicle, or article through configurable boundaries or geographical zones, such as a state border or a specified route.

In one embodiment, the waypoint and zone events are configurable to one or more assigned outputs. Meaning, when the transponder or subscriber device 105 enters or exits waypoints and zones, it can initiate an output. An output can consist of an LED light unit within the vehicle, article, and/or on the subscriber or transponder device associated with an individual.

Commands

The transponder or subscriber device 105 is also configurable to respond to various queries and to set commands sent wirelessly. A position query command can command the transponder or subscriber device 105 to return the last valid GPS position, position from the location nodes, speed, direction, time, input state, and other relevant state. The transponder or subscriber device 105 can also be configured to respond to a query. Upon receiving a query command, the transponder or subscriber device 105 will return to the last valid GPS position, position from the location nodes, speed, direction, time, input state, and other relevant state.

The transponder or subscriber device 105 is also configurable to respond to various query commands sent over the optional satellite modem 230. The satellite position query command commands the transponder or subscriber device 105 to return the last valid GPS position, position from the location nodes, speed, and time. The transponder or subscriber device 105 can also be configured to respond to a satellite odometer query. Upon receiving this query command, the transponder or subscriber device 105 transmits the state of its inputs and running odometer value. Examples of other forms of query commands that are sent to the transponder or subscriber device 105 include, but are not limited to, an Input and Output Signal Query, Analog to Digital Levels Query, Passenger Count Query, Firmware Version Query, Satellite Status Query, Satellite Position and Velocity Query, and Satellite IO Query.

Another optional command is the alarm acknowledgement. This command is sent to the transponder or subscriber device 105 to terminate the sending of a priority event (panic, medical or roadside assistance are examples of priority events). When the alarm acknowledgement is received, no further priority messages for the current event are transmitted.

In one embodiment, the command is to set a single output. This is used to wirelessly change the state of an output to either active or inactive. An example would be to unlock the back door of an armored truck when it arrives at the bank. Another example is to turn on the fuel pumps for a tanker truck when it arrives at a gas station.

In another embodiment, the command may be to send a text message from the transponder or subscriber device 105 through the communication network to a device configured to receive and interpret text messages.

In another embodiment, the command is a configuration command to configure functionalities of the transponder or subscriber device 105 as previously discussed. Examples of configuration commands include, but are not limited to, Configure Timed Reporting, Set Odometer, Upload New Firmware, Configure Excess Speed Event, Configure Excessive Idle Event, Configure Satellite Timed Reporting, Configure Power Level Critical, Configure Satellite Communication Port, Enable Event, Configure Priority Events, Enable Cellular Message, Enable Short-Range Radio Message, Assert Output Event, Configure GPS Filter, Enable Input, Set Passenger Count, Configure Smart Timed Reporting, Configure Scheduled Reporting, and Configure Satellite Scheduled Reporting.

The transponder or subscriber device 105 also may include a history reporting component. Whenever the transponder or subscriber device 105 cannot transmit data packets due to a lack of coverage via the principle communication media, the packers are stored in one of at least two history logs on an on-board flash memory storage device. When the transponder or subscriber device determines that the communication link has been re-established, any packets stored in memory are sequentially transmitted, beginning with those messages identified as a priority. For example, emergency or roadside assistance would be a priority message, which would be the first message transmitted when the connection is re-established.

In an effort to combat GPS drift, two parameters are included to filter GPS positions received from the GPS receiver. The two parameters are related to maximum allowed speed and maximum allowed acceleration. The parameters can be customized for a specific type of installation. If a packet is received from the GPS receiver and either of these two parameters is exceeded, the position packet is discarded.

Backend Control System

Figures 1, 6:
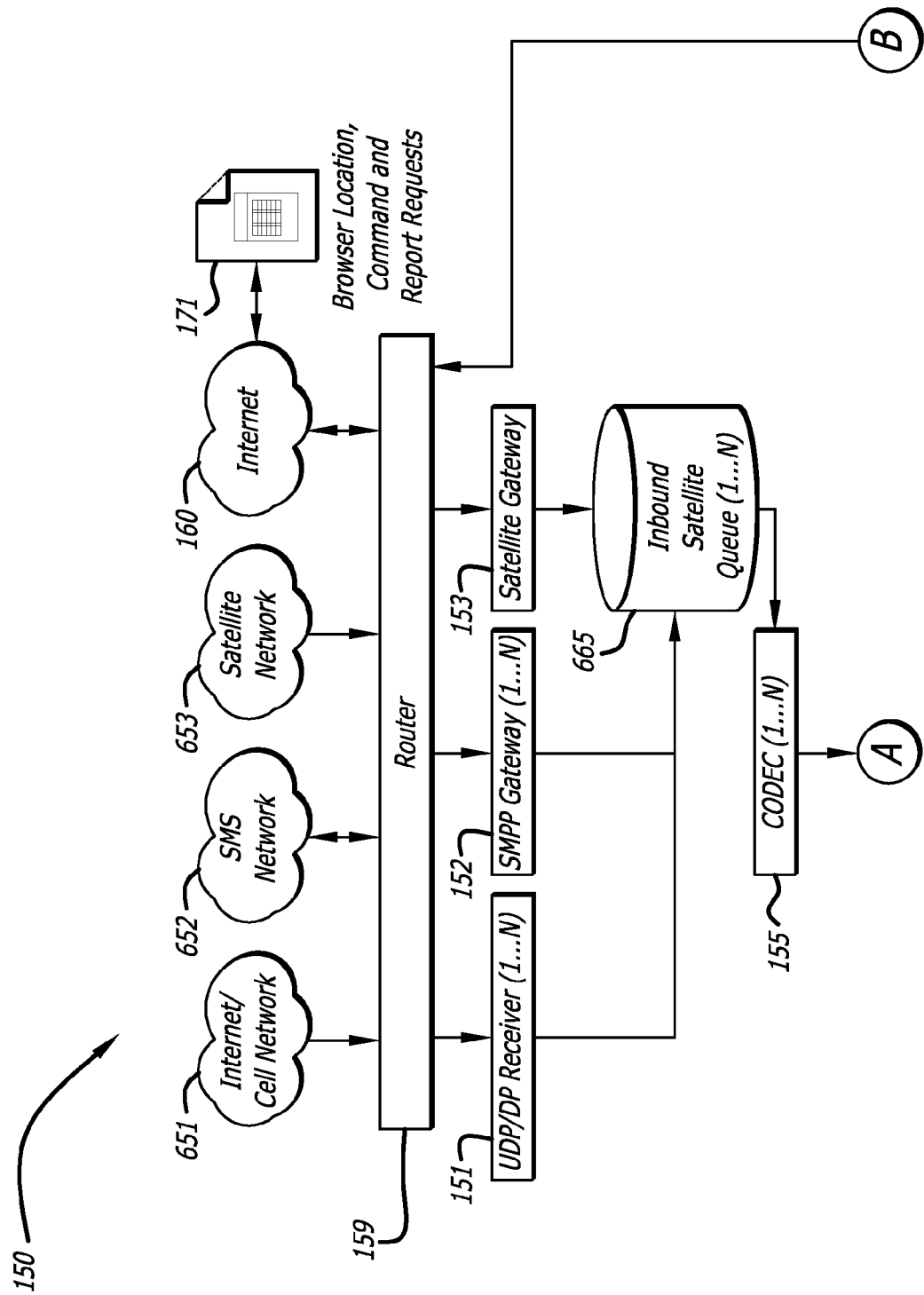
Figures 2, 6:
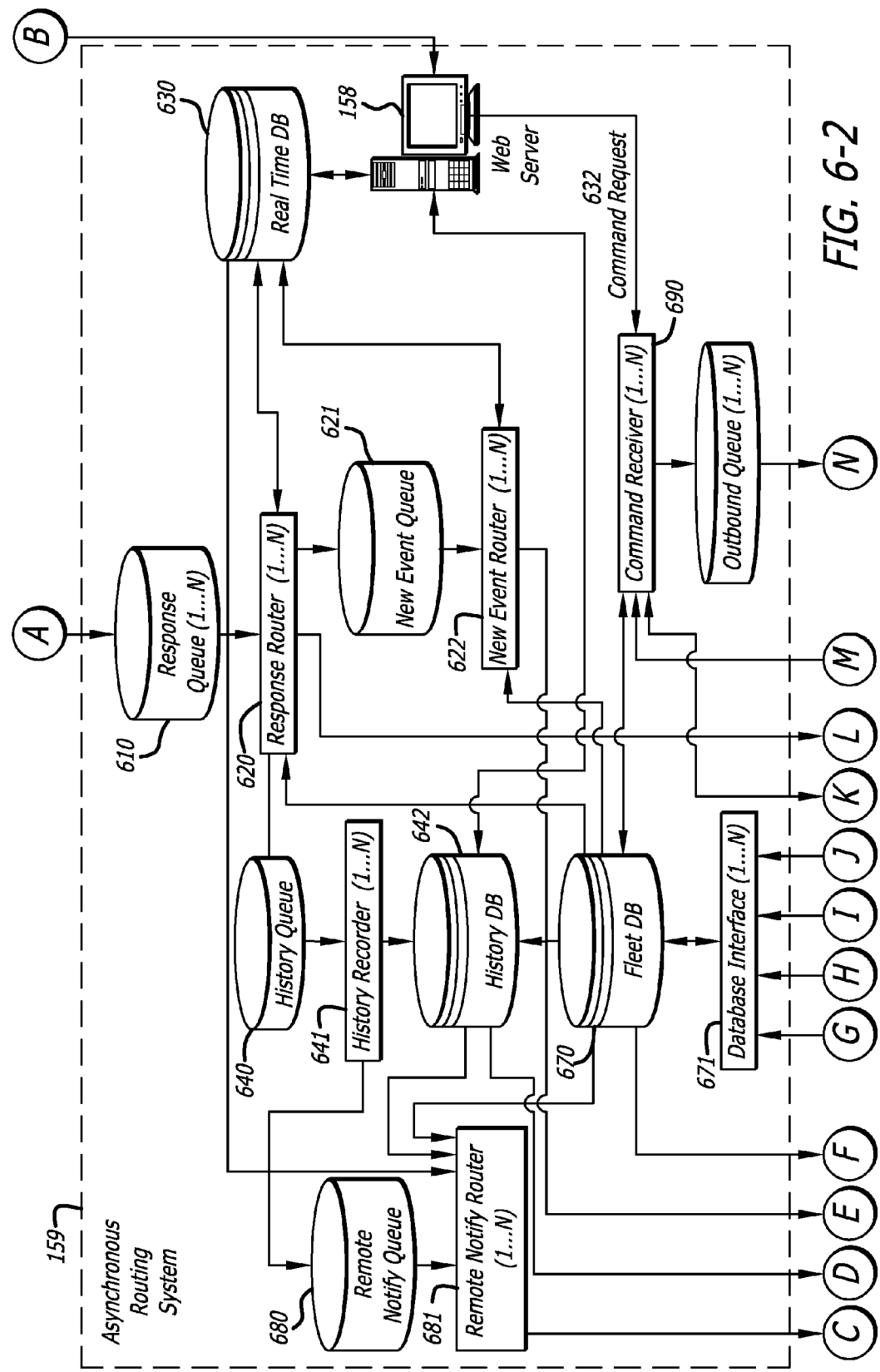
Figures 4, 6:
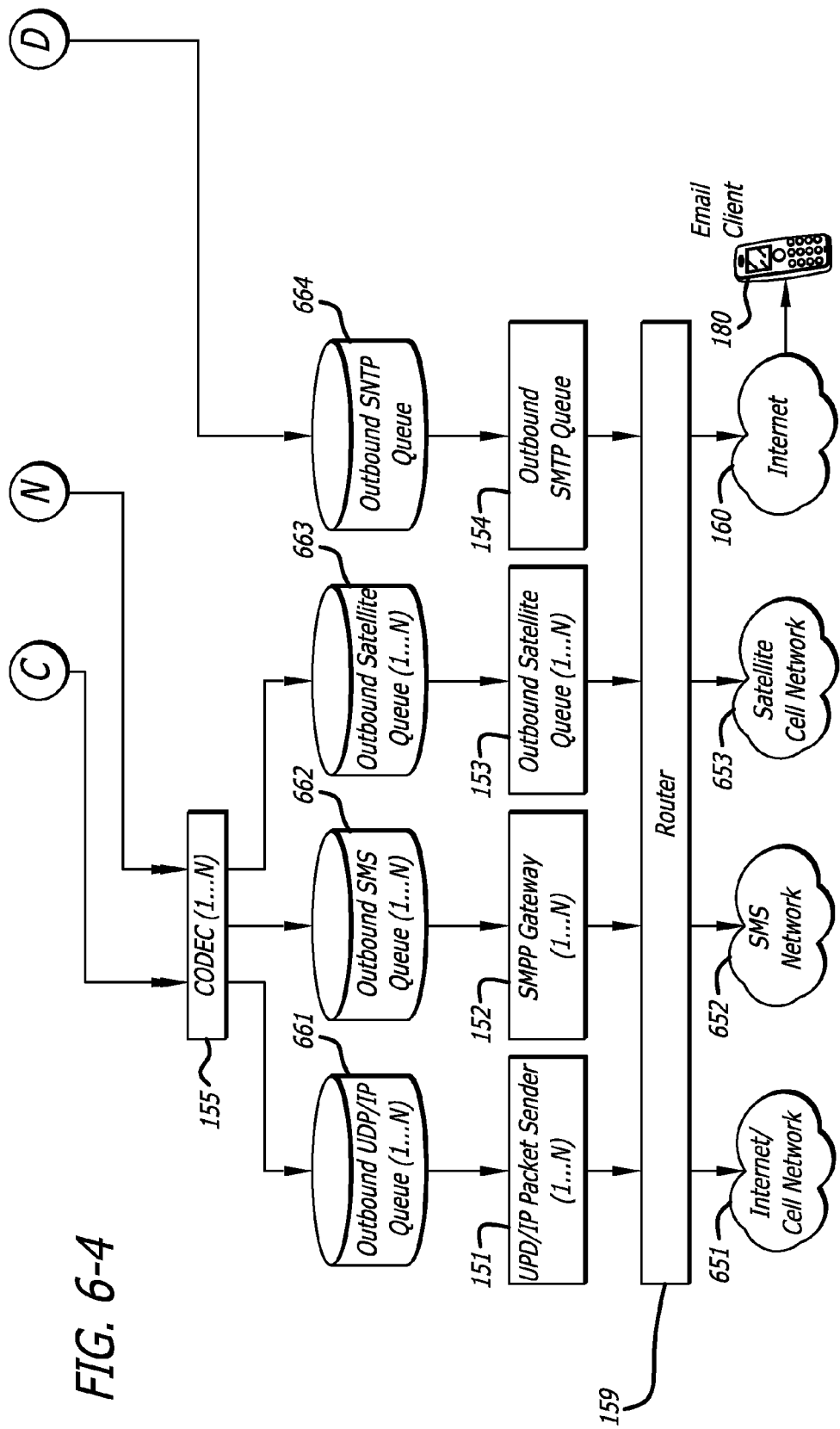

FIGS. 6-1 through 6-4 illustrate a backend control system 150 utilized for vehicle fleet control. The backend control system 150 includes at least a plurality of gateway systems 151-153, a codec 155, and an asynchronous routing system 159. In turn, as shown in FIG. 6-2, the asynchronous routing system 159 includes a web server 158, a plurality of router systems 620, 622, a real time database 630, a history database 642, and a fleet database 670.

The real time database 630 maintains records of the most recent information from the transponder or subscriber device such as location, speed, direction, and heading. The history database 642 maintains records of all events and transactions that were received and sent from the asynchronous routing system 159. Finally, the fleet database 670 keeps records of all the administrative entities such as the controlled mobile and static objects to which a transponder or subscriber device is associated (e.g. a vehicle, user, fleet, and object).

The backend control system 150 can be configured to run on any combination of computer servers. In one embodiment, the plurality of communication gateway systems 151-153 runs on independent computer systems. In another embodiment, the communication gateways 151-153 run on a common computer system.

The communications gateway systems 151-153 direct data flow from each of the transponder or subscriber devices 105 into the backend control system 150. The gateway systems 151-153 also direct commands and queries to the appropriate transponder or subscriber device 105. Each gateway establishes and maintains a communication link with a communications network 651-653. In one embodiment, the gateway is a Universal Datagram Protocol/Internet Protocol (UDP/IP) packet receiver and sender 151 which connects to an internet/cellular network 651. There may be more than one UDP/IP gateway 151 transmitting and receiving data. The UDP/IP gateway 151 allows the backend control system 150 to communicate with transponder or subscriber devices 105 over GSM/GPRS, CDMA/1×RTT, and CDPD networks using UDP packets.

In another embodiment, the gateway system is a Short Message Peer to Peer (SMPP) gateway 152 that connects with a Short Message Service (SMS) network 652. A plurality of SMPP gateway systems 152 transmit and receive data for the transponder or subscriber devices that communicate over SMS networks using an SMPP protocol. Each SMPP gateway system 152 opens and maintains a continuous connection to the service provider's Short Message Service Center (SMSC) for incoming data so that reception of the transponder or subscriber device's 105 data from the SMSC can be guaranteed.

In another embodiment, the gateway system is a satellite gateway 153 that connects to a satellite network 653. As illustrated in FIG. 1, the satellite network 653 may include one or more satellites 130, and at least one ground station 145. The satellite gateway 153 transmits and receives data for the transponder or subscriber devices 105 that communicate through satellite communication. In one embodiment, the satellite communication protocol used may be that of Inmarsat satellites using eight-byte packets of data. The satellite gateway 153 opens and maintains a continuous connection to the satellite network 653.

The communications between the asynchronous routing system 159 and the transponder or subscriber devices are channeled through an appropriate gateway system 151-154, as shown in FIG. 1. An appropriate gateway system 151-154 is selected based on a unique combination of transponder or subscriber device manufacturer, the communications protocol, and the service provider. For example, communications from a transponder or subscriber device 105 that uses CDPD communication protocol would be routed through a different gateway system 151-154 than communications from a transponder or subscriber device 105 that uses SMS communications protocol. Likewise, communications from transponder or subscriber devices 105 that use the same communication protocol such as CDPD, but have different service providers, would be routed through different gateways.

As shown in FIG. 6-4, as the gateway system 151-153 receives each inbound packet of data, the gateway system 151-153 labels each packet of data with the date and time of arrival, the transponder or subscriber device's 105 manufacturer information, and the transponder or subscriber device's 105 address information. The gateway system 151-153 then repackages the packet of data for transmission to the codec 155. The gateway 151-153 then places the repackaged data into a queue 665 that is read by a codec 155.

When the gateway system 151-154 receives an outbound packet from an outbound queue 661-664, the gateway system 151-154 uses the address information to send the packet to the target transponder or subscriber device 105. If required, the gateway system 151-154 verifies before transmission that the gateway system 151-154 has an open and valid connection to the corresponding network 651-654. Each gateway system 151-154 has at least one corresponding outbound queue 661-664. For example, each UDP/IP gateway 151 has at least one outbound UDP/IP queue 661. Each SMPP gateway 152 has at least on outbound SMS queue 662. And, each satellite gateway 153 has at least one outbound satellite 663. Also, each SMTP mail gateway 154 has at least one outbound SMTP queue 664.

After a packet of data is placed in the inbound queue 665, as shown in FIG. 6-1, the data coming from various networks is decoded into a standard data format. Likewise, before a packet is placed in an outbound queue 661-664, as shown in FIG. 6-4, the data going to different communications networks is coded from a standard data format into a network specific format. The coding and decoding of data is carried out by the codec (coder-decoder) 155. The codec 155 permits greater flexibility because the introduction of new communication network protocols is transparent to the asynchronous routing system 159. Thus, if a new transponder or subscriber device model uses a new communications network protocol, the backend control system 150 does not need to be upgraded. The system upgrades required would be a codec 155 update and a new gateway, if necessary.

When a packet of data comes into the asynchronous routing system 159, each inbound packet that the codec 155 receives is first examined to determine the transponder or subscriber device model. If the codec 155 supports the specified transponder or subscriber device model, the packet of data is translated from the transponder or subscriber device 105 proprietary format into a standard system format. Once the codec 155 has interpreted the data, the codec 155 then writes the data into a response queue 610, as shown in FIG. 6-2. If the codec 155 does not recognize the transponder or subscriber device model, the codec 155 logs the unsupported packet of data, and emails the packet of data to a designated system or network technician.

When a packet of data is sent from the asynchronous routing system 159, the codec 155 determines the transponder or subscriber device model to which the packet is sent. If the codec 155 supports the specified transponder or subscriber device model, the data is translated from the standard system format into the transponder or subscriber device 105 proprietary format. Likewise, if the packet of data is sent to another device that is not a transponder or subscriber device 105, the codec 155 determines if it supports that device, and if so, translates the packet of data to the appropriate format. Once the codec 155 has interpreted and encoded the data, the codec 155 places the packet of data into the queue that corresponds to the appropriate type of network communication protocol. An SMS data packet would be placed into the outbound SMS queue 662. If the codec 155 does not support the transponder or subscriber device model, the codec 155 will log the unsupported packet of data, and email the packet of data to a designated system or network technician.

Once a packet of data is processed by the codec 155, it then gets processed. How the packet of data is processed depends upon whether it is an outbound or an inbound data packet. Outbound data packets are placed in an appropriate outbound queue 661-664. Conversely, inbound data packets are received by the asynchronous routing system 159 and placed in a response queue 610, as shown in FIG. 6-2. The response queue 610 feeds the data packets to the response router 620. The response router 620 determines if a client console 176, as shown in FIG. 1, is tracking the transponder or subscriber device 105 associated with the incoming message. If so, the response router 620 routes the incoming message to the appropriate client console 176. Thus, the client console 176 receives the message before any other process in the asynchronous routing system 159. If no client console 176 is tracking the transponder or subscriber device 105 associated with the incoming message, the response router 620 places the incoming message into a new event queue 621. The new event queue 621 feeds the incoming message to a new event router 622. The new event router 622 analyzes each incoming message, and determines if the incoming message is associated with a new priority event for the transponder or subscriber device 105. The new event router 622 determines if the incoming message is associated to a new event by searching a real time database 630 for a similar event associated to the transponder or subscriber device 105. If no event is recorded for the transponder or subscriber device 105, or if the event is of high priority, the new event router 622 sends a routing request to all client consoles 176 that have permission to view the incoming message. The request is intermittently sent to the client consoles 176 until at least one client console 176 accepts the routing request. Once the routing request is accepted, the client console 176 adds the transponder or subscriber device 105 to an inventory in that client console 176 so that the incoming message can be handled.

Asynchronously, a history queue 640 receives the inbound and outbound messages for all transponder or subscriber devices 105. The inbound messages are fed from the history queue 640 to the history recorder 641. The history recorder 641 geocodes all data packets that have a valid latitude and longitude. The geocoded information is saved in a history database 641 to be used later for reporting and statistical analysis.

Incoming messages from transponder or subscriber devices 105 may also be forwarded to an email address, cellular telephone, or any other communications device. To achieve this functionality, the history recorder 641 also transmits the geocoded locations to remote notify routers 681 by placing the geocoded locations in a remote notify queue 680. The remote notify router 681 that receives the geocoded location and event information queries the fleet database 670 to determine whether the configuration information associated with the transponder or subscriber device 105 requires a notification to a communications device 180, as shown in FIG. 1. If a notification is required, the remote notify router 681 retrieves the contact information for the appropriate communications device 180. The remote notify router 681 then formats and encodes the message to be sent to the communications device 180. The message is placed in the outbound SMTP queue 664 to be sent through the SMTP gateway 154.

Alternatively, the message can be placed in the outbound SMS queue 662 to be sent through the SMPP gateway 152.

The real time database 630 is also updated with the new event information associated with the incoming message. Thus, the real time database 630 contains the latest information reported on a given transponder or subscriber device 105. The real time database 630 is connected to a web server 158. The web server 158 is directly connected to the Internet 160 and allows users of a web-tracking application 171 to make location requests, command requests 632, and report requests. When a web server 158 receives a location request from the web tracking application 171, the web server 158 queries the history database 642. The history database 642 contains all events in a chronological order. The web server 158 retrieves all transactions related to the web tracking application 171 query, and forwards the data to the web tracking application 171 for displaying to the user in a web browser.

When a web server 158 receives a location request from the web tracking application 171, the web server 158 queries the real time database 630 for the corresponding transponder or subscriber device 105 information. The real time database 630 provides transponder or subscriber device information as related to the very last incoming message from the incumbent transponder or subscriber device 105. The web tracking application 171 may also send a command request 632 such as a query as to the position of the transponder or subscriber device 105. The command request 632 is sent to the command receiver 690 which, in turn, processes the position request command by activating the appropriate transponder or subscriber device 105 information. The message is encoded by the codec 155, placed in the appropriate outbound queue 661-664 and sent through the corresponding gateway system 151-154 to the transponder or subscriber device 105. The transponder or subscriber device 105 will then send back a response. The backend control system 150 then processes the response, and accordingly updates the real time database 630. After the real time database 630 has been updated, the web server 158 may refresh the contents of the web tracking application 171, thereby showing the new position of the transponder or subscriber device 105.

The command receiver 690 processes all commands pertaining to all outbound messages to be sent to the transponder or subscriber devices 105. The command receiver 690 may receive command messages from the client consoles 176, the administrator consoles 175, and/or from the web servers 158. When the command receiver 690 receives a command message, the command receiver 690 labels each outbound message with the correct transponder or subscriber device 105 address by searching a fleet database 670, and retrieving the address information. Each message is sent by the command receiver 690 to the codec 155 for encoding.

All of the commands that are processed by the command receiver 690 are ultimately sent remotely to the transponder or subscriber device 105. In one embodiment, the command is a Position Query. Upon receiving this query command, the transponder or subscriber device 105 returns its last valid position, speed, direction, time and input state. In another embodiment, the command is an Odometer Query. Upon receiving this query command, the mobile products return their last valid GPS position, position from the location nodes, speed, direction, time, input state, and running odometer value. In another embodiment, the command is an Input/Output Query. Upon receiving this query command, the transponder or subscriber device returns its last updated state of all inputs and all outputs (e.g., active or inactive). For any given input, the active state is relative to the configuration of that specific input. For instance, if an input is configured to be active-low (H-L), then 0 volts at the input translates into that input being "active." If the input is configured to be active high (L-H), then 12/24 volts at the input translates into that input being "active."

In another embodiment, the command is a Time Report Set and/or Home Internet protocol (IP). This command is sent to the transponder or subscriber device to configure the reporting interval for the Timed Reporting feature of the firmware. This command can also be used for setting the transponder or subscriber device's destination IP address. This command allows the transponder or subscriber device to be reconfigured wirelessly in order to be able to transmit to a new control center or home address if the IP address of the control center or home address changed.

In another embodiment, the command is Set All Outputs. This command is sent to the transponder or subscriber device to set all outputs simultaneously. Any individual output can be either high or low. In another embodiment, the command is Set Single Output. This command is sent to the mobile products to set one individual output either high or low. In another embodiment, the command is Enable/Disable Inputs and Events. This command is sent to the transponder or subscriber device to enable/disable all known transponder or subscriber device features. Both physical and logical events can be individually enabled and/or disabled. While the physical and logical events can be disabled, the ability to query the transponder or subscriber device for its location and status can remain enabled. In another embodiment, the command is an Alarm Acknowledgment. This command can be sent to the transponder or subscriber device to terminate the sending of an emergency event, such as panic, roadside assistance, or medical assistance. When the alarm acknowledgement is received, no further emergency messages for the current event are transmitted from the transponder or subscriber device 105.

The asynchronous routing system 159 interacts with various control consoles, as depicted in FIGS. 6-2 and 6-3. Reporting consoles 174 connect to the fleet database 670 to display fleet information. Administrator consoles 175 also connect to the fleet database 670 to retrieve the transponder or subscriber device's information. Administrator consoles 175 also connect to the command receiver 690 to send commands to the transponder or subscriber device 105. Operations data processors 173 connect to the fleet database 670 in order to retrieve configuration information for a specific user or transponder or subscriber device 105. Finally, the client console 176 receives information for a tracked transponder or subscriber device 105 from a response router 620, receives information for a non-tracked transponder or subscriber device from a new event router 622, and retrieves information from the fleet database 670. The client console also transmits commands to a transponder or subscriber device 105 by sending the commands to the command receiver 690.

Management Software

Figure 7A:
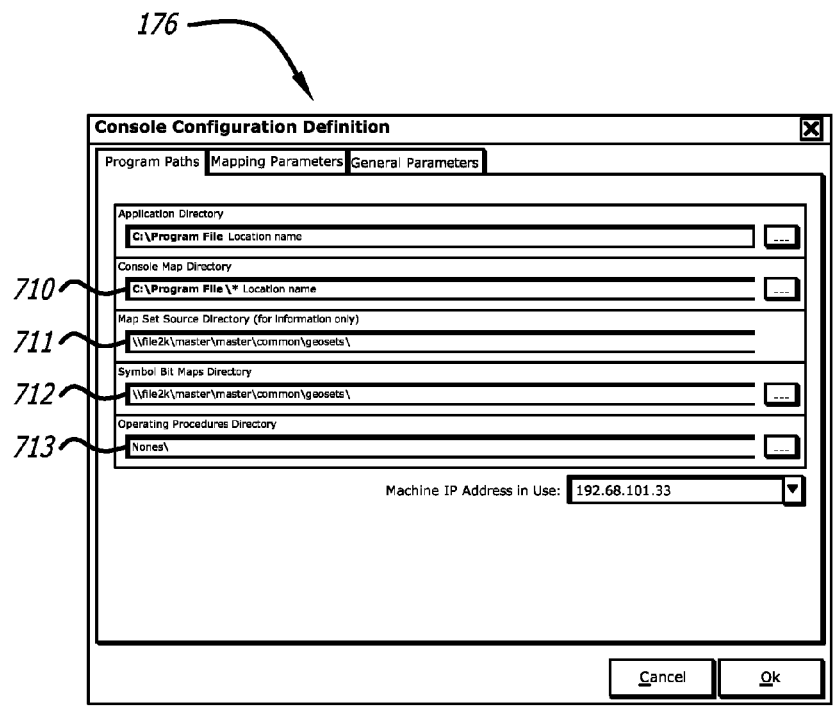
FIG. 7A illustrates a screenshot of an instance of a client console.

FIG. 7A illustrates a screenshot of an instance of the client console 176. The client console 176 provides real-time transponder or subscriber device 105 location mapping, location tracking, transponder or subscriber device control, and transponder or subscriber device message/event handling.

Figure 7B:
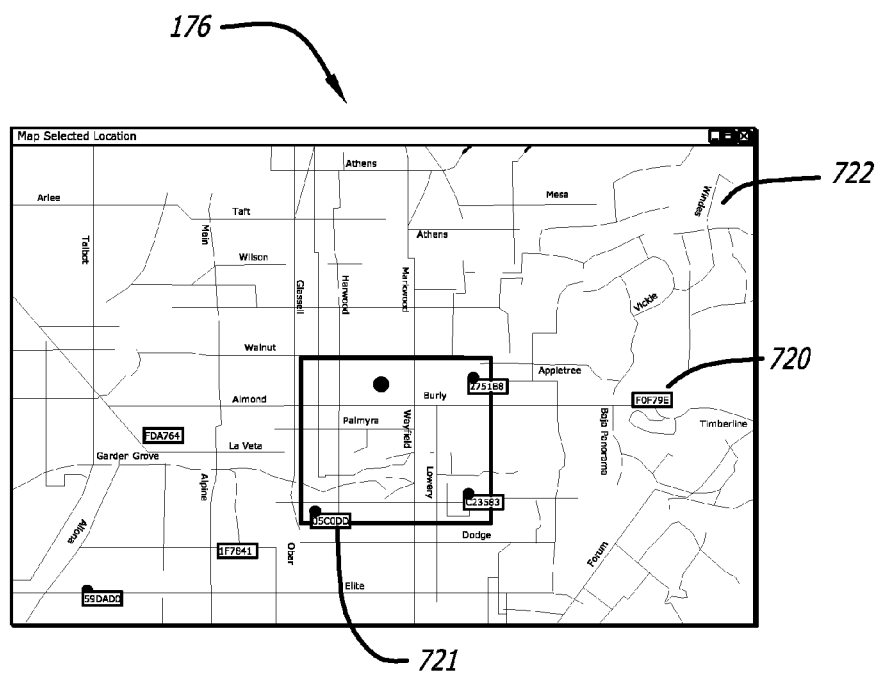
FIG. 7B illustrates a screenshot of an instance of a client console.

In one embodiment, the client console 176 connects to map databases and transponder or subscriber device databases by configuring multiple parameters. Such parameters include, but are not limited to, path definition for the console map sets 710, custom data sets 711, map information display symbols 712, and console operating procedures 713. The settings are maintained in the system registry and recalled at the program load. In another embodiment, the client console 176 provides the ability to configure mapping parameters used by the client console 176. The client console 176 also provides the ability to define the console location, to set default zoom levels when displaying the various program-generated maps, to set the map to be used, and to determine whether or not street locations are displayed when mapping a location. FIG. 7B illustrates a screenshot of an instance of the client console 176. A graphical user interface (GUI) allows maps to be displayed on the client console 176. In one embodiment, the client console 176 displays all available transponder or subscriber devices on one master map. In another embodiment, the client console 176 allows a user to view transponder or subscriber devices by groups 721 or individually 720. In another embodiment, the client console allows a user to view all transponder or subscriber devices that come within an area 722 displayed by the map. In another embodiment, the client console 176 allows a user to view all transponder or subscriber devices that are located within a waypoint. In another embodiment, the client console 176 allows a user to view all transponder or subscriber devices that are located within a zone.

The client console 176 allows a user to employ a variety of mapping tools to help manage the transponder or subscriber device 105 location processing. Provided tools include, but are not limited to, map zoom in/out, map pan, map feature label, map ruler, map location at a selected point, map legend, map centering on selected point, find a map feature and center map on that feature, display information for a selected custom dataset element, display information for a selected transponder or subscriber device, display information for a standard map feature, and print the displayed map.

Further, the displayed map uses color-coding for both location symbol and location identification to indicate special conditions relating to the transponder or subscriber device 105. Special situations that are color-coded include, but are not limited to, transponder or subscriber device moving, transponder or subscriber device stopped, transponder or subscriber device not reporting, transponder or subscriber device location being old, and transponder or subscriber device having a priority message active.

Figure 7C:
FIG. 7C illustrates a screenshot of an instance of a client console.

The transponder or subscriber device summary table 750, as shown in FIG. 7C, displays all transponder or subscriber device information, and is updated in real time as the transponder or subscriber device reports the information to the client console 176. The transponder or subscriber device data shown are the data corresponding to the transponder or subscriber devices associated with individuals, vehicles, and/or articles. The transponder or subscriber device summary table 750 uses icons and color-coding to alert the user of special conditions. Special situations that are color-coded include, but are not limited to, transponder or subscriber device moving, transponder or subscriber device stopped, transponder or subscriber device not reporting, transponder or subscriber device location being old, and transponder or subscriber device having a priority message active. In another embodiment, the user has the ability to find any item in the transponder or subscriber device summary table 750, select which columns are visible and to sort the table according to selectable sort types and sort orders for up to at least one column.

In another embodiment, the client console 176 provides a user the ability to select an item in the transponder or subscriber device summary table 750, and perform an operation that is related to the selected item or its group. For example, if a transponder or subscriber device is selected, various operations related to the transponder or subscriber device may include, but are not limited to, adding the transponder or subscriber device to the master map; removing the transponder or subscriber device from the master map; creating a group map; creating an individual map; centering the map on the selected transponder or subscriber device location; viewing the input, output, and/or event states for the transponder or subscriber device; setting the message notification mode for the transponder or subscriber device; viewing an information screen that contains detailed information from the master database pertaining to the transponder or subscriber device; and viewing any supplementary information contained in the location data packet that is not otherwise displayed.

In another embodiment, the client console 176 provides a user the ability to select a transponder or subscriber device 105 in the transponder or subscriber device summary table 750 and send a command/query to the selected transponder or subscriber device 105. The command/query list available to the user is dependent on the user's profile in the master system database. In another embodiment, the command is sent from a web-based client console, such as the web tracking application 171.

In another embodiment, the client console 176 provides a user the ability to receive a pop-up alert notification, which may include a sound cue, whenever a message event, a standard event, or priority event is received at the client console 176. Notification modes may be enabled or disabled for each transponder or subscriber device. In one embodiment, the notification modes are configured in the fleet database 670. In another embodiment, the notification modes are configured locally in the client console 176. When a priority message is received, the user has the ability to cancel the message, switch reporting to the emergency mode, or continue to use the standard reporting mode. The transponder or subscriber device summary table 750 displays priority messages with a special icon under the transponder or subscriber device identification column.

Figure 7D:
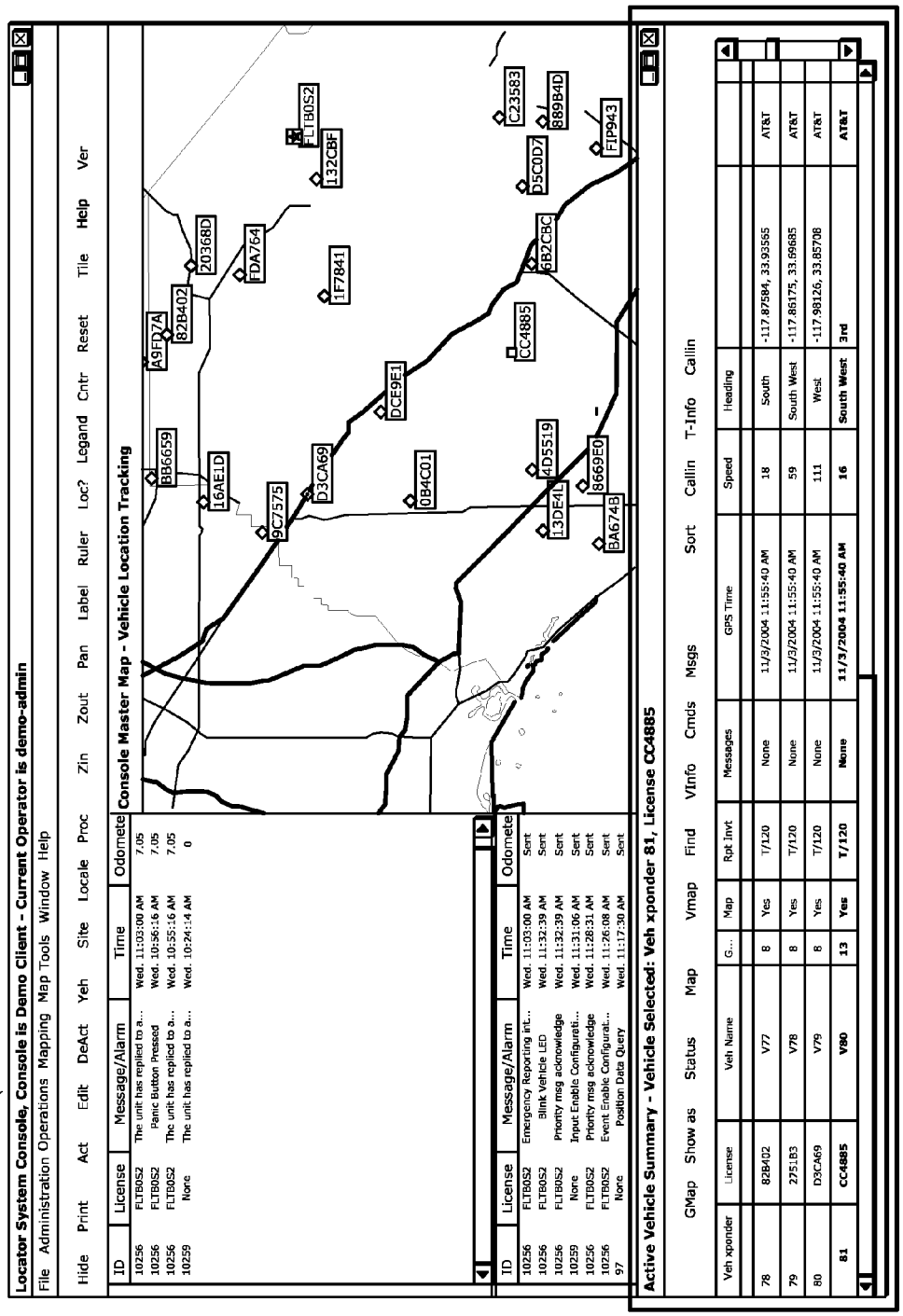
FIG. 7D illustrates a screenshot of an instance of a client console.

FIG. 7D illustrates a screenshot of an instance of a client console 176. The client console 176 contains a map depicting the locations of a number of transponder or subscriber devices 105.

Figure 8:
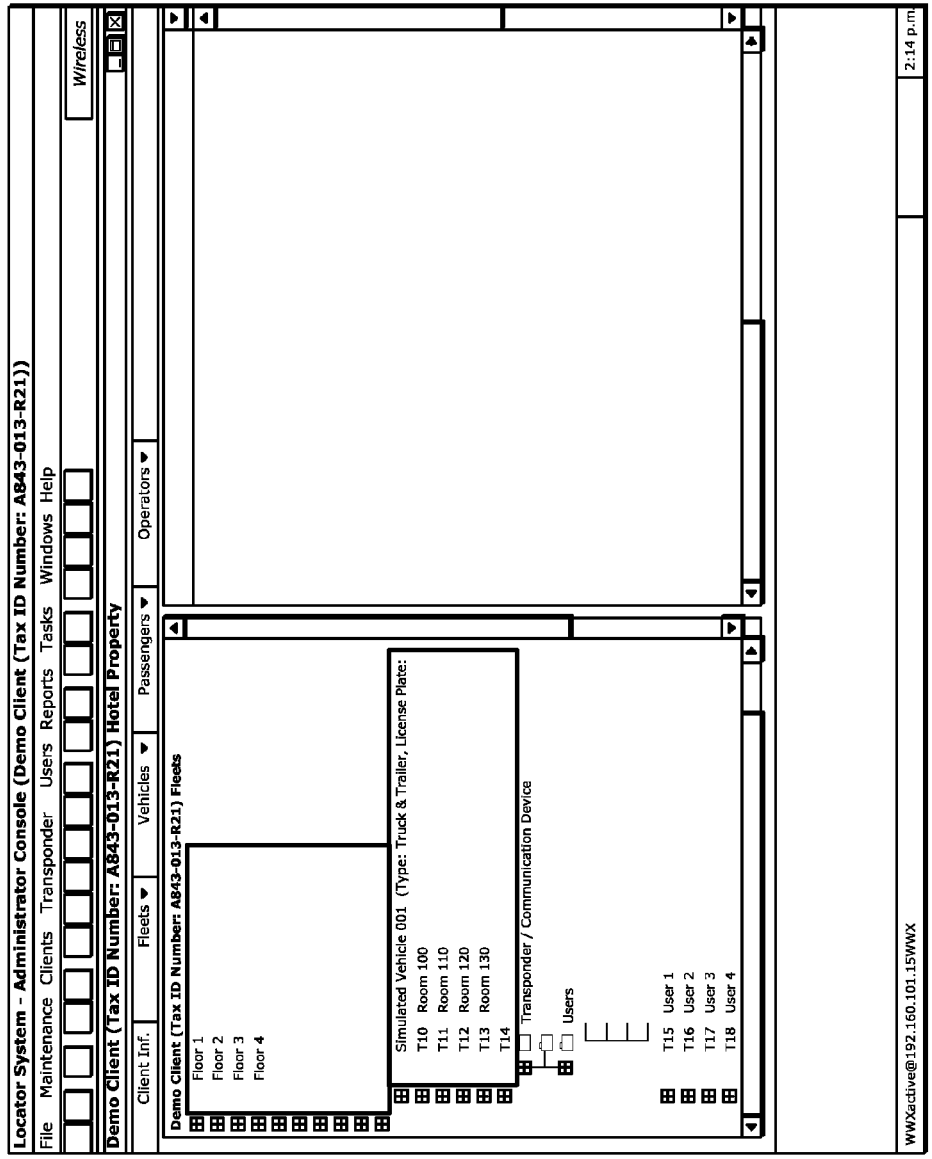
FIG. 8 illustrates a screenshot of an instance of a control center console.

FIG. 8 illustrates a screenshot of an instance of a control center console 175. The control center console 175 allows for the creation and maintenance of client or user configurations.

Figure 9:
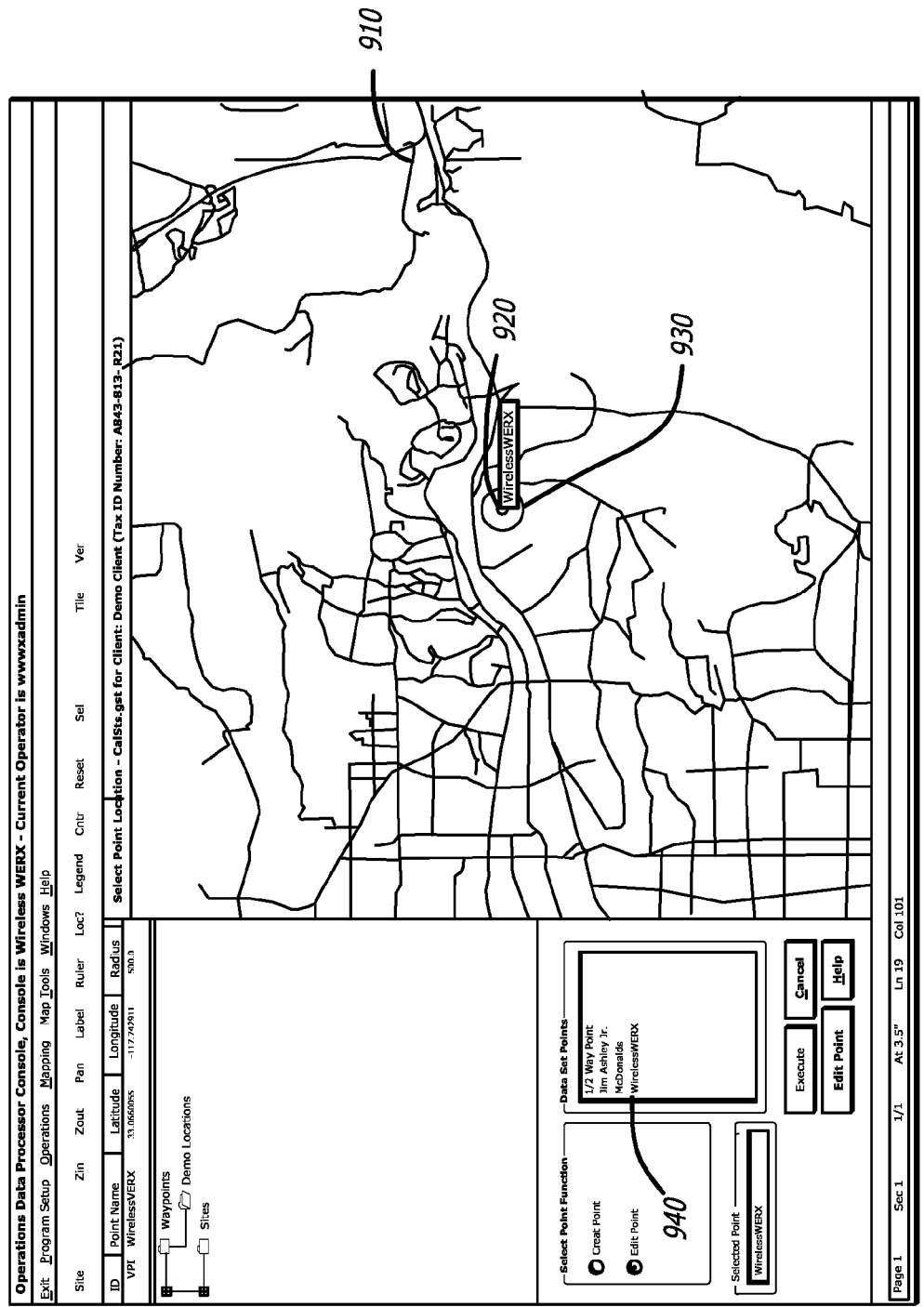
FIG. 9 illustrates a screenshot of an instance of the operations data processor.

FIG. 9 illustrates a screenshot of an instance of the operations data processor 173. The operations data processor 173 allows for the creation and maintenance of zones, waypoints, and transponder or subscriber device loads for the transponder or subscriber device 105. Zones, waypoints, and sites are created and maintained with a point-and-click mapping interface as illustrated by FIG. 9. The graphical interface provided by the operations data processor 173 displays a map 910 of the area where a waypoint 920 is to be installed. In one embodiment, the graphical interface allows for the radius 930 to be expanded or contracted around the waypoint. In another embodiment, the radius information is entered by typing the number for the radius size on a given field of the graphical user interface (GUI). The operations data processor 173 allows for the maintenance of a list of waypoints 940, and a view of each waypoint 920 on a corresponding map 910.

In another embodiment, the history replay feature can replay the history according to a selected period. In another embodiment, the history replay feature can replay the history as related to a selected waypoint. In yet another embodiment, the history replay feature can replay the history as related to a selected zone.

Figures 10, 11:
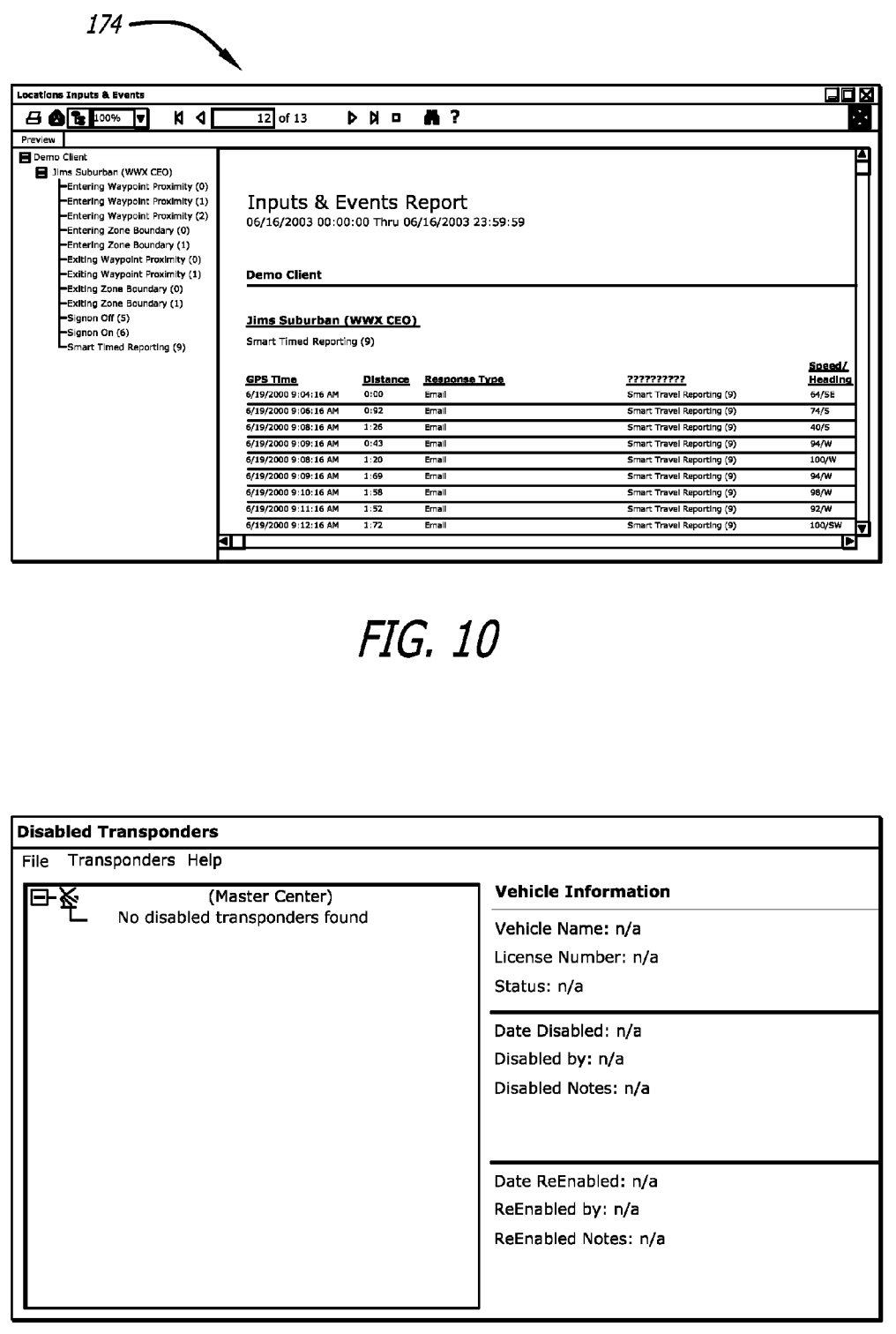

FIG. 10 illustrates a screenshot of an instance of the history data processor 174. In this figure, the screen displays the history of locations visited over time by a particular transponder or subscriber device 105. FIG. 11 illustrates a screenshot of an instance of a disabled transponder or subscriber device processor 105.

Figure 12:
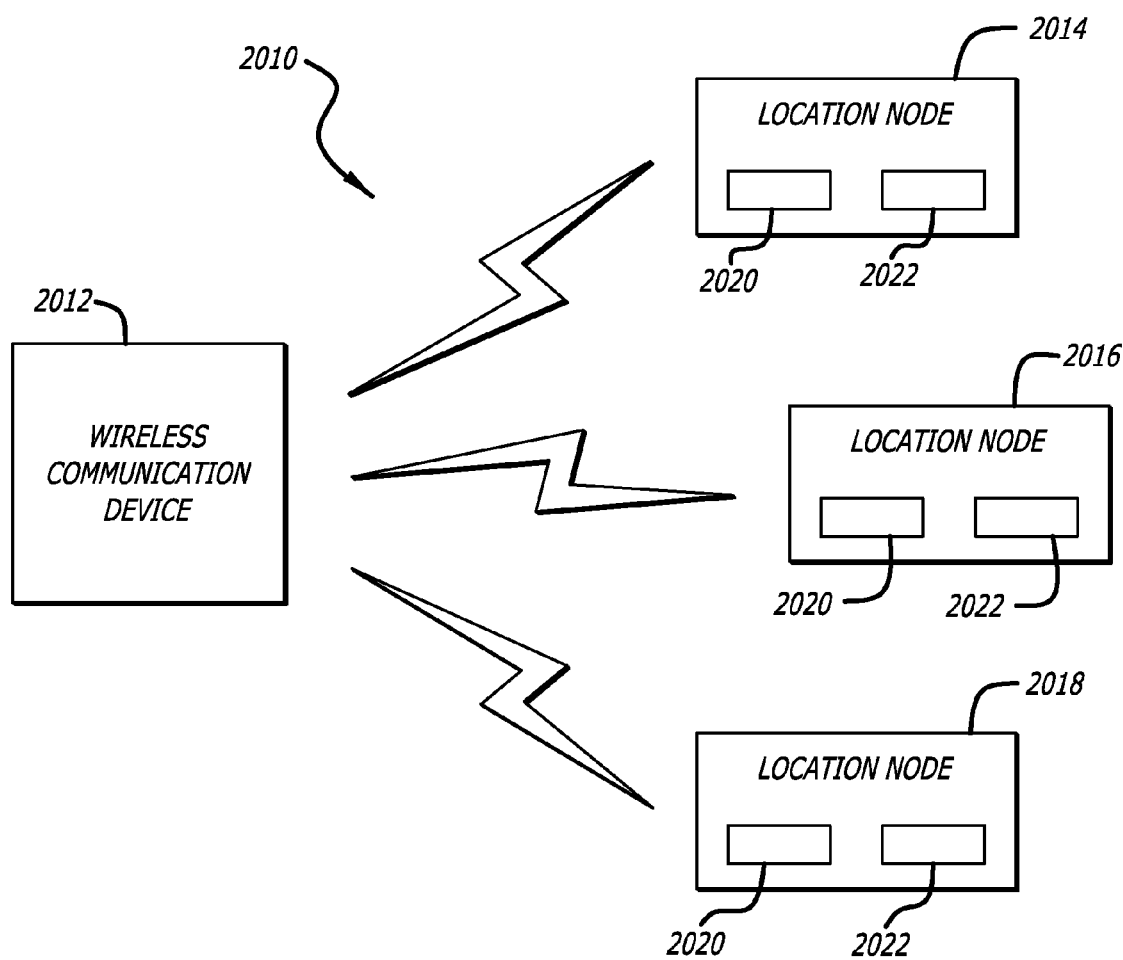
FIG. 12 illustrates an exemplary top-level system diagram in accordance with the present disclosure.

An exemplary embodiment of the location system 2010 in FIG. 12 illustrates the main components of the system 2010. The system 2010 comprises a wireless communication device 2012 and a plurality of location transmitters or nodes. A plurality of location nodes 2014, 2016, 2018 are depicted to illustrate that multiple location nodes can be located within communication range of the wireless communication device 2010 at any specific time.

Each location node 2014, 2016, 2018 contains a programmable transceiver communication device incorporating a radio transceiver module 2020 and a micro-controller 2022. In alternative embodiments, each location node 2014, 2016, 2018 may contain a separate transmitter and receiver instead of a single radio transceiver module 2020. In exemplary embodiments, the micro-controller 2022 controls the radio transceiver module 2020, responds to queries sent wirelessly from the wireless communication device 2012, and stores and retrieves detailed location information in the form of data in the micro-controller's 2022 non-volatile memory.

Each location node's 2014, 2016, 2018 radio transceiver module 2020 will have its own location node name, or friendly name. Selection parameters and the geographic position may be encoded and stored in the location node name. In exemplary embodiments, the location node name will include information including, but not limited to, maximum power setting, installation identifier, floor number, payload type, node latitude and longitude, and an integral checksum.

In another embodiment, the location node name is limited to 16 characters and is encoded utilizing ASCII characters to efficiently and simply name the location node.

Detailed location node location information is found in the memory of each micro-controller 2022 of each location node 2014, 2016, 2018. In one example, the detailed location node location information is formatted into a database according to Table 1.

TABLE 1

| Field | Data Type | Length |
| --- | --- | --- |
| BT_NAME | CHAR | 6 |
| HOUSE_NO | CHAR | 10 |
| HOUSE_NO_SUFFIX | CHAR | 4 |
| PREFIX_DIRECTIONAL | ASCII | 2 |
| STREET_NAME | CHAR | 60 |
| STREET_SUFFIX | ASCII | 2 |
| POST_DIRECTIONAL | ASCII | 2 |
| POSTAL_COMMUNITY | CHAR | 32 |
| STATE | ASCII | 2 |
| ZIP_CODE | CHAR | 10 |
| BUILDING | CHAR | 40 |
| FLOOR | CHAR | 5 |
| UNIT_NO | CHAR | 5 |
| UNIT_TYPE | ASCII | 2 |
| LOCATION_DESCRIPTION | CHAR | 60 |

In exemplary embodiments, the detailed location information includes at least the address including the street number, the street name, the local community, the state and the zip code. The detailed location information may also include data including the name of the building, the floor number, the unit or room number, or type of room. In other embodiment, the detailed local information may include any relevant other information to provide specific or complementary information for quicker identification of the location.

In exemplary embodiments, the wireless communication device 2012 of the present disclosure is a Bluetooth™ enabled device. In one or more embodiments, the wireless communication device 2012 is a cell phone, a laptop computer, a pager, a PDA, or any other wireless communication device with the ability to receive the detailed wireless communication device location information from the location node 2014, 2016, 2018.

The wireless communication device 2012 includes software components to interact with each of the radio transceiver modules 2020 in the location nodes 2014, 2016, 2018. The wireless communication device 2012 will periodically interrogate its environment, and when it is in range of a location node 2014, 2016, 2018, the wireless communication device 2012 will connect to, and query the location node 2014, 2016, 2018.

In the disclosed system and method, the wireless communication device 2012 will receive selection parameter data from each location node 2014, 2016, 2018. Utilizing these selection parameters, the location node will narrow the plurality of location nodes 2014, 2016, 2018 to the most practically near location node 2014, 2016, 2018. This is necessary because the closest location node to a wireless communication device 2012 on the second floor of a building could be on the ceiling of the first floor and, thus, be inaccessible from the second floor. In an exemplary embodiment, an algorithm 2050, as shown in FIGS. 13A and 13B, located within the wireless communication device 2012 is utilized to determine the location node 2014, 2016, 2018 that is most practically near.

Figure 13A:
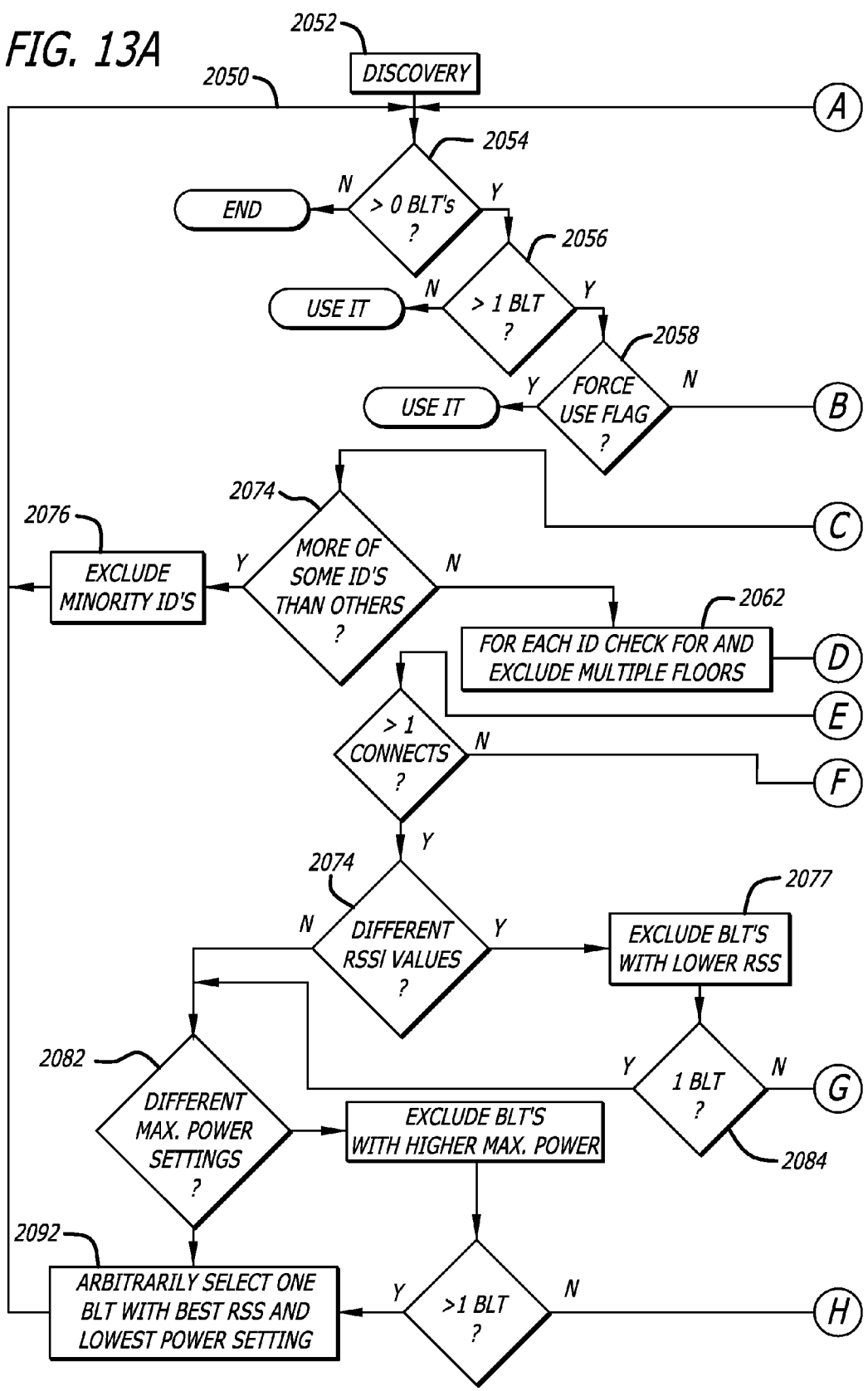
FIG. 13 illustrates a flowchart of the algorithm utilized for detecting the precise location of the wireless communication device in accordance with the present disclosure.
Figure 13B:
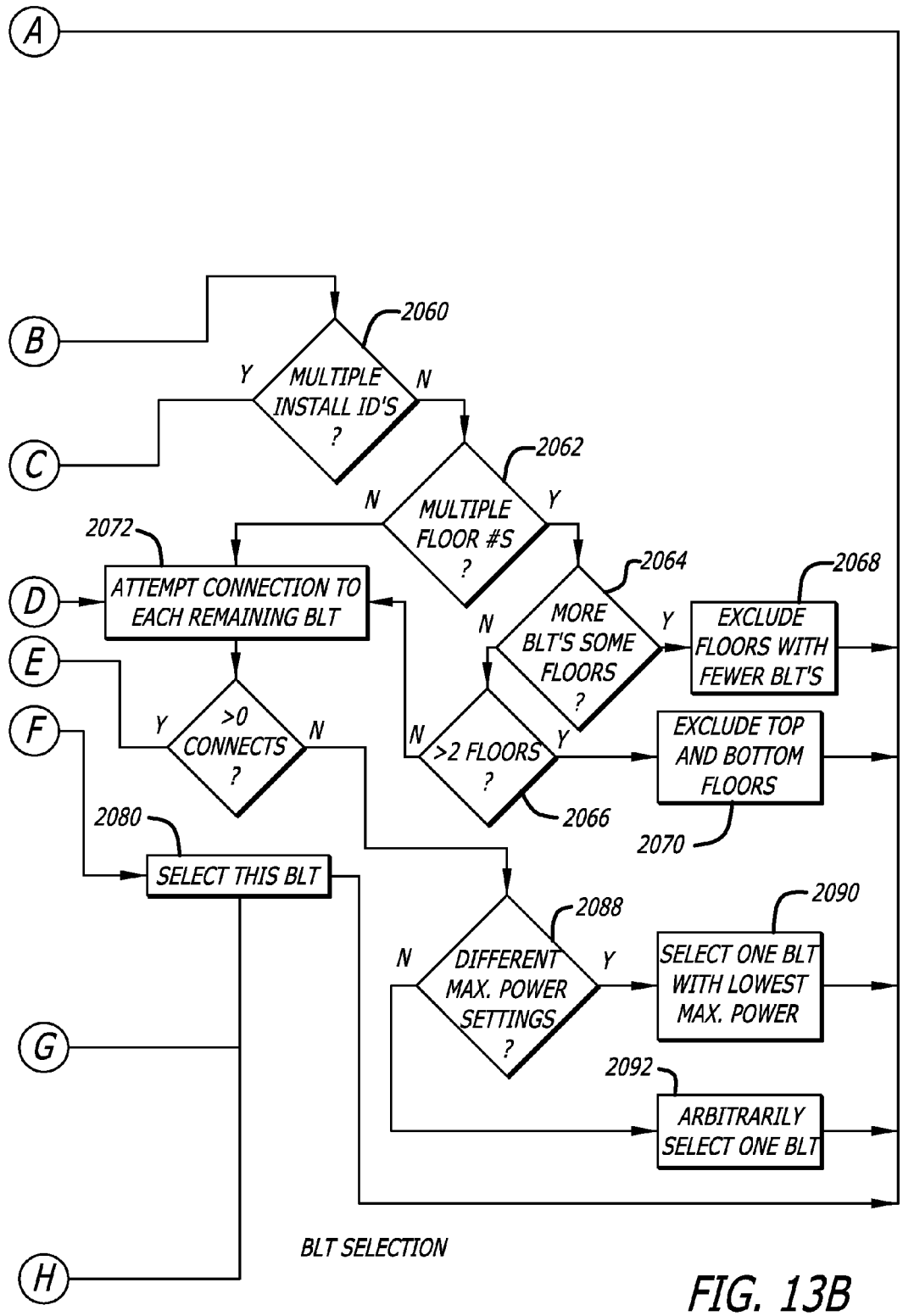

FIGS. 13A and 13B illustrate an exemplary embodiment of the algorithm 2050 utilized by the wireless communication device 2012 to detect its location. The location node selection algorithm 2050 begins with a general wireless communication device discovery 2052 of all location node's 2014, 2016, 2018 located within communication range. The result of this wireless communication device discovery 2052 is a list of location node names, also known as friendly names, and the associated unique location node radio addresses. Because valid location node names have a special format and an integral checksum, radio wireless communication devices 2012 that are not location nodes are easily excluded from this list. In one or more alternative embodiments, the wireless communication device 2012 performs a custom device discovery 2052 by searching for wireless devices of at least one specific subclass. Specific subclasses include, but are not limited to, location notes 2014, 2016, 2018 and specific types of wireless communication devices 2012, such as cell phones, pagers, PDAs, and/or laptop computers. Also, in some alternative embodiments, the wireless communication device 2012 performs a custom device discovery 2052 by searching for at least one specific wireless device 2012 operating in a specific mode.

For example, if a building only has a single location node, and no other surrounding buildings maintain a location node, this single location node could be set using a "force use" flag. This would allow for a quicker, more efficient selection and determination of the location of the location node. Another example would be where several location nodes are located in a small area within a building. These location nodes could also be set using a "force use" flag. This again would allow for a quick, efficient selection and determination of node location.

After the wireless communication device discovery process 2052 completes, if only one valid location node has been discovered 2056, this location node is selected. If more than one valid location node has been discovered then a series of steps begins to reduce this list down to one location node that is the most practically near to the wireless communication device. If after any step, only one valid transmitter remains in the list the selection process ends with that location node being selected.

As each location node is discovered by the wireless communication device, the name is parsed to confirm if it is a valid location node. At this time, if a location node has a valid "force use" flag, this location node is selected as the location node that is most practically near. Use of the "force use" flag can reduce the selection process time down to one or two seconds but should only be used when it is certain that any wireless communication device within radio range must select that location node with its force use flag set as true.

In another embodiment, the algorithm 2050 may then utilize a step 2060 to distinguish between different buildings or installations. When location nodes are installed, all the location nodes installed that are part of the same installation are assigned the same identifier.

For example, if two commercial buildings are in close proximity, and both have location nodes installed, the installation identifiers will be different for each building. Therefore, if a wireless communication device in one building is within radio range of a location node in the other building it can more easily select a location node within its own building and installation area.

In exemplary embodiments, the installation identifier is not intended to provide a universally unique identification number but should provide a unique identifier for every installation within radio range of any other installation having location nodes.

First, the wireless communication device determines how many installation identifiers are in range of the wireless communication device 2060. The wireless communication device will detect more location nodes in the building where it is located. If there are unequal numbers of location nodes within the different installations 2074, then the location nodes in the building with fewer location nodes are removed 2076 from the list of possible location nodes.

In another embodiment, the algorithm may utilize a step 2062 distinguish between different floors of a building or installation. When location nodes are installed, all the location nodes installed that are on different floors of the same installation are assigned different floor identifiers in the location node name.

In this step 2062, the wireless communication device determines if more than one floor number is represented within one installation identifier. If there are unequal numbers of location nodes on multiple floors 2064, the wireless communication device eliminates those locations transmitters on the minority floors, i.e., on those floors which have the smaller number of location nodes 2068 sensed. If at this point, only one location node is available, the wireless communication device chooses this location node as the location node that is most practically near.

In another embodiment where equal numbers of location nodes exist on more than two different floors within one installation identifier, those location nodes on the upper most and lower most floors are removed from the list 2070. This step may be repeated until there are no more than two different floors within one installation identifier.

At this point, if more than one location node remains in the list after the above steps then a serial port profile connection is attempted between the wireless communication device and each location node remaining in the list 2072. If the connection is successful then the location node is queried for its received signal strength (RSS) for that connection 2074.

RSS is queried from the location node because the interface on the wireless communication devices does not generally support a query for an RSS value. If at least one connection and query for RSS is successful and the RSS value associated with that location node is higher than the RSS value for all others 2076, then that location node is selected by the wireless communication device as the location node that is most practically near to provide the detailed local information 2080.

In the next step, if more than one location node has an identically highest RSS value retrieved then the "maximum transmit power" settings are compared 2082. If one location node with highest RSS value has a maximum transmit power lower than the other(s) then this location node is selected 2084.

In another step, if all attempts at serial port profile connections and retrieval of RSS values have failed then the "maximum transmit power" settings encoded in the location node names of the remaining location nodes are compared by the wireless communication device 2080. In exemplary embodiments, the first character of the wireless communication device name includes maximum power transit setting. If one maximum transmit power setting is lower than all others then this location node is selected 2090 since, all other factors being equal, a location node with lower maximum transmit power will probably be most practically near to the wireless communication device.

In the next step of the algorithm 2050, if, after all elimination steps are complete and more than one location node remain in the list, then one of the remaining location nodes is arbitrarily selected by the wireless communication device 2092.

After the algorithm 2050 has been run, when queried, the precise detailed local information from the selected location node is returned to the wireless communication device.

Figure 14:
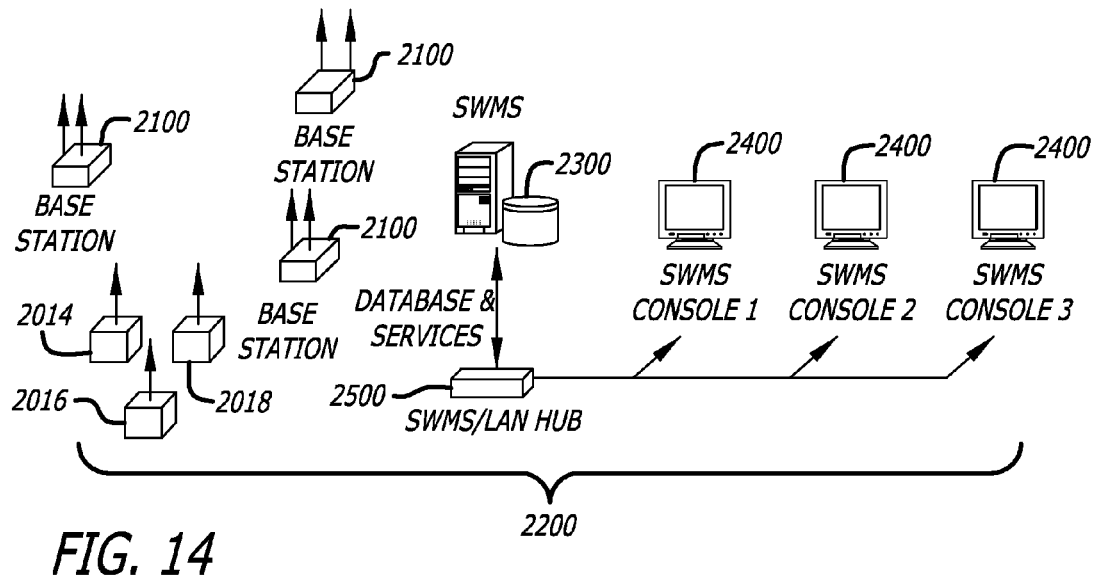
FIG. 14 illustrates an exemplary system in accordance with the present disclosure.

Another exemplary embodiment is shown in FIG. 14. Shown therein is a system including a management system 2200 including a database 2300, a(n) Console(s) 2400, base stations 2100, LAN hub 2500 and location nodes 2014, 2016, 2018. Consoles 2400 are utilized to administer the database 2300 and configure the monitoring and messaging services.

Management base stations 2100 are modules equipped with power circuitry, a micro-controller, and preferably a radio transceiver such as a Bluetooth™ radio and a Wi-Fi radio. The base stations 2100 are self-contained in packaging and can either be connected directly into a constant power source or battery-powered.

The management system 2200 interacts with an enabled location node environment via management base stations 2100 preferably over a wide-area network. The management system 2200, for example, may communicate with the base stations 2100 through their Wi-Fi radios, while the base stations 2100 communicate with the location nodes 2014, 2016, 2018 though their Bluetooth™ radios. Only one base station 2100 is required per enabled environment, but multiple base stations 2100 can be used in sprawling areas or for load balancing.

Figure 15:
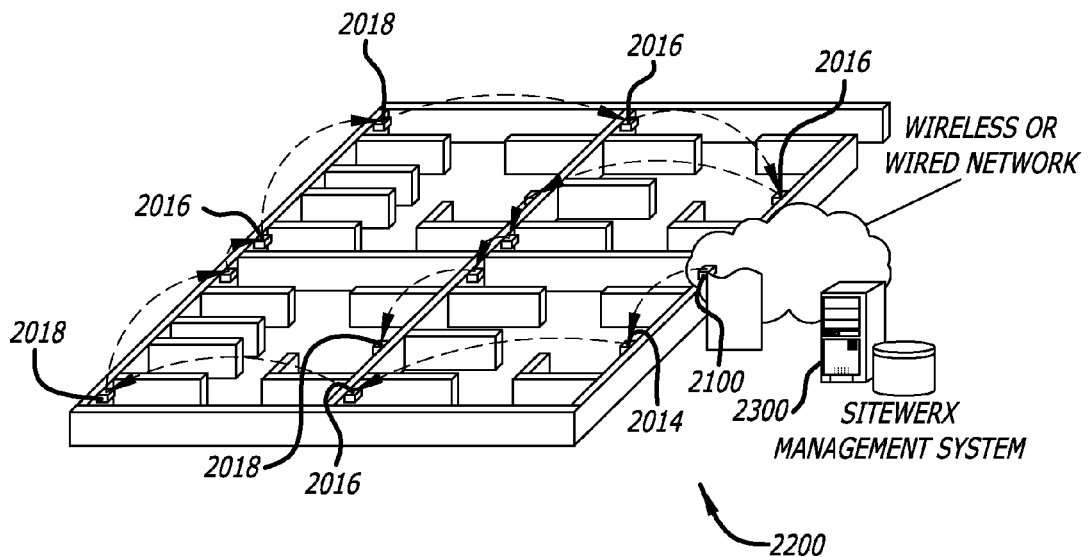
FIG. 15 illustrates an exemplary messaging application of the system in accordance with the present disclosure.

In FIG. 15, area specific messaging provides the ability to deliver messages to enabled wireless communication devices within a specific area, where the specific area could be defined by one location node 2014, 2016, 2018 to an entire enabled environment. The management system 2200 initiates messaging via the management base station(s) 2100, and preferably utilizes a "daisy chain" approach to pass pending messages to location nodes 2014, 2016, 2018 that may be installed at locations far beyond the range of any Bluetooth™ or Wi-Fi radio. Warnings are generated in the event a pending message cannot be delivered to a location node 2014, 2016, 2018 defining part of or all of the specific area.

Consoles 2400 are used to configure area-specific messaging, utilizing a map displaying the placement and range of every location node 2014, 2016, 2018 within a messaging enabled environment. A message, its severity and its delivery path are then defined (or selected from a list of existing paths), beginning with a management base station 2100, and linking a series of location nodes 2014, 2016, 2018. The message and its delivery path are then stored in the database 2300, along with its delivery schedule.

Figure 16:
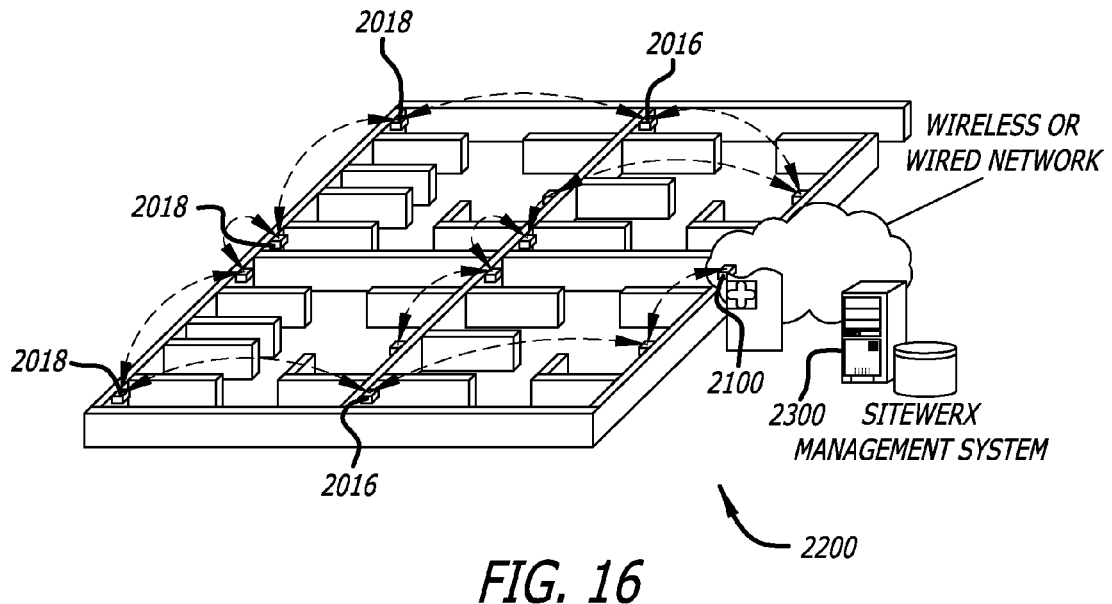
FIG. 16 illustrates an exemplary health check application of the system in accordance with the present disclosure.

A message may be sent via a console 2400 to a base station 2100. From base station 2100, as shown in FIG. 16, the message is sent to the first location node in a chain. Throughout the following discussion it is to be understood that the nodes 2014, 2016 and 2018 may be continuously connected or connected only on demand.

Figure 17:
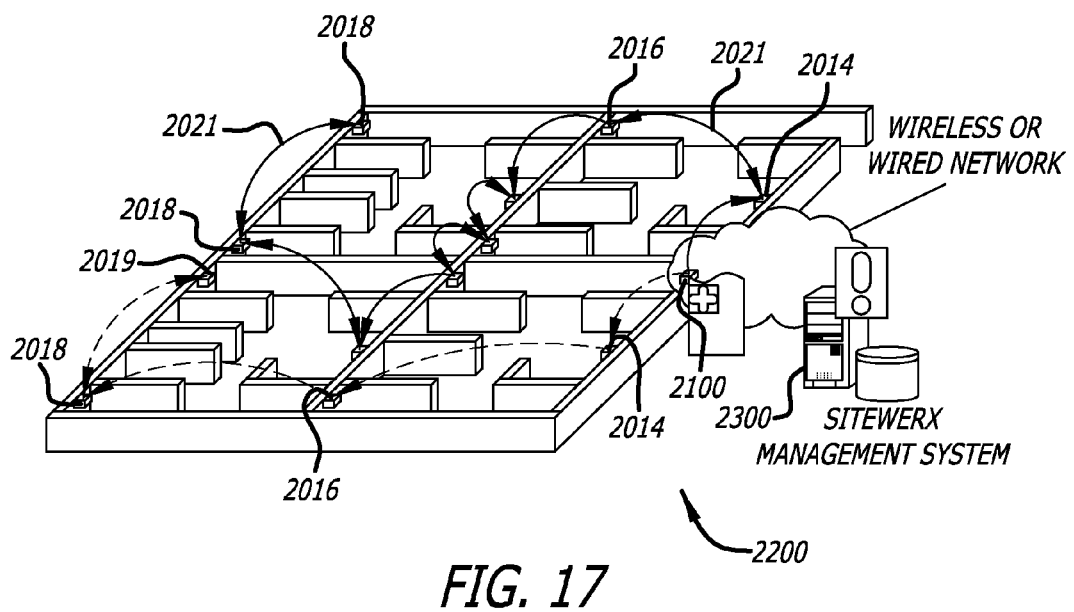
FIG. 17 illustrates an exemplary exception handling application of the system in accordance with the present disclosure.
Figure 18:
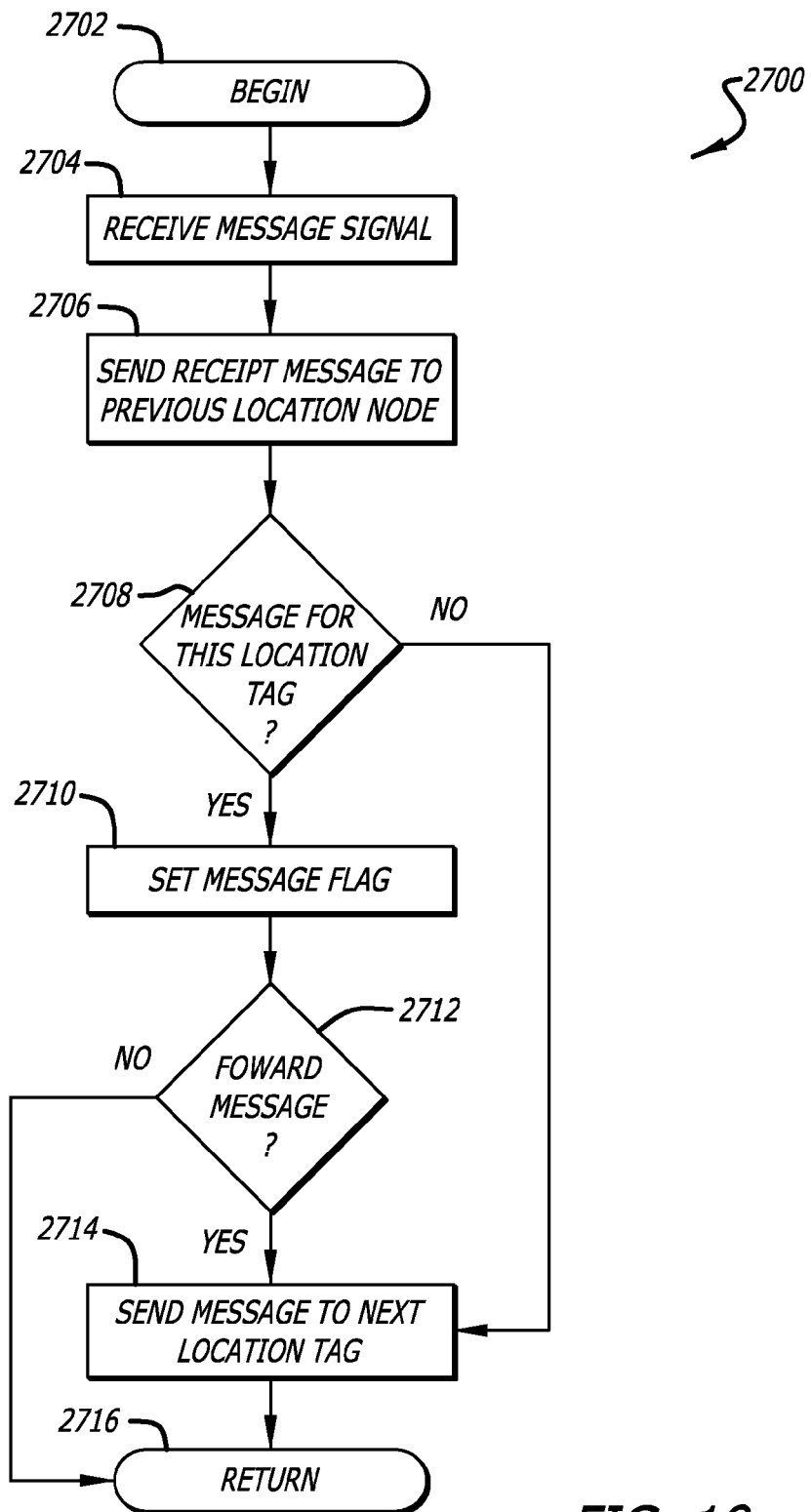
FIG. 18 illustrates an exemplary decision tree at the location node in accordance with the present disclosure.

As illustrated in FIG. 17, this first node is location node 2014. The location node 2014 will execute an algorithm 2700 described below and shown in FIG. 18.

Location node 2014 will begin execution of algorithm 2700 at operation 2702 by coupling with a base station 2100 if a message is to be sent to base station 2100 for forwarding to communication devices that are within range of the location nodes. Base station 2100 sends the message signal to the first location node 2014. Control is then passed to operation 2704 where the incoming message signal is received by location node 2014. Control is then passed to operation 2706. Location node 2014 replies to the base station 2100 with a receipt message acknowledging that the message was successfully received. Had location node 2014 been in the middle of the chain instead of the current example where it is the first location node of the chain, location node 2014 would have sent a receipt message to the previous location node in the chain.

Control is then passed to query operation 2708. Query operation 2708 asks whether the message is for that location node. If it is, then a message flag is set so that the message is to be available in response to a query by wireless communication devices within its vicinity. If the message signal is not carrying the address for location node 2014, the answer is no and control is passed to operation 2714. If the message signal is carrying the address of location node 2014, the answer is yes and operation is passed to operation 2710.

At operation 2710 a message flag is made available to wireless communication devices in the vicinity when they perform their periodic inquiry or discovery of the location nodes. In one or more embodiments, the message flag contains information including, but not limited to, the type of message and/or the severity of the message. When the message flag is made available, the wireless communication device can then retrieve the message from location node 2014.

Control is then passed to query operation 2712. Query operation 2712 determines if the message signal is carrying the addresses of other location nodes farther down the chain and if it is, control is passed to operation 2714. If the message signal is not carrying any other addresses, control is passed to the return operation 2716.

At operation 2714 the message is forwarded to the next location node. In the current example that node is location node 2016.

Control is now passed to 2716 where the location node 2014 effectively "goes to sleep" and awaits further instructions from the base station 2100 or to be queried again by a wireless communication device.

Area-specific messages may be initialized on a pre-defined schedule, or can be initialized immediately via a console 2400. The initialization of an area-specific message begins at a management base station 2100, and will leap from one location node 2014, 2016, 2018 to the next as defined in the daisy chain sequence. Location nodes 2014, 2016, 2018 will store the message in their flash memory if it is intended for them before passing that message on to the next location node 2014, 2016, 2018 in the sequence. The message initialization results are returned to the initiating management base station 2100 in the reverse sequence of the daisy chain when the end of the daisy chain is reached. The management base station 2100 transmits the results to the management system 2200, which are then recorded in the database 2300.

An exception report is returned to the initiating management base station 2100 in the event an exception is encountered during the initialization of a message. The exception report is returned in the reverse sequence of the daisy chain beginning with the location node 2014, 2016, 2018 generating the exception. The management base station 2100 transmits the exception to the management system 2200, which generates the appropriate notifications and records the exception in the Database 2300. The management system 2200 will attempt to continue the initialization of the message utilizing alternate daisy chain path(s).

A message-pending flag is passed to enabled wireless communication devices as they interrogate, connect to and eventually select location nodes 2014, 2016, 2018 during the execution of the selection algorithm. If the selected location node 2014, 2016, 2018 is determined to have a message pending, and the severity level of that message falls within the criteria set on that wireless communication device, the message may be automatically downloaded and displayed on the wireless communication device. For example, "canned" messages may be transmitted and displayed automatically which could arise in emergency situations.

In another exemplary embodiment of operation of the system 2200, which is shown in FIGS. 15 and 16, system monitoring may be used to verify that every location node 2014, 2016, 2018 within an enabled environment is running, has not been moved and its data has not been compromised. The management system 2200 initiates system monitoring via the management base station(s) 2100, and utilizes a "daisy chain" approach to communicate with the location nodes 2014, 2016, 2018 installed far beyond the range of any Bluetooth™ or Wi-Fi radio. Warnings can be generated and the daisy chain rerouted in the event an exception is encountered.

Consoles 2400 are used to configure system monitoring, utilizing a map displaying the placement and range of every location node 2014, 2016, 2018 within an enabled environment. A health check daisy chain is then defined, beginning with a management base station 2100, and linking a series of location nodes 2014, 2016, 2018. The specific series is then stored in the management system 2200, along with its execution schedule. The management system 2200 will ensure that all location nodes 2014, 2016, 2018 within an enabled environment are included in at least one health check series.

System monitoring will execute on a pre-defined schedule, or can be launched manually via a Console 2400. The monitoring begins at a management base station 2100, and will then leap from one location node 2014, 2016, 2018 to the next as defined in the daisy chain sequence. Each location node 2014, 2016, 2018 in the sequence verifies that the next location node 2014, 2016, 2018 in the sequence is running, has not been moved and its data has not been compromised. The monitoring results are returned to the initiating management base station 2100 in the reverse sequence of the daisy chain when the end of the daisy chain is reached. The management base station 2100 transmits the results to the database 2300.

Referring specifically to FIG. 17, an exception report is returned to the initiating management base station 2100 in the event an exception, for example, at location node 2019, is encountered during system monitoring. The exception report is returned in the reverse sequence of the daisy chain beginning with the location node 2019 generating the exception. The management base station 2100 transmits the exception to the management system 2200, which generates the appropriate notifications and records the exception in the Database 2300. The management system 2200 will continue system monitoring utilizing an alternate daisy chain path 2021, indicated by solid lines in FIG. 17, until the compromised location node 2019 is fixed, replaced or permanently removed from the system.

As a still further exemplary implementation of the disclosed system, a mobile client can send its location through the network shown in FIGS. 15 and 16. Here the system 2200 may be utilized to collect communication device information, such as cell phone numbers, etc. In this case, any communication device may respond with a message such as "record that I'm here", or an equivalent signal, and thus the system may be used to track personnel locations. The system 2200 may also be used to track mobile nodes attached to moving entities in a similar manner, since the messages being transmitted may simply be acknowledgment signals that the mobile node is within response range of a location node 2014, 2016 or 2018.

Figure 19A:
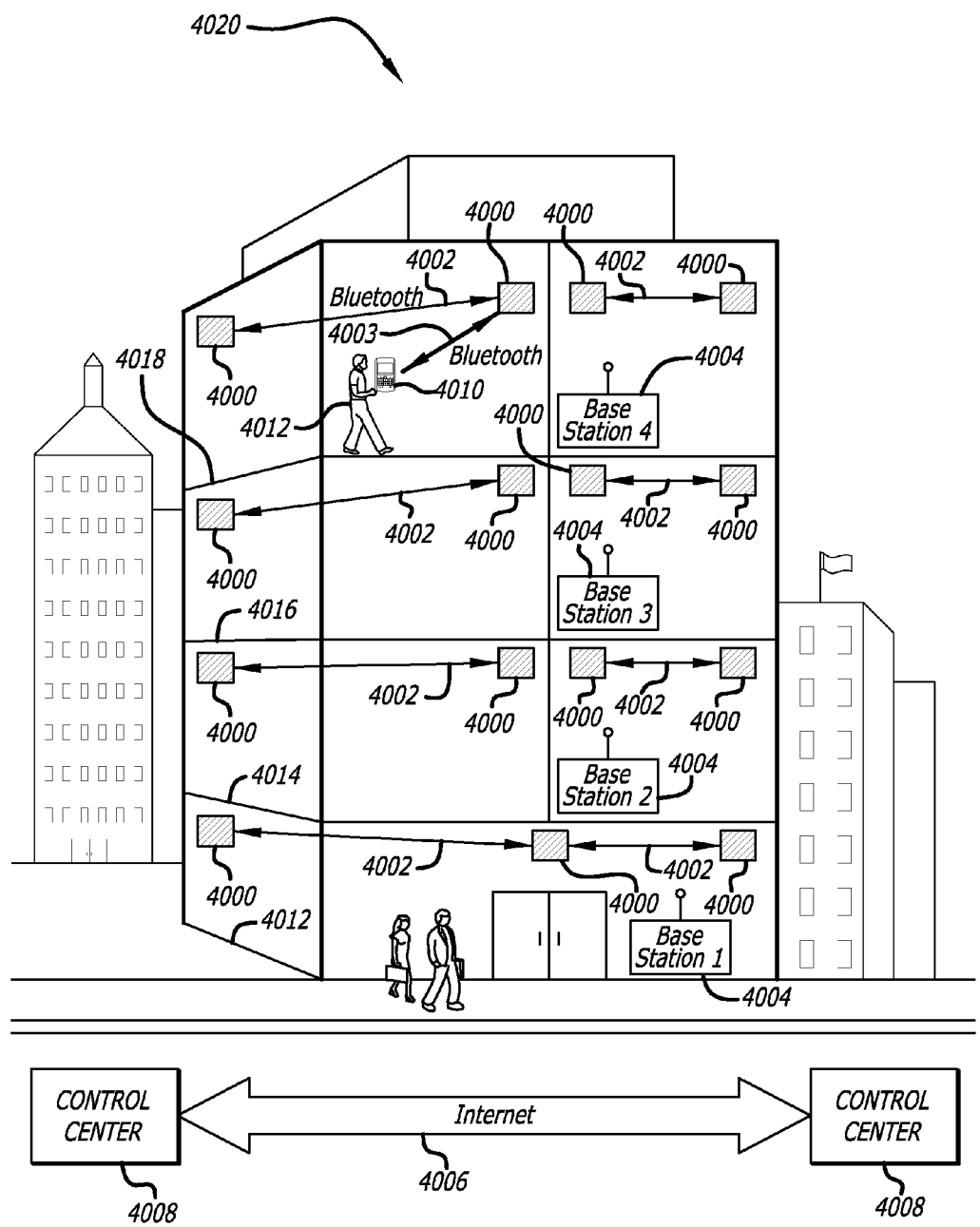
FIGS. 19A and 19B illustrate an exemplary mesh network showing different nodes in communication with different base stations, and in turn, in communication with a control center.
Figure 19B:
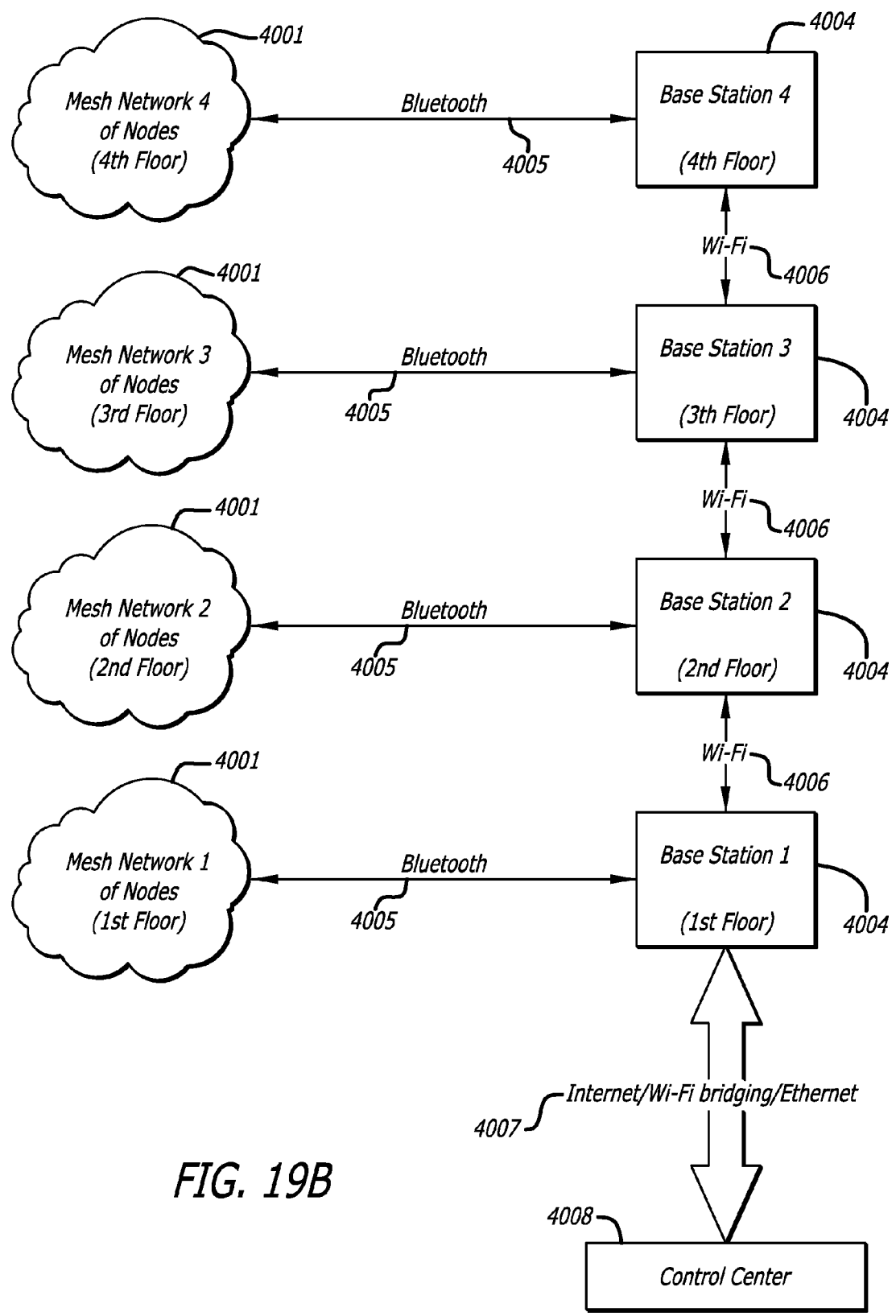

FIGS. 19A and 19B illustrate an exemplary mesh network 4001 of nodes 4000 in communication with base stations 4004 and, in turn, in communication with control centers 4008. A multi-dimensional, such as three-dimensional, map is created using nodes 4000 in communication 4002 with each other. Detailed location information from each location node 4000 is downloaded to at least one mobile device 4010. A mobile device 4010 is associated with at least one user, who is located at a specific area within a geographical zone. Each mobile device 4010 is in communication with at least one control center 4008 to download a two- or three-dimensional map of the location of the mobile device 4010 and/or, in some embodiments, a two- or three-dimensional map of the location of a different mobile device 4010.

In exemplary embodiments, the mobile device 4010 of the present disclosure is a Bluetooth™ enabled device. In one or more embodiments, the mobile device 4010 is a cell phone, a laptop computer, a pager, a PDA, or any other wireless communication device with the ability to receive the detailed mobile device location information from at least one location node 4000. The type of wireless communication employed by the system includes, but is not limited to, radio frequency (RF) communications and/or infrared communications.

The present application discloses a system for developing a multi-dimensional map of a multi-dimensional space for use by a user. The user being selectively an individual 4012, a vehicle, and/or other entity. One or more geographical zones are utilized by the system. The zones can be selectively preconfigured geographical zones. Each zone includes a plurality of spaced-apart nodes 4000, where the nodes 4000 are arranged in a multi-dimensional sense about the zone. For example, in FIGS. 19A and 19B, the nodes 4000 housed in the building 4020 are distributed in four separate mesh networks 4001. Each mesh network 4001 is located in one of four specific zones. The four specific zones depicted are the first floor 4012, the second floor 4014, the third floor 4016, and the fourth floor 4018 of the building 4020. In addition, each mesh network 4001 of nodes 4000 has associated with it at least one base station 4004.

Data communications are sent between one or more of the nodes 4000 (4002), one or more mobile devices 4010, and one or more control centers 4008 (4006). Multi-dimensional mapping is affected according to the placement of the nodes 4000, and the communications between the nodes 4000, the mobile devices 4010, and the control centers 4008.

The mapping of the geographical space is affected in a three-dimensional sense, selectively being defined by x, y and z axes or coordinates, which in some embodiments may correspond to latitude, longitude, and elevation. The nodes 4000 are enabled to communicate using GPS and/or Bluetooth™ protocol. The nodes 4000 are located at various locations within the geographical space, which comprises of at least one zone. The zones are typically defined as non-regular geometrical shapes. Such a non-regular shape is something different from a circle, square, rectangle, or a series of straight lines defining a bounded area. As such, the lines defining the non-regular geometrical shapes are irregularly shaped and/or curved to define the irregularity. In some embodiments, users have the ability to define and change the boundaries of the zones employed by the system.

In one or more embodiments, the nodes 4000 are enabled to communicate using Bluetooth™ protocol to effect communications between nodes 4000 and mobile devices 4010, which are each associated with at least one user. In some embodiments, the mobile devices 4010 are also enabled to communicate with each other using Bluetooth™ protocol. The nodes 4000 are selectively part of a mesh network 4001, or other suitable network configuration. The nodes 4000 selectively communicate with mobile devices 4010 associated with users. The mobile devices 4010 being selectively a cell phone, PDA, pager, or other computer device.

In different systems, the zone is affected in two or three dimensions, and this can be used to regulate the location of a user. The user can be a movable entity that is associated with a transponder or subscriber device 4010. The transponder or subscriber device 4010 being selectively a cell phone, PDA, pager, computer, or device configured to be in wireless communication with other mobile devices 4010 and with nodes 4000 in a wireless communication network.

Mapping is attained by loading a plurality of mapping coordinates from a computer device to a memory module of a transponder or subscriber device 4010, or by the user directly loading a plurality of mapping coordinates to a memory module of the transponder or subscriber device 4010. The mapping coordinates are used to generate a pixilated image. The pixilated image is configured to form a contiguous array of pixels that enclose a shape in the pixilated image, whereby the enclosed shape forms a geographical space.

A user can enter geographical coordinates on a computer device, or on a transponder or subscriber device 4010, by entering numerical values for the coordinates of a specific location or locations. For example, the user can enter numerical values for the longitude, latitude, and elevation of a specific location. Conversely, a user can enter geographical coordinates on a computer device, or on a transponder or subscriber device 4010, by selecting points on a map displayed on a display screen by using a cursor to click on those point locations on the map. The computer device, or transponder or subscriber device 4010, will calculate the corresponding geographical coordinates for each point on the map that has been selected by the user.

The system for mapping a geographical space comprises communicating mapping data between communication nodes 4000 and at least one selected mobile communication device 4010. An array of communication nodes 4000 is arranged about a two- or three-dimensional geographical space. One or more different mobile communication devices 4010 are in communication with different communication nodes 4000 when the devices 4010 are within range of one or more selected nodes 4000. A mobile device 4010 is associated with the respective nodes 4000 such that the mobile device 4010 is locatable within the three-dimensional space.

In one or more embodiments, the mobile devices 4010 communicate with the nodes 4000 wirelessly via RF using Bluetooth™ protocol. When a mobile device 4010 determines its most practically near node 4000, the mobile device 4010 will download from that node 4000 the location information of that node 4000. The mobile device 4010 can use this location information in order to generate and display a two- or three-dimensional map of the mobile device's 4010 position within a geographical area and/or zone. In addition, the node 4000 will transmit wirelessly via RF using Bluetooth™ protocol the location information of the mobile device 4010 to the node's 4000 associated base station 4004, or to other nearby nodes 4000 within the node's 4000 mesh network 4001. The base station 4004 will, in turn, either communicate the location information of the mobile device 4010 via Wi-Fi to other base stations 4004, or communicate the location information of the mobile device 4010 via Internet, Wi-Fi bridging, and/or Ethernet to at least one control center 4008. Conversely, the location information of the mobile device 4010 may be communicated from nearby node 4000 to nearby node 4000 within the mesh network 4001 in a daisy-chain arrangement until the location information of the mobile device 4010 is finally communicated to at least one base station 4004 associated with the nodes' 4000 mesh network 4001.

In one or more embodiments, the nodes 4000 communicate with each other wirelessly via RF using Bluetooth™ protocol (4002). In some embodiments, the nodes 4000 also communicate with the mobile devices 4010 wirelessly via RF using Bluetooth™ protocol (4003). In one or more embodiments, the mobile devices 4010 have the ability to communicate with each other wirelessly via RF using Bluetooth™ protocol. In some embodiments the nodes 4000 communicate with base stations 4004 wirelessly via RF using Bluetooth™ protocol (4005). In some embodiments, the base stations 4004 communicate with each other via Wi-Fi (4006). In one or more embodiments, the base stations 4004 can communicate with the control centers 4008 by various means including, but not limited to, Internet communications, Wi-Fi bridging, and/or Ethernet communications (4007).

In one or more embodiments, a first mobile device 4010 may submit a location query to a second mobile device 4010 for that second mobile device's 4010 location information. In this embodiment, the first mobile device 4010 will transmit a specific location query to at least one node 4000 that is located within communication range of the first mobile device 4010. The at least one node 4000 will then transmit the location query to the node's 4000 associated base station 4004, or to other nearby nodes 4000 within the node's 4000 mesh network 4001. The base station 4004 will, in turn, either communicate the location query via Wi-Fi to other base stations 4004, or communicate the location query via Internet, Wi-Fi bridging, and/or Ethernet to at least one control center 4008. Conversely, the location query may be communicated from nearby node 4000 to nearby node 4000 within the mesh network 4001 in a daisy-chain arrangement until the location query is finally communicated to at least one base station 4004 associated with the nodes' 4000 mesh network 4001.

Once the location query reaches the control center 4008, the control center 4008 will route the location query to at least one base station 4004 that is associated with the mesh network 4001 of nodes 4000 that are in close proximity to the second mobile device 4010. Once the location query is downloaded onto the second mobile device 4010, the second mobile device 4010 will display the location query to its associated user. If the user wishes to send his/her location information to the user associated with the first mobile device 4010, the user will input a positive response in the second mobile device 4010.

When the second mobile device 4010 receives a positive response to the location query, the second mobile device 4010 will transmit that response to at least one node 4000 that is located within communication range of the second mobile device 4010. The at least one node 4000 will then transmit the response to the node's 4000 associated base station 4004, or to other nearby nodes 4000 within the node's 4000 mesh network 4001. The base station 4004 will, in turn, either communicate the response via Wi-Fi to other base stations 4004, or communicate the response via Internet, Wi-Fi bridging, and/or Ethernet to at least one control center 4008. Conversely, the response may be communicated from nearby node 4000 to nearby node 4000 within the mesh network 4001 in a daisy-chain arrangement until the response is finally communicated to at least one base station 4004 associated with the nodes' 4000 mesh network 4001.

Once the positive response reaches the control center 4008, the control center 4008 will then retrieve the geographical location information for the second mobile device's 4010 most recent location. This location information is then sent by the control center 4008 to at least one base station 4004 that is associated with the mesh network 4001 of nodes 4000 that are in close proximity with the first mobile device 4010. The at least one base station 4004 will route the location information through at least one node 4000 back to the first mobile device 4010. Once the first mobile device 4010 receives this location information, the first mobile device 4010 will use this location information in order to generate and display a two- or three-dimensional map of the second mobile device's 4010 position within a geographical area and/or zone. In one or more embodiments, the first mobile device 4010 will display the second mobile device's 4010 position in relation to the first mobile device's 4010 position on the multi-dimensional map. In some embodiments, the first mobile device 4010 will display navigational directions from the first mobile device's 4010 location to the second mobile device's 4010 location. In one or more embodiments, the first mobile device 4010 can transmit location queries either directly to the second mobile device 4010, through at least one node 4000 to the second mobile device 4010, or through at least one node 4000 and at least one base station 4004 to the second mobile device 4010.

In one or more embodiments, a first mobile device 4010 may initially configure a selective permission to allow specific subscribers associated with mobile devices 4010 to receive the first mobile device's 4010 location information. In these embodiments, the first mobile device 4010 will transmit permission instructions to at least one node 4000 that is located within communication range of the first mobile device 4010. The at least one node 4000 will then transmit the permission instructions to the node's 4000 associated base station 4004, or to other nearby nodes 4000 within the node's 4000 mesh network 4001. The base station 4004 will, in turn, either communicate the permission instructions via Wi-Fi to other base stations 4004, or communicate the permission instructions via Internet, Wi-Fi bridging, and/or Ethernet to at least one control center 4008. Alternatively, the permission instructions may be communicated from nearby node 4000 to nearby node 4000 within the mesh network 4001 in a daisy-chain arrangement until the permission instructions are finally communicated to at least one base station 4004 associated with the nodes' 4000 mesh network 4001.

Once the permission instructions reach the control center 4008, the control center 4008 will process the permission instructions. Once the control center 4008 has processed the permission instructions, the control center 4008 is configured to send the location information of the first mobile device 4010 to specific selected subscribers associated with mobile devices 4010 according to the permission instructions. In one or more embodiments, the control center 4008, the base stations 4004, and/or the location nodes 4000 may process the instructions and/or be configured to send the location information of the first mobile device 4010 to specific selected subscribers associated with mobile devices 4010 according to the permission instructions.

In these embodiments, a second mobile device 4010 will submit a location query for the first mobile device's 4010 location information. In these embodiments, the second mobile device 4010 will transmit a specific location query to at least one node 4000 that is located within communication range of the second mobile device 4010. The at least one node 4000 will then transmit the location query to the node's 4000 associated base station 4004, or to other nearby nodes 4000 within the node's 4000 mesh network 4001. The base station 4004 will, in turn, either communicate the location query via Wi-Fi to other base stations 4004, or communicate the location query via Internet, Wi-Fi bridging, and/or Ethernet to at least one control center 4008. Conversely, the location query may be communicated from nearby node 4000 to nearby node 4000 within the mesh network 4001 in a daisy-chain arrangement until the location query is finally communicated to at least one base station 4004 associated with the nodes' 4000 mesh network 4001.

Once the location query reaches the control center 4008, the control center 4008 will process the location query and determine if the second mobile device 4010 is associated with one of the specific selected subscribers that were listed in the first mobile device's 4010 permission instructions. If the control center 4008 determines that the second mobile device 4010 is associated with one of the specific selected subscribers that were listed in the first mobile device's 4010 permission instructions, the control center 4008 will route a message containing the current location information of the first mobile device 4010 to at least one base station 4004 that is associated with the mesh network 4001 of nodes 4000 that are in close proximity to the second mobile device 4010.

Once the message containing the currently location information of the first mobile device 4010 is downloaded onto the second mobile device 4010, the second mobile device 4010 will display the location information of the first mobile device 4010. This location information includes, but is not limited to, a two- or three-dimensional map showing the location of the first mobile device 4010 in relation to the location of the second mobile device 4010; a two- or three-dimensional map showing the location of the first mobile device 4010; and/or detailed directional instructions of how the second mobile device 4010 will need to travel to reach the current location of the first mobile device 4010.

Conversely, if the control center 4008 determines that the second mobile device 4010 is not associated with one of the specific selected subscribers that were listed in the first mobile device's 4010 permission instructions, the control center 4008 will route a denial message to at least one base station 4004 that is associated with the mesh network 4001 of nodes 4000 that are in close proximity to the second mobile device 4010. In at least one embodiment, the denial message will notify the subscriber associated with the second mobile device 4010 that he or she is not granted access to the current location information of the first mobile device 4010. Once the denial message is downloaded onto the second mobile device 4010, the second mobile device 4010 will display the denial message.

With this system, it is possible to obtain mapping not only in a latitude/longitude sense, but also in an elevational sense. The nodes 4000, for instance, are placed on different floor levels 4012, 4014, 4016, 4018 of a high-rise building 4020 to allow for mapping in an elevation sense. In addition, this system provides for fine-resolution mapping of a geographical location. Current GPS systems can determine a location of a building 4020 in a relatively course manner, namely a street address. The disclosed system includes nodes 4000 that provide enhanced fine-resolution mapping within a building 4020, and not only on a two-dimensional basis, but rather on a three-dimensional basis of the different floors 4012, 4014, 4016, 4018 within the building 4020.

Figure 20:
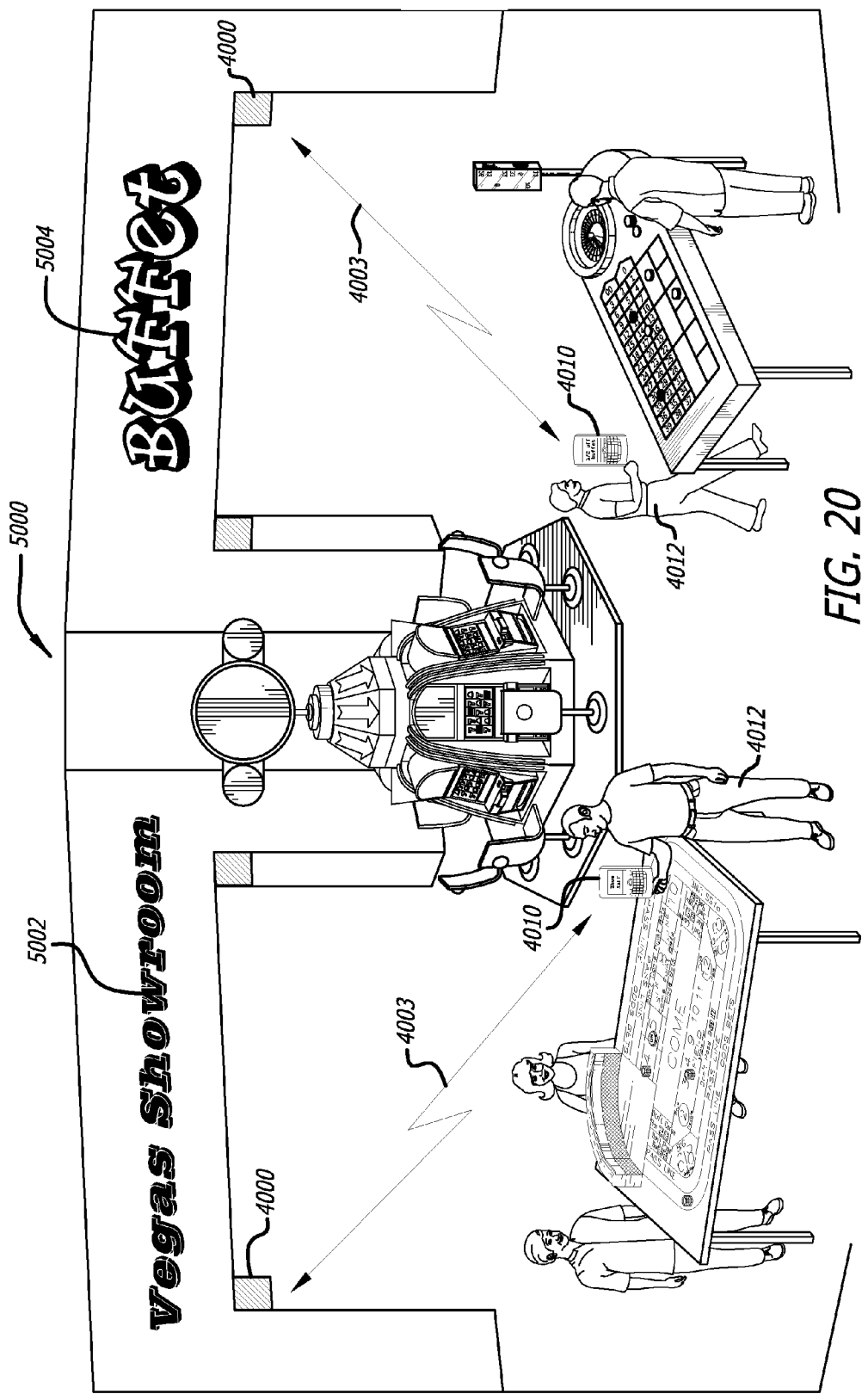
FIG. 20 illustrates an exemplary system for data mining and communications with users associated with mobile devices that are located within particular geographical areas.

FIG. 20 illustrates an exemplary system for data mining and communications with users associated with mobile devices that are located within particular geographical areas.

In this system, mobile devices 4010 that are related to at least one user that is located in a specific area, or zone, at a geographical location are in communication 4003 with nodes 4000 that are located within that specific area, or zone. The at least one user can be an individual 4012, vehicle, or article. The nodes 4000 are in communication with at least one control center. The nodes 4000 download user profile information and/or location information from the mobile devices 4010, and transfer that profile information and/or location information to at least one control center. The user profile information includes, but is not limited to, a history of geographical locations that the user has visited, the amount of time the user spent in each of those locations, patterns of location activity of the user, and patterns of shopping habits of the user.

The nodes 4000 can transmit the profile information and/or location information to the control center either directly to the control center, through at least one node 4000 to the control center, or through at least one node 4000 and at least one base station that is associated with the at least one node 4000 to the control center. Once the profile information and/or location information reaches the control center, the control center processes the information. Once the information is processed by the control center, the control center employs a messaging system to send messages to specific mobile devices 4010, according to the personal profiles of the mobile device users and/or the location of the mobile device users relative to specific nodes 4000. In one or more alternative embodiments, the nodes 4000, the base stations, and/or the control centers process the information and/or use a messaging system to send messages to specific mobile devices 4010, according to the personal profiles of the mobile device users and/or the location of the mobile device users relative to specific nodes 4000.

Data mining and commercial communications are possible with users that are associated with mobile devices 4010 and located in particular geographical areas. For instance, when a user associated with a mobile device 4010 is located in a specific area of a shopping mall or a hotel, advertisements, promotions or suggestions that relate to that specific area of the shopping mall or hotel are downloaded real time to the user's mobile device 4010 for the user. For example, when the user's mobile device 4010 is located within communication range of a node 4000 that is in close proximity to a restaurant or buffet 5004, the user may be offered wining and dining advertisements, promotions, and/or coupons for that particular restaurant or buffet 5004. In another example, when the user's mobile device 4010 is located within communication range of a node 4000 that is in close proximity to a show ticketing counter 5002, the user may be offered show advertisements, promotions, and/or coupons for various show tickets sold at the ticketing counter 5002.

In a store environment, special advertisements can be offered to a user, depending on the user's perceived shopping habits or motion throughout the store. For instance, a person who spent a lot of time in the camera department of the store can strategically be messaged about promotions from that specific department. The behavior of the user can be part of the profile. Behavior of a user can include, but is not limited to, the amount of time the user spent in the vicinity of different nodes within the environment, the purchasing patterns of the user, the product or service preferences of the user, the commercial enquiries of the user, the dining preferences of the user, and the entertainment preferences of the user. In one or more embodiments, a control system is used to generate a profile of a user. For example, if the user purchased various different products, this product purchasing data can be fed into a control system to create and/or update the user's profile.

In a hotel environment, for instance, a casino 5000, a past profile of a user can be preloaded onto a mobile device 4010 associated with that user when the user checks into the hotel. The past profile may have been generated from the user's behavior during the user's prior stays at the hotel. This past profile can be updated according to the user's movement throughout the hotel and actions during the user's stay at the hotel.

In this system, message communications can being targeted to at least one or multiple users. This system permits a control center to be able to control and/or monitor individuals 4012, vehicles and other mobile entities. The system utilizes at least one geographical zone. The zone can be a selectively preconfigured geographical zone, and will include a plurality of nodes 4000.

Messages are sent between one or more of the mobile devices 4010 associated with at least one user, one or more nodes 4000, one or more base stations, and/or one or more control centers. The message communications are targeted to at least one user. The nodes 4000 are arranged in a multi-dimensional sense, the multi direction sense selectively being a three-dimensional sense in the x, y and z axes or coordinates. Data is obtained and mined according to the location of the user's mobile device 4010 in relation to the placement of the nodes 4000 in a multi-dimensional sense.

In one or more embodiments, the mobile devices 4010 are Bluetooth™ equipped. The mobile devices 4010 communicate via RF using Bluetooth™ protocol to Bluetooth™ enabled location nodes 4000 in a mesh network. When a mobile device 4010 is located within the range of certain location nodes 4000, specific events are triggered. These specific events include, but are not limited to, the downloading of a commercial message, such as an advertisement, to the user's mobile device 4010 for the user.

The selected nodes 4000 can communicate the location information of the mobile device 4010 associated with a user. The selected nodes will transmit the location information to a central station either directly or via other nodes 4000 within at least one mesh network. The mesh network may include the use of relay stations and/or intermediate supplementary stations.

A user is associated with a mobile device 4010, or transponder or subscriber device 4010. The device 4010 being selectively a cell phone, PDA, pager, computer, or device which is configured to be in wireless communication with other devices through a suitable network.

Figure 21:
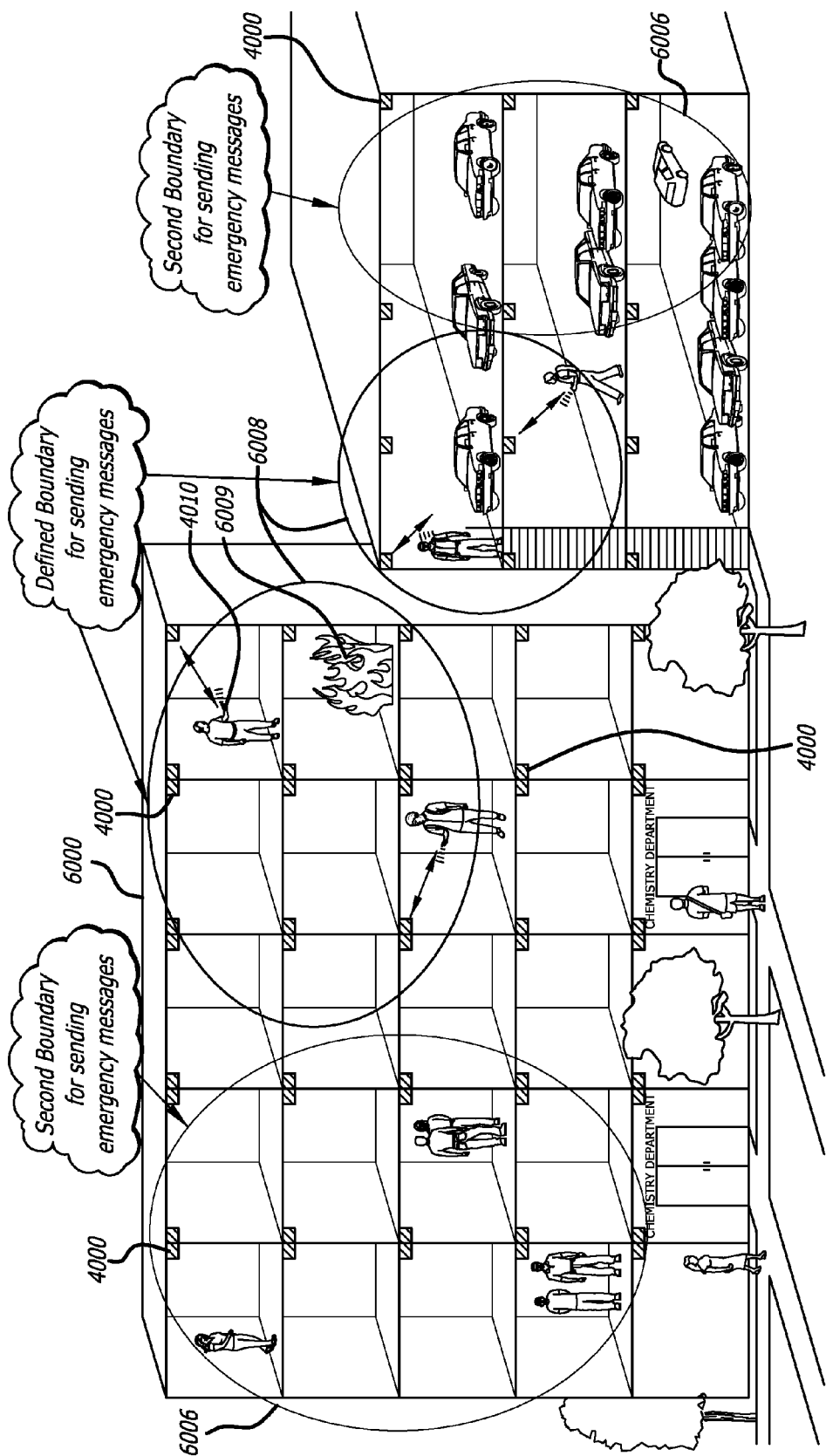
FIG. 21 illustrates an exemplary system of a multi-dimensional mesh network of nodes for communicating emergency messages to users.

FIG. 21 illustrates an exemplary system of a multi-dimensional mesh network of nodes for communicating emergency messages to users.

At least one geographical zone 6006, 6008, which can be multi-dimensional, such as in three dimensions, can be utilized to regulate the location of movable entities and their actions within the geographical zone 6006, 6008. Detailed location information is downloaded from nodes 4000 to a mobile device 4010 within a geographical zone 6006, 6008. A mobile device 4010 associated with at least one user located in a specific area of a geographical zone 6006, 6008 communicates with a control center through at least one node 4000. Mobile devices 4010 interact with location nodes 4000 that are in communication range. A messaging system is used to send emergency and security communications to users associated with mobile devices 4010 that are located in particular locations.

The present system controls, regulates, and monitors users in an emergency or security environment. Users can include individuals, vehicles, and other moving entities. Regulating a user comprises at least one of monitoring, controlling, and visualizing the movement in a specific geographic zone 6006, 6008 of a mobile device 4010 associated with a user. The geographic zone 6006, 6008 can be a multi-dimensional zone selectively in a three dimensional sense having x, y and z axes or coordinates. The geographical zone 6006, 6008 is a zone that includes a mesh network of nodes 4000.

Messages are sent between one or more of the mobile devices 4010, and one or more control stations. Message communications relating to security and/or an emergency are targeted to at least one or multiple users. The messages are focused, target specific, and dependent on the location of the nodes 4000 arranged in a multi-dimensional sense in the geographic zone 6006, 6008. This system creates a security support system utilizing user location data in relation to node 4000 placement.

The mobile personal devices 4010 associated with users are Bluetooth™ equipped, and communicate wirelessly via RF using Bluetooth™ protocol to location nodes 4000. When an emergency and/or security event occurs, a central station and/or intermediate supplementary station transmits emergency and/or security notifications to mobile devices 4010 associated with users located within at least one specific geographic zone 6006, 6008 of nodes 4000 in a mesh network. The emergency and/or security notifications are transmitted to the users' personal devices 4010 selectively via at least one node 4000 within a mesh network, or via at least one node 4000 and through at least one relay station.

In some embodiments, when an emergency and/or security event occurs, at least one user associated with a mobile device 4010 enters an emergency and/or security notification into their corresponding mobile device 4010. The notification may be entered into the mobile device 4010 textually, verbally, and/or by dialing an "emergency and/or security designated phone number or code," for example the dialing of "911." The emergency and/or security notification is then transmitted to a central station and/or intermediate supplementary station for processing. Once the notification is processed, the central station and/or intermediate supplementary station transmits emergency and/or security notifications to mobile devices 4010 associated with users located within at least one specific geographic zone 6006, 6008 of nodes 4000 in a mesh network. The emergency and/or security notifications are transmitted to the users' personal devices 4010 selectively via at least one node 4000 within a mesh network, or via at least one node 4000 and through at least one relay station.

In this system, a plurality of coordinates relating to the emergency location 6009 are entered into at least one control center computer. The control center computer processes these location coordinates and determines which geographical zones 6006, 6008 are in close proximity to the emergency location 6009. The control center then transmits customized emergency messages to the mobile devices 4010 that are located within those geographical zones 6006, 6008.

For example, as shown in FIG. 21, the emergency depicted is a small fire 6009 located on the fourth floor of the chemistry building 6000. The coordinates of the fire 6009 are entered into the control center's computer. The control center computer processes these coordinates, and determines that the closest geographical zones to the fire 6009 are zones 6008, and the next closest geographical zones to the fire 6009 are zones 6006. Next, the control center transmits specific emergency messages to the mobile devices 4010 associated with the users located in zones 6008 and 6006. Since the users in zones 6008 are closer to the fire 6009 than the users in zones 6006, the users located in zones 6008 will receive emergency messages indicating that they are in very close proximity to the fire 6009 and the users located in zones 6006 will receive emergency messages indicating that they are in relatively close proximity to the fire 6009. Thus, the emergency messages can be tailored for each specific geographical zone 6008, 6006.

The messages are sent between one or more of the nodes 4000 and one or more mobile devices 4010 in a selected geographical zone. The nodes 4000 and the mobile devices 4010 are enabled selectively to communicate with GPS and with Bluetooth™ protocols. The nodes 4000 selectively communicate with users associated with a mobile device 4010, the device 4010 being selectively a cell phone, PDA, pager, or computer device.

In an emergency or security environment, data is communicated between communication nodes 4000 and a selected mobile device 4010 using the geographical zone as a selected area for communication. Messages are sent between one or more of the mobile devices 4010, and one or more control stations, where the message communications are targeted to at least one or multiple users. The nodes 4000 are arranged in a multi-dimensional sense. The security support system utilizes user location data of movable entities, and the existence of emergency and security conditions.

The system permits for individual, vehicles or other persons to be communicated to in areas and spaces that can be isolated and separated from other areas and spaces. In this manner if there is a security situation in one place, individuals or vehicles or other mobile entities can be targeted with messages or instructions to remain in a location removed or isolated from a danger area.

While the above description contains many specifics, these should not be construed as limitations on the scope of the disclosure, but rather as an exemplification of one embodiments thereof.

The method and system described above contemplate many applications of the present disclosure. The present disclosure includes a system which has the capability to control and monitor a moving object or a static object prone to being moved. The object can be many things such as vehicle, aircraft, airborne items, animals, persons, cargo, specialized and/or volatile cargo such as chemicals, weapons, or hazardous materials. In addition, fragile cargo can include, but is not limited to items such as, medicine, patients, organs for donation, where monitoring parameters such as temperature, pressure, humidity, blood pressure, EKG, and other conditions are critical to the integrity of the item.

Another climate-sensitive object for which tracking, monitoring and local control is beneficial includes produce and perishable goods. For example, the transponder or subscriber device could monitor humidity and have the ability to control the amount of moisture in cargo containing perishable items that are susceptible to humidity. Moreover, these objects can include any other item where tracking its movement and/or location is beneficial.

A transponder or subscriber device can be mounted, attached, manufactured, or otherwise included upon or within these various articles. The transponder or subscriber device is contemplated to be of many different sizes including nano- and/or micro scale-transponder or subscriber device. Within the context of the tracking system, the transponder or subscriber device works to collect, process, and communicate various information about the article or vehicle the transponder or subscriber device is attached to.

Furthermore, when requested, the transponder or subscriber device can issue various commands and instructions to the local article or vehicle. These commands or instructions to the local article or vehicle are contemplated to include any command that can change, alter, or enhance, the mechanism, the function, the structure or the composition of the article or vehicle. For example, a medical application of the present disclosure contemplates a transponder or subscriber device with the ability to monitor a patient's vital signs. The transponder or subscriber device can be hardwired or hooked up to intravenous tubes, medical machines, and other medical equipment. Thus, for example, the user is capable of remotely administering medicine by commanding the transponder or subscriber device to perform the function. Furthermore, a change in vital signs could send an event message to the transponder or subscriber device where the transponder or subscriber device could send a message to a response center or directly to a cellular phone of the patient's physician or to a plurality of cellular phones, such as to family members, for example.

Additional applications and situations include military applications where it is necessary to not only track and monitor a vehicle or person, but where it is also beneficial to be able to control functions on the vehicle or person. For example, it may be desired to control the firing ability of a military vehicle, or control similar functions once the vehicle enters a certain territory or turn off certain capabilities once the vehicle enters a peaceful zone. Similarly, an additional application to aircrafts and airborne items considered. The transponder or subscriber device would have the same capabilities; however, the transponder or subscriber device could position based upon on a three-dimensional point in space, not merely longitude and latitude. Naturally, each one of these applications remains configurable and controllable wirelessly.

Furthermore, the disclosure includes any combination or subcombination of the elements from the different species and/or embodiments disclosed herein. One skilled in the art will recognize that these features, and thus the scope of this disclosure, should be interpreted in light of the following claims and any equivalents thereto.

While the above description contains many particulars, these should not be considered limitations on the scope of the disclosure, but rather a demonstration of embodiments thereof. The system and methods disclosed herein include any combination of the different species or embodiments disclosed. Accordingly, it is not intended that the scope of the disclosure in any way be limited by the above description. The various elements of the claims and claims themselves may be combined in any combination, in accordance with the teachings of the present disclosure, which includes the claims.

We claim:

1. A method to define a three-dimensional geographical zone utilized with a movable entity having at least one attached transponder and to communicate a message to an individual having the transponder wirelessly linked to the internet and provided with a GPS receiver, comprising:
   allowing a user to enter at least one waypoint,
   wherein the at least one waypoint is defined by a geographical coordinate and a radius,
   wherein the geographical coordinate is represented by a latitude value, a longitude value, and an elevation value,
   wherein the radius is represented by a distance magnitude;
   loading the at least one waypoint on the at least one transponder;
   receiving over the internet, from the transponder, the transponder being enabled to operate based on a location of the device in a 3-D space environment, the geographical coordinate being location information derived from the GPS receiver and information identifying the individual; using the location information and the identifying information in a programmed computer in communication with stored messages; and thereupon, under the control of a programmed computer and without specific request by the individual, sending to the transponder over the internet using an identifier personal to the individual a message, the message being directed to the individual based on the 3-D location of the device in space of the individual and the transponder, the transponder being a cell phone, or PDA and wherein the transponder includes the ability to communicate selectively by at least one of WiFi and short radio range, selectively by Bluetooth protocol to effect location information, and commercial communications are performed by the transponder associated with the user located in a particular geographical area, selectively the user associated with the transponder being located in a specific area of a shopping mall or a hotel, and wherein at least one of an advertisement, promotion or suggestion that relates to that specific area of the shopping mall or hotel is downloaded to the transponder for the user.

2. The method of claim 1, wherein the area that a waypoint defines is selected from the group consisting of a circle, a cylinder, and a sphere.

3. The method of claim 1, further comprising regulating the movable entity by performing an action that comprises at least one of monitoring, controlling, and visualizing the movement of the movable entity.

4. The method of claim 1, further comprising regulating the movable entity by performing an action that comprises at least one of monitoring, controlling, and visualizing the non-movement of the movable entity.

5. The method of claim 1, further comprising regulating the movable entity by performing an action that comprises at least one of monitoring, controlling, and visualizing the position of the movable entity.

6. The method of claim 1, wherein the at least one transponder determines whether the at least one transponder is located inside the three-dimensional geographical zone by:
   obtaining global positioning coordinates, and
   calculating whether or not the global positioning coordinates are located inside the at least one waypoint.

7. The method of claim 1, wherein the shape of the three-dimensional geographical zone is a street route.

8. The method of claim 1, wherein the shape of the three-dimensional geographical zone is the shape of a non-geometrical shape.

9. The method of claim 1, wherein the moveable entity is controlled and monitored depending on the location of the moveable entity relative to the three-dimensional geographical zone.

10. A method to define a three-dimensional geographical zone utilized with a movable entity having at least one attached transponder and to communicate a message to an individual having the transponder wirelessly linked to the internet and provided with a GPS receiver, comprising:
    allowing a user to enter at least one a geographical coordinate,
    wherein the at least one geographical coordinate is represented by a latitude value, a longitude value, and an elevation value; the coordinate being indoors within a building structure, the coordinate being derived from a network indoors within the building structure;
    loading the at least one geographical coordinate on the at least one transponder;
    receiving over the internet, from the transponder, the transponder being enabled to operate based on a location of the device in a 3-D space environment, the geographical coordinate being location information derived from the GPS receiver and information identifying the individual; using the location information and the identifying information in a programmed computer in communication with stored messages; and thereupon, under the control of a programmed computer and without specific request by the individual, sending to the transponder over the internet using an identifier personal to the individual a message, the message being directed to the individual based on the 3-D location of the device in space of the individual and the transponder, the transponder being a cell phone, or PDA and wherein the transponder includes the ability to communicate selectively by at least one of WiFi and short radio range, selectively by Bluetooth protocol to effect location information, and commercial communications are performed by the transponder associated with the user located in a particular geographical area, selectively the user associated with the transponder being located in a specific area of a shopping mall or a hotel, and wherein at least one of an advertisement, promotion or suggestion that relates to that specific area of the shopping mall or hotel is downloaded to the transponder for the user.

11. The method of claim 10, further comprising regulating the movable entity by performing an action that comprises at least one of monitoring, controlling, and visualizing the movement of the movable entity.

12. The method of claim 10, further comprising regulating the movable entity by performing an action that comprises at least one of monitoring, controlling, and visualizing the non-movement of the movable entity.

13. The method of claim 10, further comprising regulating the movable entity by performing an action that comprises at least one of monitoring, controlling, and visualizing the position of the movable entity.

14. The method of claim 10, wherein the at least one transponder determines whether the at least one transponder is located inside the three-dimensional geographical zone by:
    obtaining global positioning coordinates, and calculating whether or not the global positioning coordinates are located inside the area defined by the at least one geographical coordinate.

15. The method of claim 10, wherein the shape of the three-dimensional geographical zone is the shape of a non-geometrical shape.

16. The method of claim 10, wherein the moveable entity is controlled and monitored depending on the location of the moveable entity relative to the three-dimensional geographical zone.

17. A method to define a three-dimensional geographical zone utilized with a movable entity having at least one attached transponder and to communicate a message to an individual having the transponder wirelessly linked to the internet and provided with a GPS receiver, comprising:

allowing a user to enter at least one waypoint,
wherein the at least one waypoint is defined by a first geographical coordinate and a radius,
wherein the first geographical coordinate is represented by a latitude value, a longitude value, and an elevation value; the coordinate being within a confined area of a building structure;
wherein the radius is represented by a distance magnitude;
allowing a user to enter at least one second geographical coordinate,
wherein the at least one second geographical coordinate is represented by a latitude value, a longitude value, and an elevation value;
loading the at least one waypoint on the at least one transponder;
loading the at least one second geographical coordinate on the at least one transponder;
receiving over the internet, from the transponder, the transponder being enabled to operate based on a location of the device in a 3-D space environment, the geographical coordinate being location information derived from the GPS receiver and information identifying the individual;
using the location information and the identifying information in a programmed computer in communication with stored messages, the messages being offerings of commercial products or services; and thereupon, under the control of a programmed computer and without specific request by the individual, sending to the transponder over the interne using an identifier personal to the individual a message, the message being directed to the individual based on the 3-D location of the device in space of the individual and the transponder, the transponder being a cell phone, or PDA and wherein the transponder includes the ability to communicate selectively by at least one of WiFi and short radio range, selectively by Bluetooth protocol to effect location information, and commercial communications are performed by the transponder associated with the user located in a particular geographical area, selectively the user associated with the transponder being located in a specific area of a shopping mall or a hotel, and wherein at least one of an advertisement, promotion or suggestion that relates to that specific area of the shopping mall or hotel is downloaded to the transponder for the user.

18. The method of claim 17, wherein the area that a waypoint defines is selected from the group consisting of a circle, a cylinder, and a sphere.

19. The method of claim 17, further comprising regulating the movable entity by performing an action that comprises at least one of monitoring, controlling, and visualizing the movement of the movable entity.

20. The method of claim 17, further comprising regulating the movable entity by performing an action that comprises at least one of monitoring, controlling, and visualizing the non-movement of the movable entity.

21. The method of claim 17, further comprising regulating the movable entity by performing an action that comprises at least one of monitoring, controlling, and visualizing the position of the movable entity.

\* \* \* \* \*